United States Patent [19]
Schneier et al.

[11] Patent Number: 5,768,382
[45] Date of Patent: Jun. 16, 1998

[54] REMOTE-AUDITING OF COMPUTER GENERATED OUTCOMES AND AUTHENTICATED BILING AND ACCESS CONTROL SYSTEM USING CRYPTOGRAPHIC AND OTHER PROTOCOLS

[75] Inventors: Bruce Schneier, Minneapolis, Minn.; Jay Walker, Ridgefield; James Jorasch, Stamford, both of Conn.

[73] Assignee: Walker Asset Management Limited Partnership, Stamford, Conn.; ct

[21] Appl. No.: 561,668

[22] Filed: Nov. 22, 1995

[51] Int. Cl.$^6$ .............................. H04L 9/32; G06F 19/00
[52] U.S. Cl. ............................ 380/23; 463/29; 463/41
[58] Field of Search ............................ 463/40, 41, 42, 463/29; 380/23, 25

[56] References Cited

U.S. PATENT DOCUMENTS

| | | |
|---|---|---|
| 4,658,093 | 4/1987 | Hellman . |
| 5,036,461 | 7/1991 | Elliott et al. . |
| 5,050,212 | 9/1991 | Dyson . |
| 5,073,931 | 12/1991 | Auderbert . |
| 5,083,271 | 1/1992 | Thacher et al. ............................ 463/42 |
| 5,112,051 | 5/1992 | Darling et al. . |
| 5,155,680 | 10/1992 | Wiedemer . |
| 5,193,114 | 3/1993 | Moseley . |
| 5,202,923 | 4/1993 | Kuriyama . |
| 5,243,652 | 9/1993 | Teare et al. ............................ 380/21 |
| 5,243,654 | 9/1993 | Hunter . |
| 5,259,029 | 11/1993 | Duncan, Jr. . |
| 5,288,978 | 2/1994 | Iijima . |
| 5,297,205 | 3/1994 | Audebert et al. ............................ 380/23 |
| 5,319,710 | 6/1994 | Atalla et al. . |
| 5,347,580 | 9/1994 | Molva et al. . |
| 5,349,642 | 9/1994 | Kingdon . |
| 5,351,293 | 9/1994 | Michener et al. . |
| 5,355,413 | 10/1994 | Ohno . |
| 5,359,510 | 10/1994 | Sabaliauskas . |
| 5,377,268 | 12/1994 | Hunter . |
| 5,386,468 | 1/1995 | Akiyama et al. . |
| 5,400,319 | 3/1995 | Fite et al. . |
| 5,412,575 | 5/1995 | Constant et al. . |
| 5,416,840 | 5/1995 | Cane et al. . |
| 5,434,918 | 7/1995 | Kung et al. . |
| 5,508,731 | 4/1996 | Kohorn . |
| 5,539,822 | 7/1996 | Lett . |

*Primary Examiner*—Gilberto Barron, Jr.
*Attorney, Agent, or Firm*—Morgan & Finnegan, LLP; Jeffrey L. Brandt

[57] ABSTRACT

A computer device and method for encoding a message corresponding to an outcome of a computer game, and a computer device and method for decoding the message to detect a fraudulent outcome. The computer device used to generate the encoded message includes (1) a memory device containing encoding control code and (2) a processor configured to process the encoding control code in conjunction with a computer game outcome to generate an encoded message containing the computer game outcome and to transmit the encoded message to a human-readable output device, such as a display device. The computer device includes various tamper resistant or tamper evidence features. A secure module containing the processor and memory is used to plug into an existing personal computer or dedicated game device. The method for encoding the message includes the steps of executing a computer game program to generate a computer game outcome, encoding the computer game outcome to generate an encoded message, and providing the encoded message to a user, who may then transmit the encoded message to a device configured for decoding the encoded message to reveal the computer game outcome. A second central or host computer device is used to decode the encoded message. The second computer device has (a) a memory device containing decoding control code and an encoded message corresponding to a computer game outcome and (b) a processor configured to process the code to decode the encoded message to reveal the computer game outcome.

11 Claims, 24 Drawing Sheets

REMOTE-AUDITING OF COMPUTER GENERATED OUTCOMES AND AUTHENTICATED BILING AND ACCESS CONTROL SYSTEM USING CRYPTOGRAPHIC AND OTHER PROTOCOLS

BACKGROUND

The present invention relates generally to authentication of computer generated game or test results ("outcomes"), and more particularly, to a system by which persons who play games or take tests on a game or testing computer, respectively (hereinafter the "game computer" or "testing computer"), may submit the outcomes of the games or tests to a central authority having at least one central computer, and have the central computer "certify" those outcomes as being accurately reported and fairly achieved. This certification of the computer generated result constitutes a "remote-auditing" of the activity taking place on the game computer. In one application, the system enables computer generated game tournaments in which players play the games on game computers and compete against each other by submitting the outcomes for those tournament games to the central computer, which certifies the outcomes and rates and ranks the players. In another application, the system provides for players of computer games to obtain a certified ranking and rating without participation in a tournament. In other embodiments, the system provides for self-authentication and certification of outcomes for games played on the game computer by the game computer itself, or for mutual-authentication and certification of such outcomes on any other game computer in the system. The system further enables the submission and certification of test outcomes using the same methodology.

The present invention also provides for "pay-per-use" in the home video game environment, where any game computer may be turned into a video game arcade machine. Players simply pay per game, or for play over a specified period of time. The invention also allows for "time-dependent disablement" which lets players acquire game consoles for a relatively low down payment. Charges for game play may then be incurred on a daily, weekly, monthly, or some other periodical basis.

Tournaments are a popular form of recreation and are amenable to many forms of organized activities, such as sports or games. There are two primary types of tournaments. In the first, players compete against one another (i.e., head-to-head), singularly or in teams, under controlled conditions. Examples include boxing, chess, karate and the like. In the second, players play a game without direct or simultaneous interaction with another player, where the player having the best score (e.g., golf, bowling, etc.), fastest time to completion (e.g., puzzles) or some combination thereof is pronounced the winner. Winners earn recognition for their skill and sometimes even prizes. Accomplished players of games of skill are often provided with an officially recognized ranking, rating and/or title.

Classic tournaments are usually held at a specific time and at a specific location, where they are conducted under a set of rules which apply equally to all contestants, and under the supervision of one or more judges and/or a sanctioning authority. A typical chess tournament may include one hundred to two hundred players who get together at a central location. They pay an entry fee and play a series of games over the course of a specified time period under the auspices of an officially sanctioned tournament director(s). At the end of the competition, the players are ranked and cash prizes are awarded to the top finishers. The United States Chess Federation administers a national rating system that ranks players with a numerical rating based upon the results of tournament sanctioned games against other rated players. Ratings may change over time as the player wins and loses games played in ongoing tournaments. Various rating ranges are given named titles. For example, an "Expert" chess player has a rating of between 2,000 and 2,200 and a "Master" chess player has a rating over 2,200 and so on.

The aforementioned tournaments have several drawbacks. Since most tournaments are held at some specified location, it is likely that some players may have to travel an appreciable distance, incurring expenses for travel, food, lodging and the like. Furthermore, it is often difficult to schedule a given tournament at a time that is convenient for all participants. In addition, there are only a limited number of sanctioned tournament directors who are available to run such tournaments. Since the fundamental object of any tournament is to ensure the integrity and authenticity of the results, without a tournament director, the results of the tournament are not verifiable. It is also difficult and impractical to run niche tournaments that appeal to a very small segment of the population, as the fixed costs associated with running a tournament can make it economically impractical where only a few participants are involved.

Aside from the so-called classic tournaments mentioned above, the players of many popular computer generated games enjoy competing for bragging rights as to who has the best score. Most arcade gaming machines typically display a series of high scores identifying the most recent top scoring players who played on a specific machine. Similarly, some dedicated game systems such as Nintendo, Sega and the like, and personal computers with dedicated game software, may display a series of high scores identifying top scoring players. While this enables a player who achieves a sufficiently high score to compare his or her performance with other players who have played on that particular machine or computer with that software, there is no way to prevent players from lying to others about their "purported" score. Therefore, there exists a need for a system whereby players of such games can register their scores with a central computer that certifies the scores and enables players to receive their ranking/rating with respect to other players on a national or even worldwide scale. In this connection, such a system could enable players of such games to participate in "electronic" tournaments where players either play individually or in teams on independently disposed game computers, or head-to-head via an on-line connection between at least two competing players.

One approach to electronic tournaments is disclosed in U.S. Pat. No. 5,083,271 to Thacher et al. ("Thacher"). In the Thacher system, a plurality of gaming terminals are networked to a central computer. A player purchases credit, enters a tournament, and is assigned a unique identification code. This identification code is stored in the gaming terminal and at the central computer. The player then proceeds to play a tournament game on the gaming terminal. When the player has finished the game, the player's score is transmitted to the central computer along with the player identification code and a game identification number. The central computer sorts through all of the scores at the conclusion of the tournament and determines a winner. The Thacher patent claims to provide some level of protection against substitution of players by utilizing a separate personal identification code for each player. Thus, to the extent that a player's personal identification code is not compromised, the person playing the game is uniquely identified with the achieved score. This arrangement has disadvantages, however, including the extensive network between all of the participatory game terminals, and the inability to verify that the scores in the tournament games were accurately reported and fairly achieved. For example, there is nothing in the Thacher system which prevents a player from modifying the game software to produce a more favorable outcome, or from intercepting communications of score and identification data from the remote gaming terminal to the central computer and then altering the same to register a false score.

Another well known system for "authenticating" video game scores utilizes a primitive method in which players take photographs of both video screens containing game scores and the game console, and then mail the pictures to a central authority. The monthly magazine Nintendo POWER publishes the Power Players' Arena, in which top scoring players are identified. Top scoring players receive Nintendo POWER Stamps which can be redeemed for prizes. The photograph of the video screen ostensibly prevents a player from simply making up a score. The photograph of the video screen and the game console supposedly enables the central authority to determine whether the player has utilized any unauthorized device to change the standard play conditions for the game. This system has a number of disadvantages. Taking a clear photograph of a video display is often difficult due to the reflective nature thereof. There is also a considerable amount of time that is required to transmit the photograph to the central authority and players must wait for the scores to be authenticated by Nintendo and thereafter published. This system is also vulnerable to players hacking the game software. No effort is made to determine whether or not the game software was tampered with. The use of well known interposing devices such as the GAME GENIE, which fits into the access port of a standard game console and enables codes to be entered that temporarily change the play conditions as software instructions are loaded into the read-write memory of the game console from the read-only memory of the game cartridge, is ostensibly prevented by requiring that a photograph of the entire game console accompany the photograph of the video screen. However, players can easily circumvent this problem by playing a game with an interposing device, taping the output with a VCR, thereafter removing the interposing device, and then playing back the recorded game for a subsequent photograph to be made without the interposing device installed in the game console.

In view of the above, there exists a need for a system by which players can participate in tournaments on game computers at any place and any time, without requiring complicated and costly networks or an on-line connection between the game computer and a central computer while the game is being played, without the need for the players to go to a specified location, and without the need to have an officially sanctioned tournament director present where the games are being played while still ensuring the authenticity of the participants' scores. There further exists a need for a system which enables players of computer generated games to have the outcomes of the games certified by the sanctioning authority as having been accurately reported and fairly achieved, and for establishing the players' ranking, rating and/or title with respect to other players of the games, either in connection with a given tournament, or independent thereof.

SUMMARY OF THE INVENTION

One embodiment of the present invention is directed generally to a computer device including a memory device having encoding control code embodied therein and a processor disposed in communication with the memory device, the processor configured to process the encoding control code in conjunction with a computer game outcome to generate an encoded message corresponding to the computer game outcome and to transmit the encoded message to a human-readable output device, wherein the processor is further configured to periodically check blocks of computer game program execution code.

In another embodiment of the present invention, the invention is generally directed to a computer device including a memory device having embodied therein decoding control code and an encoded message corresponding to a computer game outcome and a processor disposed in communication with the memory device, the processor configured to process the decoding control code to decode the encoded message to reveal the computer game outcome, wherein the processor and the memory device are configured to generate, maintain and transmit a unique registration number for each of a plurality of computer games.

Additional embodiments of the present invention are also disclosed and claimed, including embodiments which are directed to other computer devices and the respective functions performed by the computer devices.

The many aspects of the present invention will best be understood as the detailed description thereof proceeds with particular reference to the accompanying drawings.

DETAILED DESCRIPTION OF THE PREFERRED EMBODIMENT

Figure 1A:
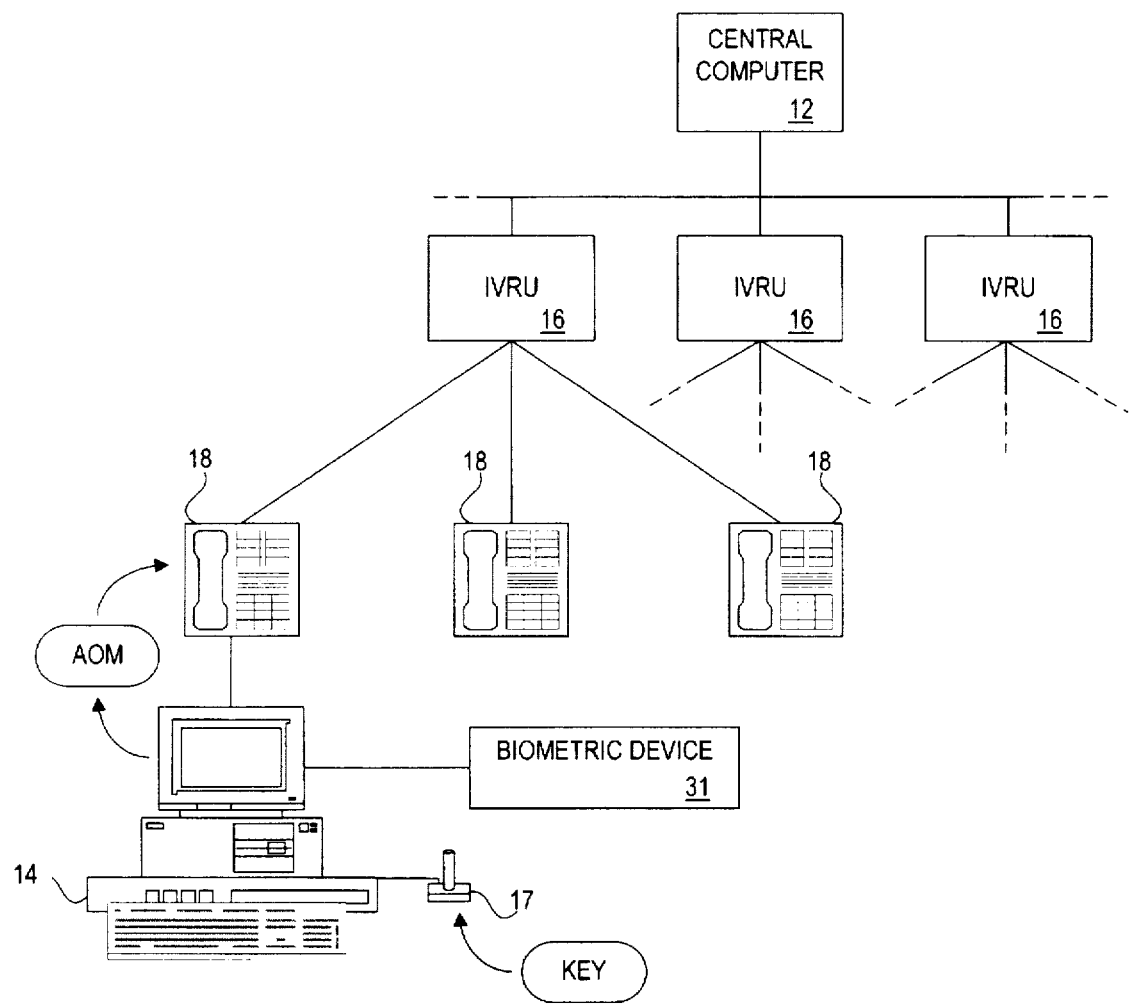
FIG. 1A is an overall schematic of the inventive system in one embodiment.

With reference to the several views of the drawings, there are shown several embodiments of a system in accordance with the present invention generally denoted by the reference numeral 10.

In the embodiment shown in FIG. 1A, the system is principally comprised of a central computer 12 associated with a central authority, and a plurality of game computers 14. The term "game computer" is intended to include personal computers ("PCs"), personal digital assistants, coin-operated arcade video gaming machines, television units coupled to game units (e.g., game consoles such as Nintendo, Sega, etc.) and portable game devices (e.g., GAME BOY, GAME GEAR, NOMAD and the like). For the purpose of description, the game computer depicted in the drawings replicates a standard PC. Each game computer 14 contains software and/or firmware (for convenience, all references herein to programs are to "software") which generates games of the type well known in the art. The practice of playing games on the game computer 14 may be classified as a person against game activity. At the conclusion of a game, the player submits the outcome (e.g., a score and/or time to completion, a combination thereof and any other play-related data) to the central computer 12 as described in detail below. However, many popular games allow for players to play against each other on the same game computer 14, or by establishing an on-line connection between the players' respective game computers 14. In this case, the outcome of the players' competition is submitted and certified (e.g., player A beat player B with a score of X to Y). In the following description, each game computer 14 includes game software 15 which resides in memory generally identified by the reference numeral 23. The memory 23 may consist of the regular memory (RAM and ROM) of the game computer 14, or it may include any memory device associated with the game computer 14 such as a game cartridge, disk, CD-ROM, PCMCIA card or special flash ROM chip. The specifics of the game software 15 as relates to the present invention will be described in more detail below. The game computer may also have an associated input control device 17, such as a joystick (shown) as is well known in the art. The input/output device 17 may comprise multiple joysticks or controls for players to play against each other.

The central computer 12 authenticates and/or certifies outcomes and manages tournaments. It is shown schematically in the drawings as a single unit, but may comprise a plurality of networked computers as required. In order to facilitate tournaments on a large scale, it may be required that the central computer 12 be broken up into regional computers, national computers and even a top level international computer. These computers may be interconnected via data networks such as TYMNET, DATAPAC or the like. The national computers poll the regional computers and the international computer polls the national computer for tournament data. Thus, regional tournaments only utilize the regional computers. If national tournaments are to be held, the national computers obtain the required tournament information from the regional computers. In the case of an international tournament, the international computer polls the national computers. Alternatively, several computers on a single level may be arranged so as to periodically verify each other in accordance with known principles. There are many ways in which the computers can be arranged, so for the purpose of description herein the central computer 12 is referred to as a single unit. As described in more detail below, in another embodiment of the invention, each game computer 14 is capable of authenticating an outcome from another game computer 14, with the central computer 12 operating as a Key Distribution Center ("KDC"), i.e., a database of encryption keys used for authenticating messages. The central computer 12 may also operate a "central scoreboard," i.e., a database where all certified scores and statistical information on players and teams are maintained. Statistics for a given player may include information on opponents, the time of play, ratings, rankings and the like. The information may be publicly available, or password protected (i.e., available only to those persons with the proper access password, or to those that have attained a certain rating threshold). The information may be made available via the Internet or major online providers, downloaded to game computers, or by mail or telephone.

Figure 1B:
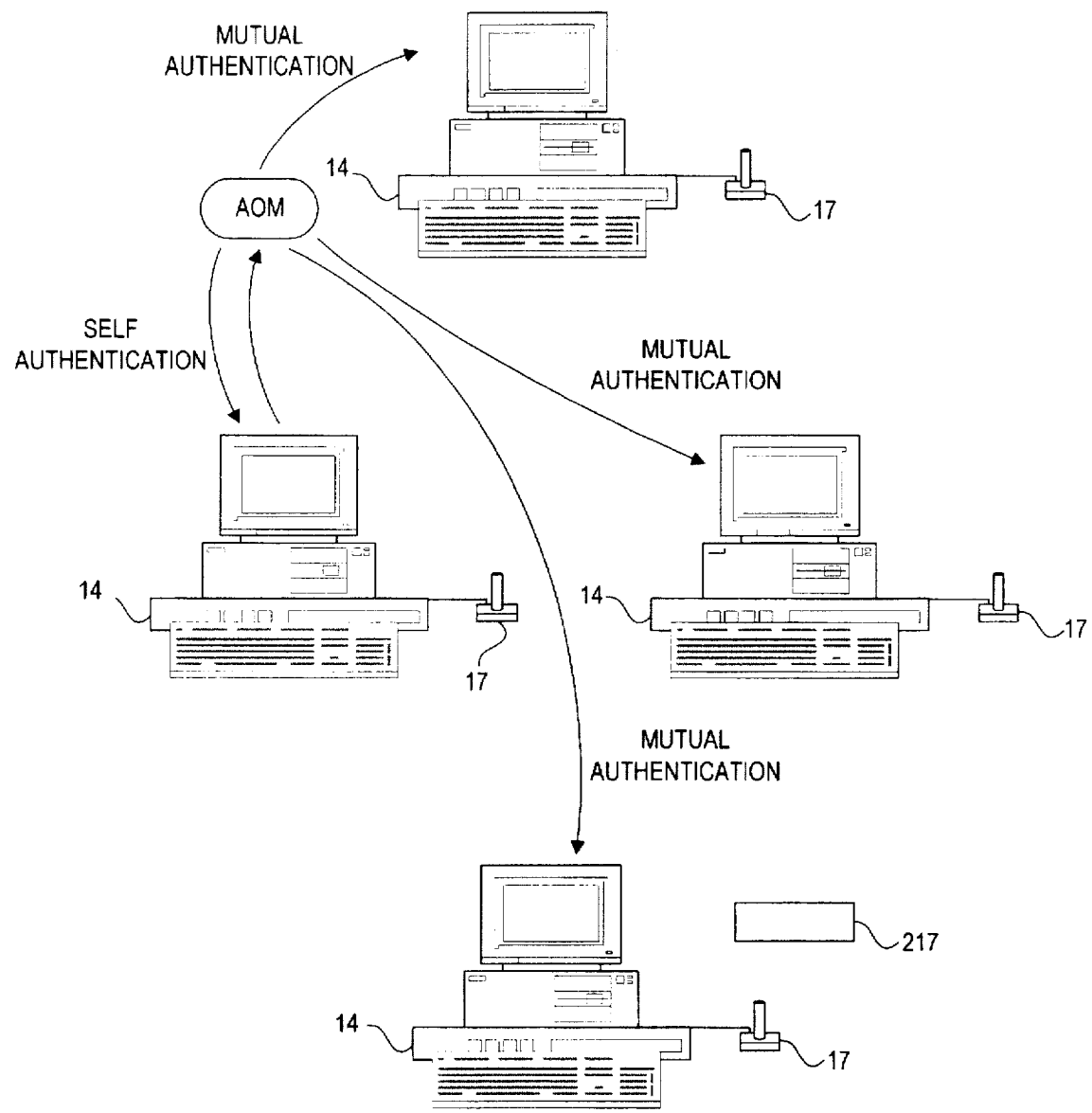
FIG. 1B is an overall schematic of the inventive system in a self-authentication and mutual-authentication embodiment.

In the embodiment shown in FIG. 1B, the game computers 14 are capable of "self-authentication" and "mutual-authentication" Self-authentication means that a game computer 14 can authenticate an outcome incorporated in an authenticatable outcome message AOM which it generated. For example, if a player claims that a score printed on a piece of paper, or stored in a given memory media, is authentic, and this score is embodied in an authenticatable outcome message AOM, the score may be authenticated by authenticating the authenticatable message AOM on the game computer 14. Similarly, the authenticatable message may be authenticated on any other game computer 14 in the system (i.e., mutual-authentication). The authentication protocols will be explained in more detail below.

Referring again to the embodiment shown in FIG. 1A, at least one Interactive Voice Response Unit ("IVRU") 16 is associated with a telephone network and coupled to the central computer 12 through a standard interface for access from a plurality of telephones 18, to enable players to enroll in tournaments and/or to submit the outcomes of the games to the central computer 12 for certification. In certain implementations, a player may register personal information and/or the game software 15 with the central computer over the telephone 18. Specifically, IVRUs are responsive to both voice and touch-tone signals communicated from the telephones 18. In this connection, the game computer 14 may communicate with a Dual Tone Frequency Modulator ("DTFM") to generate messages compatible with the IRVUs 16. An acoustic coupler may be used to receive messages from the telephone 18 in the same manner. Since the operation of the IVRUs 16 and DTFMs are well known in the art, they need not be described in detail herein. The IVRUs 16 may be associated with an automatic call distributor ACD of the type known in the art to balance the call load. During times of peak calls, calls to any IVRU 16 may be routed to a neighboring IVRU 16.

Figure 2:
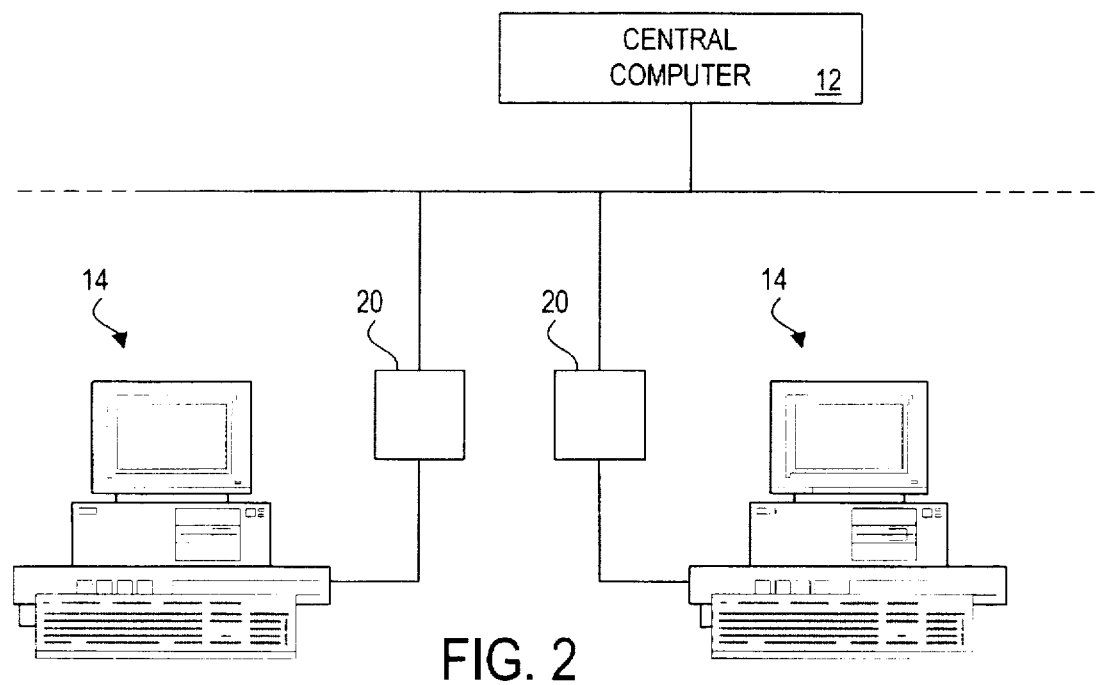
FIG. 2 is an overall schematic of the inventive system in another embodiment.

In an alternative embodiment shown in FIG. 2, the game computers 14 may communicate with the central computer 12 via a modem 20. In this regard, the game computers are not considered to be on-line with the central computer during the game. When a player desires to submit his or her outcome for a particular game or time of completion for a race of skill, the game computer 14 dials up and obtains access to the central computer, and uploads the game outcome information. This is discussed in more detail below. In this connection, it is anticipated that the central computer 12 may be accessed via a website 22 on the Internet 24 or over an on-line data network including commercial on-line service providers, bulletin board systems and the like, as shown schematically in FIG. 3. The process for establishing an on-line connection to a website on the Internet is well known and need not be described here in detail. It is essentially analogous to establishing a direct on-line link between the game computer 14 and the central computer 12. In yet other embodiments, the game computers 14 may communicate with the central computer 12 over RF, cable TV, satellite links and the like. For example, in an RF embodiment, communications are simply broadcast in an RF format and transmitted between the game computer 14 and the central computer 12. The same prompting arrangement as with an IVRU 16 may be employed, with the player entering commands instructing the game computer 14 to send a message to the central computer 12 directly through the key pad or joystick of the game computer 14. Similarly, messages may be communicated over a cable TV link directly to a television interfacing with a game console.

It is also anticipated that communications between the game computers 14 and the central computer 12 can be implemented with a physical data memory device such as a smart card, diskette and the like. Moreover, the game computer 14 may communicate with a printer for printing a copy of an outcome, a game screen containing the outcome and any other relevant data such as game statistics and the like, which may be mailed or faxed to the central authority for subsequent certification of the outcome and such data with the central computer 12.

Figure 4A:
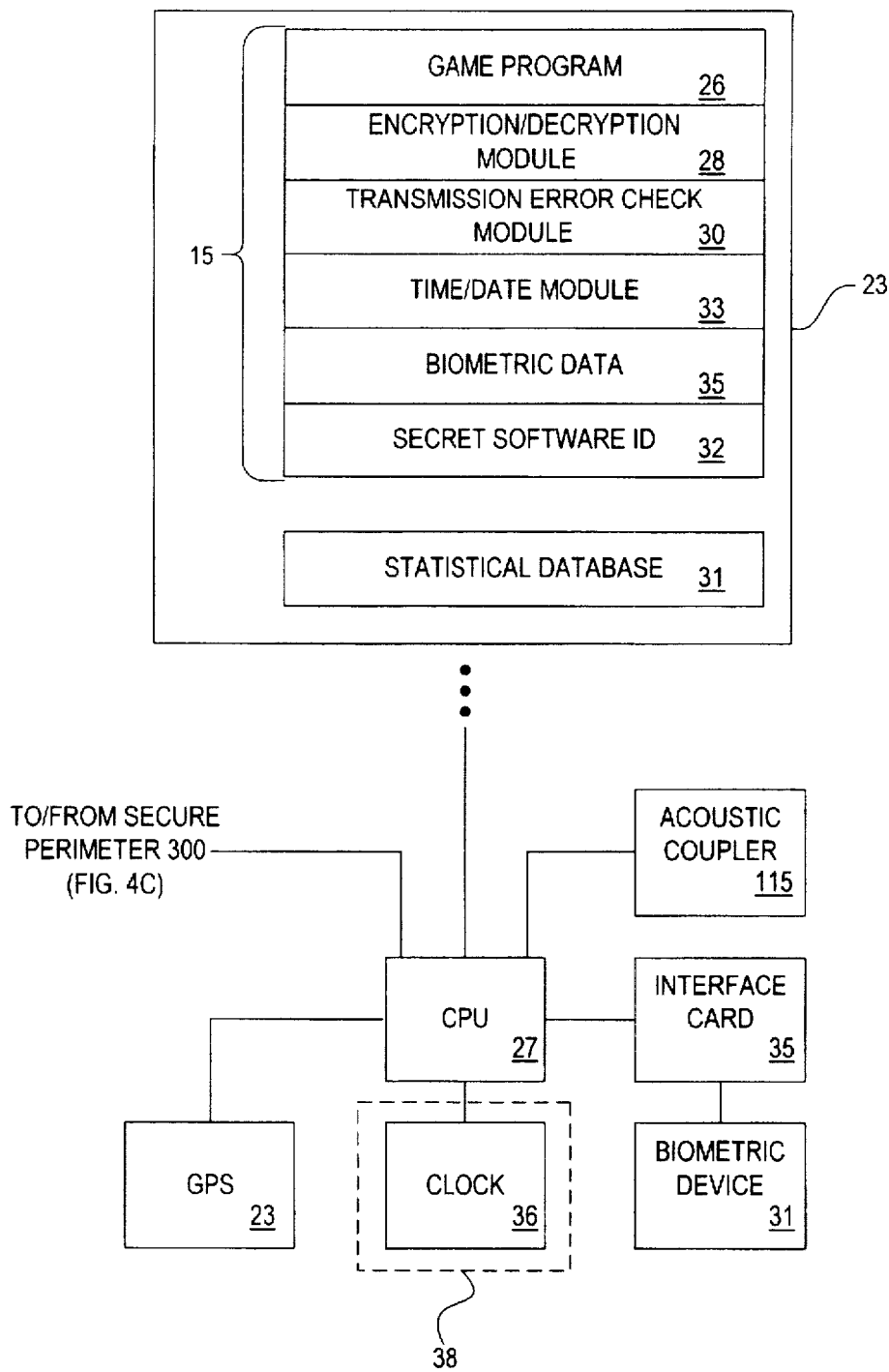
FIG. 4A is schematic of the memory arrangement and general components of the game computer.

Referring now to FIG. 4A, there is shown a schematic of a portion of an illustrative memory arrangement and some hardware for the game computer 14 in the system of the present invention. For convenience, the internal memory 23 of a personal computer 14 is shown. The memory 23 includes RAM and ROM and is coupled to a central processing unit ("CPU") 27 in a conventional manner, and includes a typical operating system (not shown). The CPU 27 and related hardware are typically referred to as a processor. We use the term "associated memory" to indicate that the game computer memory includes both internal and external memory devices such as CD-ROM drives and the like. The processor executes programs from memory in a conventional manner. In the illustrative embodiment, memory 23 contains game software 15 comprised of a game program 26, an encryption/decryption module 28, a transmission error check module 30, a secret software or game computer ID ("SSCID") stored in memory area 32 which uniquely identifies the particular game software 15 and/or game computer 14, a time/date module 33, and biometric data in memory area 35. The game software 15 may comprise a single "program," with the individual elements thereof constituting separate routines. For the purpose of description herein, the term game software 15 can be broadly defined to include a plurality of constituent programs, instructions, routines, databases, etc. The game software 15 may also have an associated non-secret software serial number SSN, the purpose of which will become apparent below. The transmission error check module 30 is used to process all incoming messages to the game computer 14 to detect manual inputting errors, corruption of transmitted data due to communication problems such as line noise and the like, to enable a resend indication or request to be made. The time/data module 33 time-stamps messages using signals from the clock 36. The biometric data stored in memory area 35 is used for player verification, which is described in greater detail below. A dedicated game computer 14 may have all of its components including its associated memory 23, CPU 27 and clock 36 housed in a tamper-resistant and/or tamper-evident enclosure to prevent and reveal, respectively, tampering with any of these components. Tamper-evident enclosures include thermoset wraps which, upon inspection, can reveal any attempt to physically open the structure. Tamper-resistant structures may electronically destroy the memory contents of data should a player try to physically open the structure. These are referred to as secure perimeters and are described below.

The game program 26 generates games of skill of the type known in the art and commonly played in tournaments such as chess, backgammon, bridge, and the like. Other well-known games of skill (e.g., SONIC AND KNUCKLES, VECTORMAN, DONKEY KONG COUNTRY, MORTAL KOMBAT, STREET FIGHTER, etc.) include those played on dedicated gaming machines such as game consoles, in an arcade or other place where such gaming machines reside. The game program 26 may be configured to enable games to be played in a practice mode, in which the outcomes are not certified or part of a tournament. The game program 26 may also be arranged to include teaching modes for instructing players in a manner consistent with the way they play the game or its result.

The game program 26 may compile a statistical database 31 to store tournament game data that specifically relates to the player's actions during the game. For example, the player of a tournament game may have found X treasures, reached Y levels and eliminated Z enemies. This information may be stored and accessed only by the player who enters the proper code or message into the gaming computer 14. This message may be the start message which enables tournament play as discussed below. In a further application, certain aspects of the game, such as, for example, a screen or sequence of events where a player performed a certain move or where a particular opponent was defeated, may be stored and indexed in a database by a certain code to enable the player to call up any one of such screens or sequences at a later time by entering the start message associated with that game (in the case of a tournament) or by some other special command. A menu can be generated upon receipt of the start message or command, enabling the player to select and view the desired screens or particular sequences of events in the game.

The game program 26 may generate races of skill. These include puzzles where the player having the quickest time to completion is declared the winner. A crossword puzzle is a classic race of skill in which players compete to be the first to correctly solve the puzzle. Driving games with lap times also represent races of skill in which the shortest time to the finish line is declared the winner. Referring again to FIG. 4A, to time races of skill, the game program 26 may use a signal from the computer's clock 36 through the time/date module 33 to time-stamp a particular outcome message or to generate a time message which represents the amount of time the player took to complete a given game. In this connection, the clock 36 may be housed within a tamper-resistant and/or tamper evident seal 38. Preferably, a real-time clock 36' is disposed within a secure perimeter 300 as described below. In another embodiment described below, the clock 36' may reside within a dedicated game cartridge 21.

In yet another application, the game program 26 may generate games of chance where the outcomes of such games are submitted and certified in accordance with the invention.

The outcome of a game is defined as the entire set of the results of the game, including a score, time to completion in the case of a race of skill, or a combination of both. Alternatively, the outcome may be comprised of all data relating to the game itself (i.e., data stored in memory that enables the entire game to be recreated). For typical scored games, execution of the game software 15 by the game computer 14 results in an outcome representing the player's score and, optionally, additional game related information such as the number of levels attained, amount of time spent at each level, number of lives lost, number of enemies eliminated and the like. A game may also have multiple outcomes associated with it. In a game of chess, for example, each move may be considered a separate outcome. Each move can be authenticated by the central computer. In some games, an individual's score may be dependent upon the scores of other players. Authenticating one player's outcome thus requires knowing the outcomes of the other players. For a race of skill, such as a puzzle, execution of the game software 15 by the game computer 14 results in an outcome representing the elapsed time it took the player to complete the game and, optionally, other game related information or subsidiary events such as the completion of certain sub-levels in the game and the like.

An outcome may be transformed or incorporated into an authenticatable outcome message AOM (for clarity, a time of completion is transformed or incorporated into an authenticatable time message ATM) by using a variety of cryptographic protocols including one-way hash functions (also known as compression functions, contraction functions, message digests, fingerprints, cryptographic checksums, data integrity checks (DICs), manipulation detection codes (MDCs), and data authentication codes (DACs)), one-way hash functions with encryption keys (also known as message authentication codes (MACs)), digital signatures, and the like, with the encryption/decryption module 28. The practice of using cryptographic protocols to ensure the integrity and security of messages is well known in the art and need not be described here in detail. For reference, one of ordinary skill in the art may refer to BRUCE SCHNEIER, APPLIED CRYPTOGRAPHY, PROTOCOLS, ALGORITHMS, AND SOURCE CODE IN C, (2d Ed, John Wiley & Sons, Inc., 1996). The encryption/decryption module 28 contains algorithms and keys for encrypting, decrypting and/or authenticating messages. Examples of well-known cryptographic authentication protocols are as follows:

Encryption:
  Setup: Central computer 12 and game computer 14 share a secret key.
    1. Game computer 14 encrypts outcome message with the shared secret key to form an authenticatable outcome message AOM.
    2. Communicate authenticatable outcome message AOM to central computer 12.
    3. Central computer 12 reads and decrypts the authenticatable outcome message AOM with the same key.
    4. If the message is intelligible, then the central computer 12 accepts the outcome message as authentic.
  *Encryption may be implemented with an algorithm such as DES (U.S. Government standard, specified in FIPS PUB 46). Encryption may utilize any of several algorithms known in the art such as IDEA, Blowfish, RC4, RC2, SAFER, etc. See *Applied Cryptography*.

Message Authentication Code:
  Setup: Central computer 12 and game computer 14 share a secret key.
    1. Game computer 14 hashes outcome message with a MAC and the shared secret key to form an authenticatable outcome message AOM.
    2. Communicate authenticatable outcome message AOM to central computer 12.
    3. Central computer 12 reads the AOM and hashes the message with the shared secret key.
    4. If the generated hash matches the received hash, the central computer 12 accepts the outcome message as authentic.
  *Any of the MAC algorithms, such as, for example, DES, CBC and the like may be applied in this application.

Encryption with a Public Key
  Setup: Game computer 14 has a public-key/private key pair. The central computer 12 knows the game computer 14's public key.
    1. Game computer 14 encrypts outcome message with the private key to form an authenticatable outcome message AOM.
    2. Communicate authenticatable outcome message AOM to central computer 12.
    3. Central computer 12 decrypts the AOM with the public key of the game computer 14.
    4. If the message is intelligible, the central computer 12 accepts the outcome message as authentic.
  A sample algorithm for this procedure is RSA.

Signing with a Public Key
  Setup: Game computer 14 has a public-key/private key pair. The central computer 12 knows the game computer 14's public key.
    1. Game computer 12 signs the outcome message with the private key to form an authenticatable outcome message AOM.
    2. Communicate authenticatable outcome message AOM to central computer 12.
    3. Central computer 12 verifies the signature using the outcome message and the public key. The mathematics of verification indicates whether the outcome message is authentic.
    4. If the outcome message is intelligible, then the central computer 12 accepts the outcome message as authentic.

There are several ways to ensure that an authenticatable outcome message AOM is "fresh" (i.e., it has been used more than once). In the first, known as "challenge/reply", the central computer 12 generates a random or sequence number (also referred to as a "nonce") and communicates it to the game computer 14. The game computer 14 then incorporates this random number in the authenticatable outcome message AOM. If the random number received matches the random number just generated, the central computer 12 accepts the message as fresh, i.e., an old message would contain a different random number.

In another method, the game computer 14 includes a sequence number in the authenticatable outcome message AOM. This sequence number is incremented by one every time the game computer 14 generates an authenticatable outcome message AOM. The central computer 12 stores the most recent sequence number in memory. It accepts the current outcome message if the sequence number received is one greater than the stored sequence number.

In yet another implementation, the game computer 14 includes the current time in the authenticatable outcome message AOM. The central computer 12 then checks the time associated with the authenticatable outcome message AOM against the time from the central computer's associated clock. If the times are within a prescribed window, the current outcome message is accepted as fresh.

In still another procedure, the game computer 14 includes a random number in the authenticatable outcome message AOM. The central computer 12 maintains a database of all random numbers received from the game computers 12. If the new random number is not in that database, then the current authenticatable outcome message is accepted as fresh. If a time element is incorporated as well, then the central computer 12 only has to store a relatively small quantity of unexpired messages.

Figure 4B:
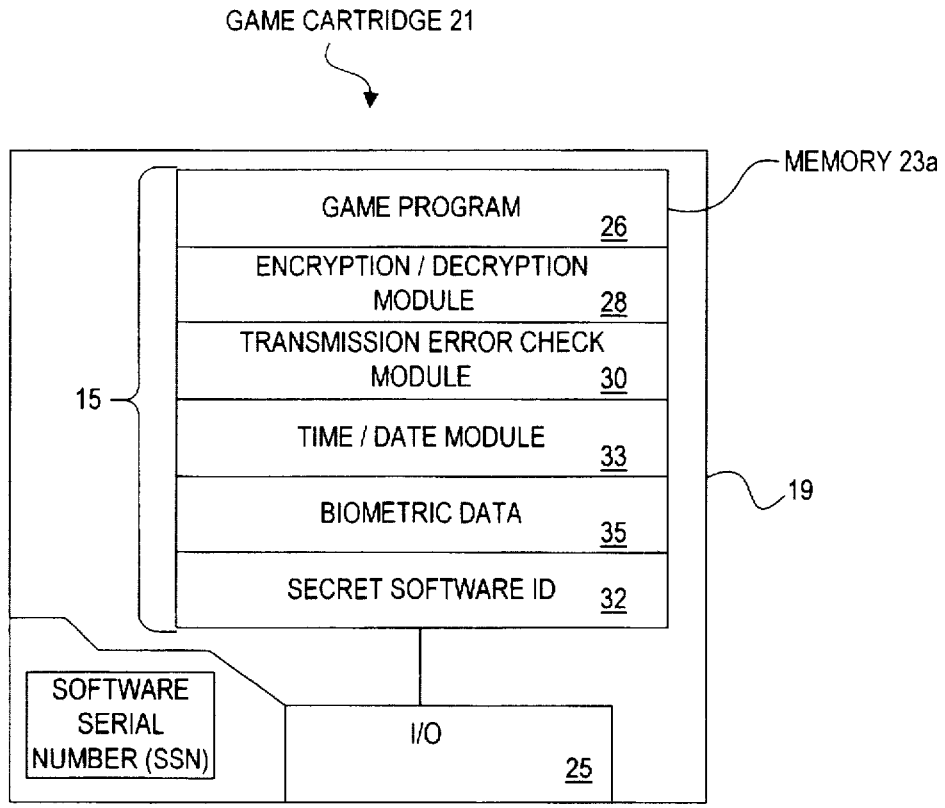
FIG. 4B is a schematic of a game cartridge in one embodiment.

In FIGS. 4A and 4B, the encryption/decryption module 28 is depicted as part of the game software 15. In that embodiment, the encryption/decryption module 28 only refers to encryption/decryption algorithms and keys. The actual processing of data to implement the cryptographic protocols takes place in the game computer's CPU 27. Preferably, as shown schematically in FIG. 4C, the entire encryption/decryption module 28 resides within a secure perimeter 300.

Figure 4C:
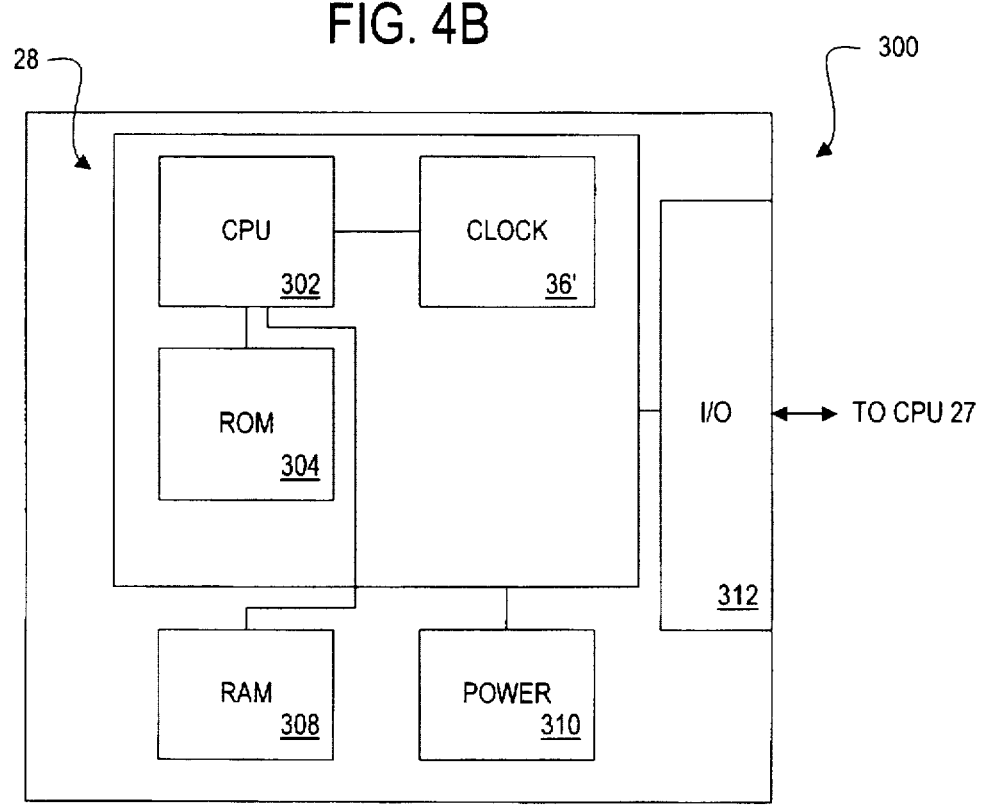
FIG. 4C is a schematic of a secure perimeter for the encryption/decryption module.

A secure perimeter is a defined physical area of hardware which is tamper-resistant and/or temper-evident, in which resides data or algorithms whose characteristics must not be alterable in order for a system to remain secure. Examples of secure perimeters include U.S. military encryption devices such as the STU-III telephone made by Motorola and AT&T, and the iPower® card, available from National Semiconductor Corp. The latter is a dedicated encryption/decryption device embodied in a PCMCIA card which can interface with the game computer 14 through, for example, the game computer's PCMCIA socket. Referring to FIG. 4C, it includes a 32-bit CPU 302 with ROM 304 containing encryption algorithms, a real-time clock 36' and an interface with an off-chip battery (310)—backed RAM 308 which holds encryption data and key information. Any attempt to tamper with or get at the encryption data stored within the device results in a memory loss of that data. Moreover, the I/O pins 312 of the device are electrically isolated to prevent pin-level probes, and the chip itself contains mechanical and chemical protection to prevent chip-probing equipment from accessing the encryption information from the processor directly. Thus, all encryption/decryption functions are performed in the secure perimeter and not in the CPU 27 of the game computer 14. Control of the secure perimeter 300 by the game computer 14 and communications between the CPU 302 of the secure perimeter 300 and the CPU 27 of the game computer 14 are known in the art and need not be described here in detail. When the secure perimeter 302 is called upon by the game computer 14 to generate an authenticatable outcome message, authenticate an authenticatable outcome message, and/or perform any other required functions, the CPU 27 of the game computer 14 sends the appropriate signals to the CPU 302 of the secure perimeter 300. The secure perimeter 300 may be used to subsequently authenticate the authenticatable outcome messages AOMs that it generates, as well as authenticatable outcome messages AOMs from any other game computer 14 in the system. It may also be used to time-stamp messages or track times to completion for races of skill with the clock 36'.

External secure devices such as the aforementioned iPower cards are also known as "tokens" A token is a physical computing device used by individuals to gain access to protected electronic resources. Intelligent security tokens may be utilized to prevent unauthorized player access to the game computer 14, as well as for implementing the encryption/decryption functions for outcome authentication and certification. The iPower card described above, is an example of a token in a secure perimeter.

Other such tokens include the SMARTDISK, manufactured by SmartDisk Security Corporation. The SMARTDISK contains a CPU and memory used for encrypting and decrypting data. Thus, as with the iPower card, the encryption/decryption module 28 may reside in the SMARTDISK. The SMARTDISK requires a user password to function. Thus, access to the system requires the player to physically possess the token and know the proper password. Smart cards are similar tokens. They are shaped like credit-cards, but contain an embedded microprocessor for implementing various security functions.

Another type of token called TOUCH MEMORY is manufactured by Dallas Semiconductor Corporation. This device consists of a computer chip housed within a small button shaped stainless steel case. The case may be ring-shaped and worn around a player's finger. The chip contains up to 64 kb of RAM or EPROM, sufficient to store a plurality of cryptographic keys. The device transmits data bidirectionally at 16.3 kb per second when placed into contact with a reader device. Each chip contains a unique serial number that is laser-etched into the chip at the time of manufacture. Keys from the device may be used in any of the cryptographic protocols described herein for authentication and/or encryption, as well as for user identification. The DS1422 UNIQUEWARE product can be configured to transparently decrement each time that the device is used, allowing players to obtain and store a limited number of start messages, for example. The DS1427 configuration includes a tamper-resistant real-time clock 36' that may be utilized in the different applications described herein.

In yet another embodiment, a player may obtain a joystick which has a unique identifier associated with it. The joystick identifier may be used as a key in the cryptographic protocols described herein, or to enable the player's game software 15 to generate a certified or tournament game. The key may be stored on a ROM chip within the joystick. When the game software 15 loads instructions to generate the game into the RAM of the game computer 14, the key from the joystick is loaded into RAM and verified. If the proper key is not found, the game software 15 may be disabled. This is conceptually similar to a "dongle." Alternatively, the joystick may have an associated input/output interface for accepting data from and communicating data to a secure perimeter such as an iPower card. Thus, the authentication protocols may take place within the structure of the joystick. This approach is described in more detail in an alternative embodiment below.

A dongle is simply a memory media device that plugs into any port on a PC. A dongle typically contains keys which are required to enable software to operate on a computer. With regard to the present invention, the keys and algorithms used by the encryption/decryption module 28 may reside in a dongle.

Figure 4D:
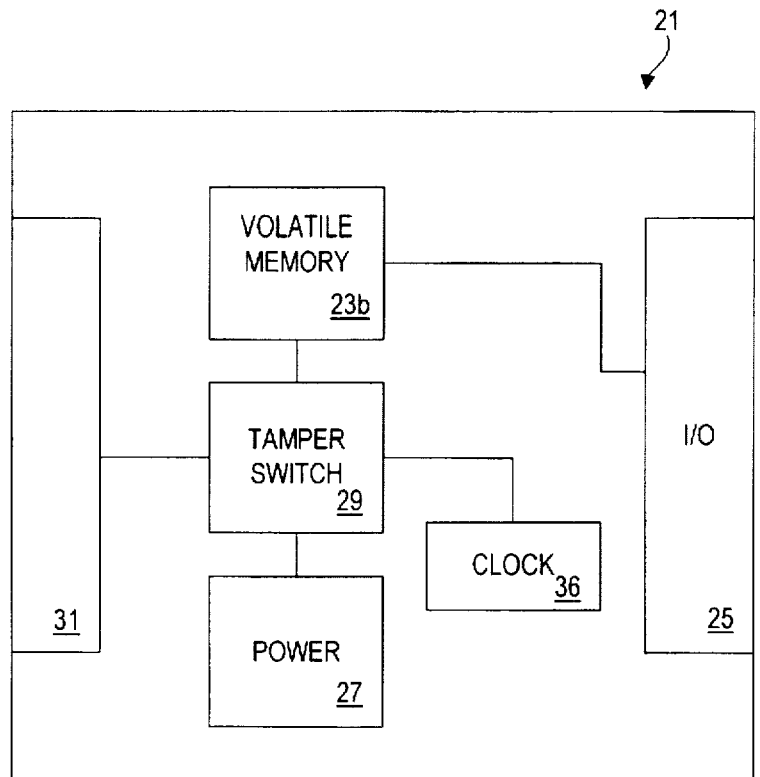
FIG. 4D is a schematic of a game cartridge in another embodiment.
Figure 4E:
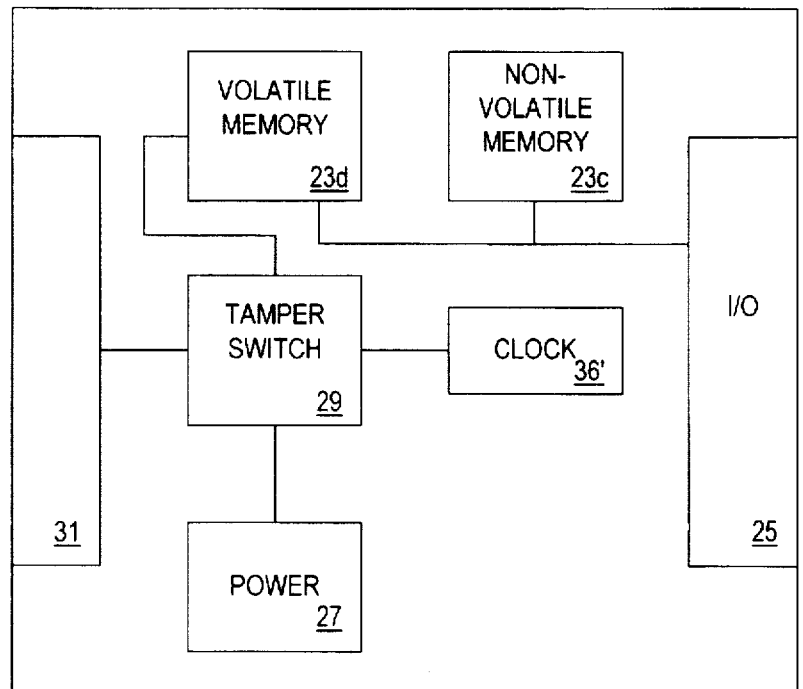
FIG. 4E is a schematic of a game cartridge in still another embodiment.
Figure 4F:
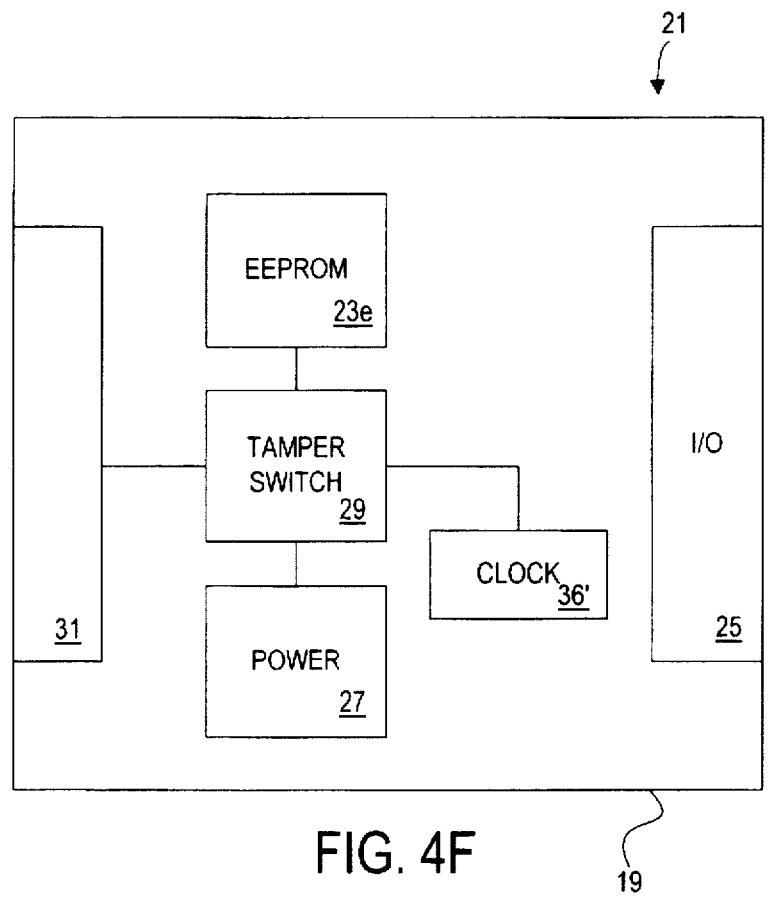
FIG. 4F is a schematic of a game cartridge in yet another embodiment.
Figure 4G:
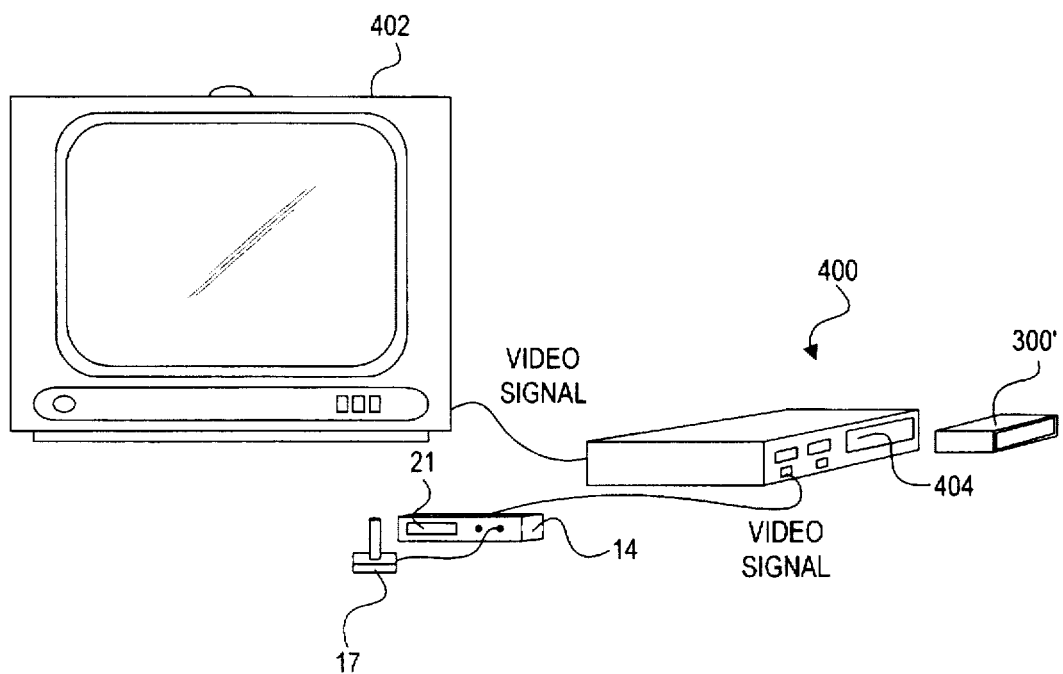
FIG. 4G is a schematic of an embodiment utilizing a secure perimeter and VCR in connection with a game console type game computer.
Figure 4H:
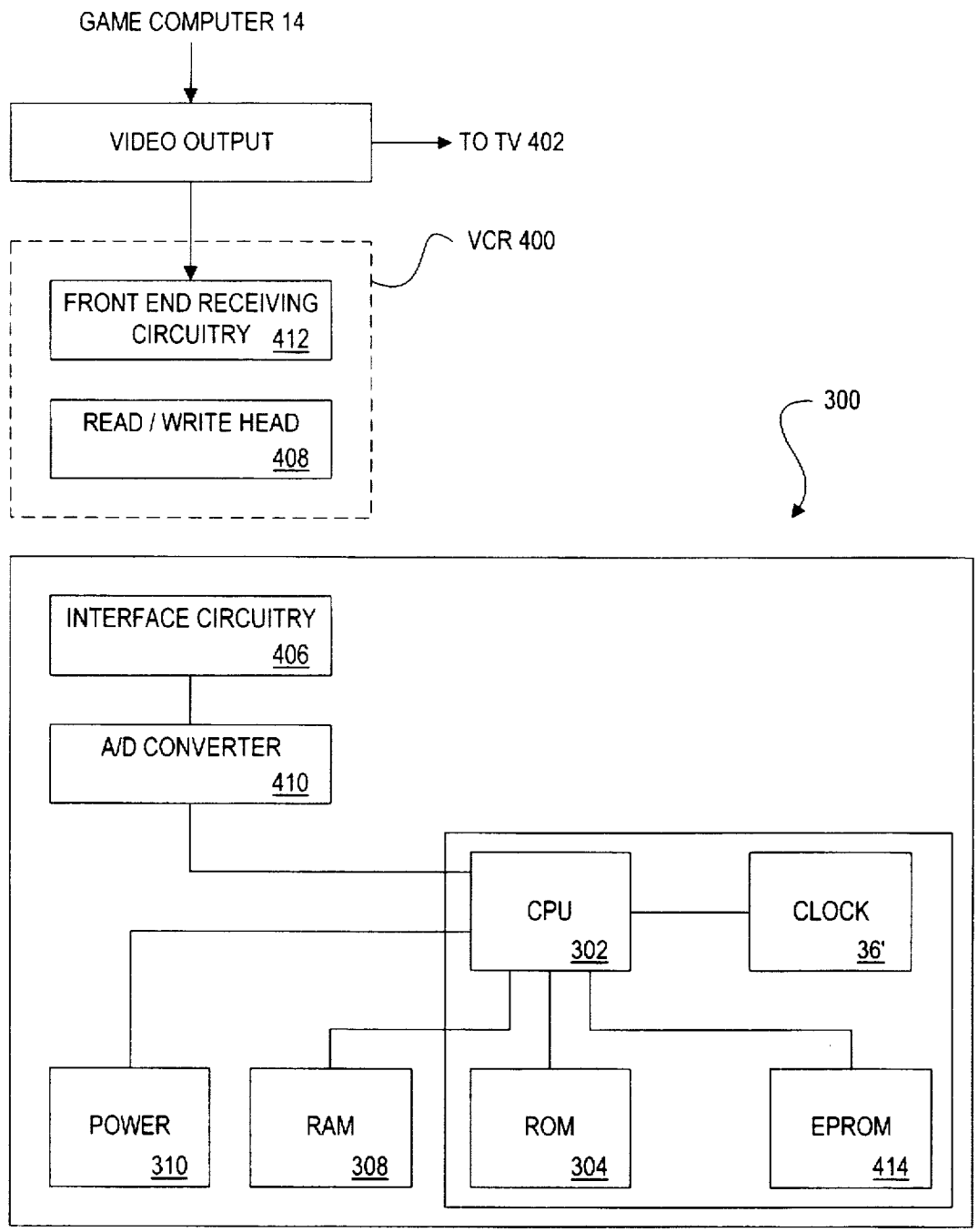
FIG. 4H is a schematic of the secure perimeter/VCR interface.

For game console applications, a secure perimeter 300' may be adapted to interface with a VCR unit 400 as shown schematically in FIGS. 4G and 4H, to enable cryptographically protected recording and playback of games generated on the game computer 14. In this embodiment, the video output signal from the game computer 14 is communicated to a video input on the VCR 400, and a video output signal from the VCR 400 is communicated to a television 402 in a conventional manner. The secure perimeter 300' is configured to fit into a standard VCR slot 404. As described above, the secure perimeter 300' includes a CPU 302 with ROM 304 containing encryption algorithms, a real-time clock 306 and an interface with an off-chip battery (310)—backed RAM 308 which holds encryption data and key information. The secure perimeter 300' further includes interface circuitry 406 for communicating signals from the read/write head 408 of the VCR 400 via an analog/digital ("A/D") converter 410 to the CPU 302. Video information is typically communicated to the television 402 in an RF format. The RF video signal may be processed in the VCR 400 by the front-end receiving circuitry 412, which demodulates the video signal to a base-band signal as is well-known in the art. Normally, the demodulated information is what is recorded on a VCR tape cassette. In the inventive application, the base-band video signal data is converted to digital format by the A/D converter 410, encrypted with a secret key, and stored in the non-volatile memory such as an EPROM 414. For playback, the secure perimeter 300' authenticates the game data, for example by decrypting the data with the corresponding public key, and the authenticated game data is then processed to generate a video signal. The secure perimeter 300' may also contain software instructions in ROM for generating an authenticatable outcome message AOM to be used as described hereinbelow. This authenticatable outcome message AOM may be included in the video signal to appear on the television screen at the end of the game.

Referring now to FIG. 4B, there is shown a schematic of a game cartridge 21 for use with the system of the present invention. The game cartridge 21 includes a housing 19 that contains the game software 15 in a ROM 23a built into the cartridge, and the ROM 23a interfaces with the game computer 14 via an I/O interface 25 in a conventional manner. The software serial number SSN may be displayed on the exterior of the cartridge housing 19 as shown. The game software 15 in the case of typical games such as those offered by Sega and Nintendo, includes a game program 26 which offers the player a choice of a tournament enabled game or a non-tournament enabled (regular) game. Tournament enabled games may be generated with the "cheat codes," typically used by developers in testing the game, disabled in the game program 26. In addition, certain play aspects of the game which usually occur in some known sequence or have some known characteristics (such as the location of bonuses or certain challenges), may be changed in the tournament version of the game to ensure that the game is less predictable than that of the regular version. Game cartridges may also contain game software 15 configured for one-time or limited time use.

Referring now to FIG. 4D, a game cartridge 21 contains the game software 15 in volatile memory 23b. The volatile memory 23b is connected to the I/O interface 25 in a conventional fashion. The volatile memory 23b is also connected to a power source 27 via a tamper switch 29. The tamper switch 29 is coupled to the cartridge housing 19, at the interface shown schematically at 31, so that any attempt to break open the cartridge housing 19 causes an interruption in power from power source 27 to volatile memory 23b, thereby causing all program data stored in volatile memory 23b to be erased. The tamper switch 29 may take many forms, depending upon the configuration of the game cartridge 21. In an exemplary embodiment, the tamper switch 29 is adapted to the cartridge housing 19 such that a physical incursion simply causes the tamper switch 29 to open. Alternatively, the tamper switch 29 may consist of a photocell sensitive to a certain level of light that causes a power interruption if the cartridge housing 19 is opened. In either case, an interruption of power to the volatile memory 23b causes all stored program data to be erased. This procedure is well-known in the art for securing computer memory devices. The clock 36 may also be housed within the game cartridge 21 such that any attempt to alter the clock 36 results in a loss of program data stored in volatile memory 23b.

Referring now to FIG. 4E, all game software data (excluding the encryption/decryption module 28) is encrypted and stored in non-volatile memory 23c, while the encryption/decryption keys and algorithms (encryption/decryption module 28) are stored in volatile memory 23d. Thus, any action which triggers the tamper switch 29 causes an interruption in power and the encryption/decryption module 28 stored in the volatile memory 23d to be erased. Without the encryption/decryption module 28, the encrypted data stored in the non-volatile memory 23c is useless.

In another embodiment shown in FIG. 4F, the game software 15 resides in an electrically erasable and programmable read only memory (EEPROM) 23e. If the cartridge housing 19 is opened, the tamper switch 29 closes and an erase signal from power source 27 causes the data stored in the EEPROM 23e to be erased. The practice of erasing data in an EEPROM is well known and need not be discussed in detail here.

It will also be appreciated that special enhanced security tournament cartridges 21 may be supplied to players for advanced rounds of competition in connection with any tournament.

Referring again to FIG. 4A, as a means of obtaining information as to where games are being played for compiling various tournament statistics and/or for preventing game play when the game computer 14 resides in certain locations, the game computer 14 may communicate with or have an integral Global Positioning System ("GPS") 23. A GPS receiver derives positional information from a plurality of satellites. The GPS information may be used to prevent game play in certain locations by providing a location lockout feature in the game software 15. When the player attempts to begin a game on the game computer 14, the game software 15 queries the GPS 23 and checks whether the current location of the game computer 14 is within an allowed area. This allowed area may be incorporated into the game software 15. If the game computer 14 is found to be outside of an allowed area, the game software 15 directs the game computer to deny player access to the game. In a different application, the positional information may be incorporated into the authenticatable outcome message AOM and uploaded to the central computer 12 when a player submits his or her game outcome. In this regard, the central computer 12 can use the positional information for ranking/rating players without requiring submission of the player's specific location (i.e., the home address), and/or for compiling statistical location data. The central computer 12 can ascertain which state, municipality or even town where the game computer 14 was located or, if the player was mobile, all areas where the player was located when the player played the game, either by uploading the information from the game computer or by accessing a database containing such information. Most GPS receivers have the capability to store a sizeable amount of data. Typical handheld GPS receivers used in aviation applications can store enough information to save positional data for an entire flight. Although current GPS satellites are subject to having their GPS signals degraded by the military without notice, future civilian systems that are currently under development will be capable of providing consistently accurate positional information to within a few feet.

To preclude player substitution, biometric identification devices such as a fingerprint reader, voice recognition system, retinal scanner and the like, may be used to provide absolute player identity verification at the game computer 14. An example of such a device is the FC100 FINGERPRINT VERIFIER 31 available from Startek, a Taiwanese company. The FC100 is readily adaptable to any PC via an interface card 35. The fingerprint verifier 31 utilizes an optical scanning lens. The player places his or her finger on the lens, and the resulting image is scanned, digitized, and the data compressed and stored in memory location 35. Typically, a 256 byte file is all that is required. Each live-scan fingerprint is compared against the previously enrolled/stored template. If the prints do not match, access to the system can be denied. This procedure may be implemented before the initiation of a tournament game, during the game in response to prompts from the game software 15 at some predetermined or random times, or continuously by incorporating the scanning lens into a joystick on the game computer 14 such that the player is required to maintain his or her finger on the lens at all times during the game for continuous verification. The fingerprint data may also be registered and stored in the central computer 12 (either in its compressed form or as hash value) in a player information database for player identity verification during various protocols, and/or used as a key as described below.

A voice verification system which utilizes a person's "voice-print" may also be used to provide player identity verification at either or both the central computer 12 and the gaming computer 14. The process of obtaining a voice-print and subsequently using it to verify a person's identity is well-known in the art, and therefore need not be described in detail herein. One of ordinary skill in the art may refer to SpeakEZ, Inc. for voice identification/verification technology. Specifically, speaker identification software is utilized to take a sample of the player's voice. This sample is stored in the central computer 12 in the player information database. Each time the player calls the central computer 12, it prompts the player to speak his or her name into the telephone 18. The speaker identification software then directs the central computer 12 to check the player's current voice-print against the voice-print stored in memory. If there is a match, the procedure continues. This is described in more detail below. The voice-print may also be stored in a database in the game computer 14, to verify the player's identity at that location prior to allowing game play without the central computer 12. This is also described in more detail below.

Figure 5:
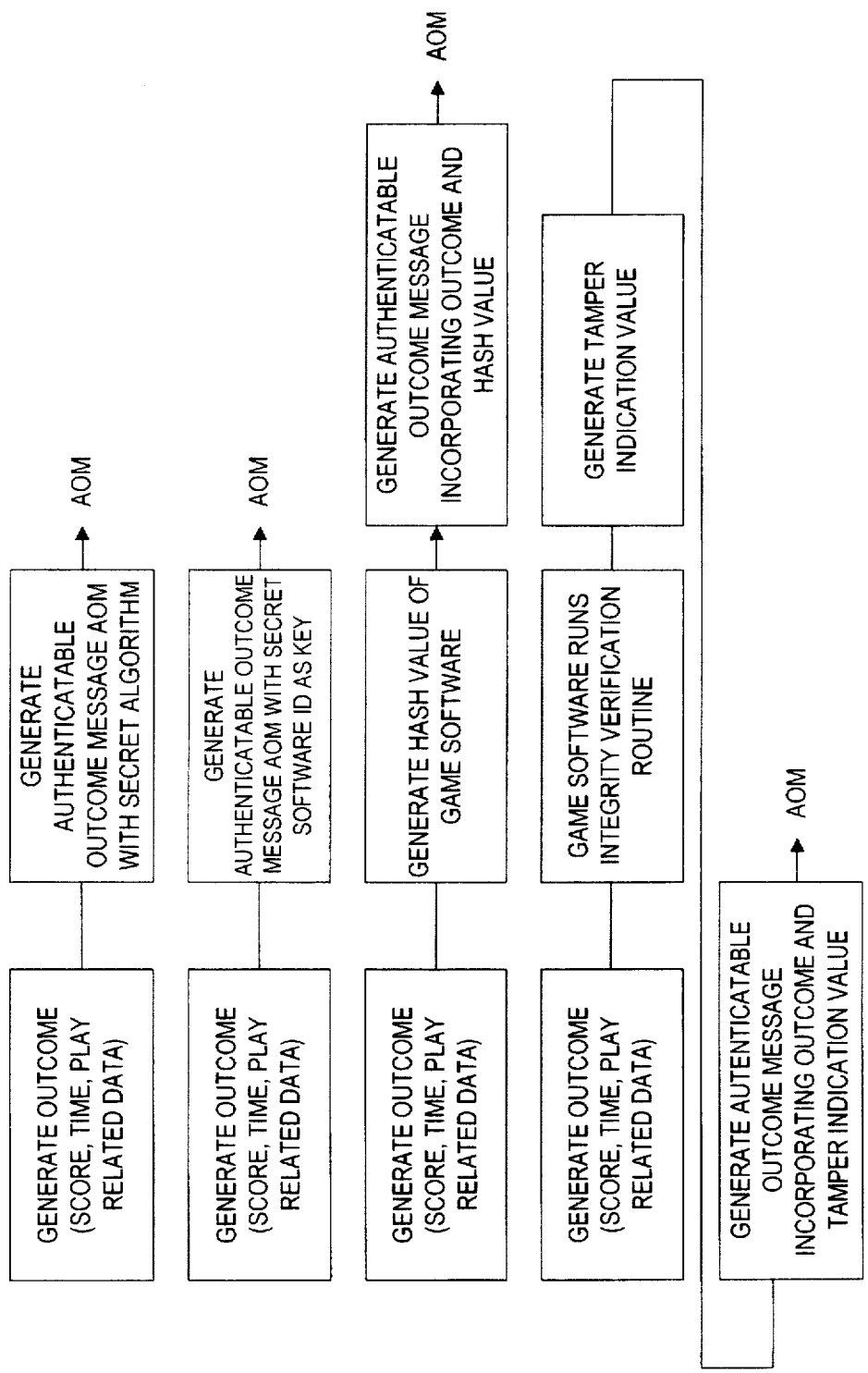
FIG. 5 is a flow-chart of various authenticatable outcome message generation protocols.

Referring now to FIG. 5, there are shown several exemplary ways in which the game computer 14 can generate an authenticatable outcome message AOM. At the conclusion of the game, an outcome (e.g., a score) is displayed. In one embodiment, the outcome may simply be embodied in a code generated using any secret algorithm. This algorithm is not readily ascertainable or known by the player. It resides in the game software 15 or in a separate encryption/decryption module 28, and in the central computer 12.

Accordingly, when the player seeks to register an outcome of, for example, 1,000,000 points for game XYZ, the game computer 14 generates an authenticatable outcome message AOM, for example, 21328585, with the secret algorithm. The central computer 12, the same game computer 14, or any other game computer 14 applies an inverse of the secret algorithm to the authenticatable outcome message 21328585, or the same algorithm to the score of 1,000,000 points for that game, and if the results match, the authenticity of the outcome is verified. Thus, an outcome cannot be created or guessed without actually playing a game on a game computer 14 with the software that contains the secret algorithm. In a preferred embodiment, the encryption/decryption module 28 generates an authenticatable outcome message incorporating the outcome (and any play-related data) using the SSCID as an encryption key. This encryption of the outcome (and play related data) with the SSCID enables authentication of the outcome with respect to the particular game software 15 or game computer 14. Alternatively, the SSCID is combined with the outcome and the combination is incorporated into an authenticatable message with a different key. In this regard, the encryption of the outcome and SSCID may utilize the biometric data scanned with the fingerprint verifier 31 or obtained from the voice print system as described above as a key. In this manner, the player's identity may be verified in the authentication process. While the secret game software or computer ID, SSCID, is not made known to the player, it is possible to generate a known serial number based upon the secret number. In this connection, after the player powers up the game computer 14 for the first time, it implements a registration process. The SSCID is encrypted by the encryption/decryption module 28 and displayed on screen. The player calls the central computer 12, and enters the SSCID, along with his or her name and/or PIN. The central computer 12 then decrypts the SSCID and associates it with the player's registration information. The central computer 12 then generates a unique random number RS which is tied to the SSCID. The player writes this number down, and can use the same to identify his or her game computer 14 when authentication is not required. The same procedure can also be used to generate known serial numbers for secret software numbers. Software can also be tied to hardware. A player can be forced to register his new software before he plays the first game. In this regard, the game computer 14 displays the SSCID in encrypted form. The player calls the central computer 12 prior to initiating play. The SSCID is added to the player information database 48, and is then used in the authentication process of any outcome as described herein. This ensures that the player can only submit an outcome for authentication/certification when using his or her game computer and/or game software 15. Use of another player's game software 15 and/or game computer 14 will cause the authentication process to fail.

In yet another implementation, an outcome may be represented by other data or symbols which are intelligible only to the central computer 12, but not to the player. For example, the score 5000 is represented by symbol data comprised of three green dots, four brown squares and two purple triangles. After communicating the score to the central computer 12, the player is required to send this data for confirmation of the outcome. The player is unable to determine whether this combination corresponds to the same score, a higher score or a lower score. But the central computer 12 is able to decipher these symbols to determine if, in fact, they represent the same outcome submitted for certification in accordance with some secret coding protocol.

Alternatively, the player is not provided with an actual score. The score is secret, and is revealed to the player by the central computer only after it interprets the symbol data. This is similar to encrypting or encoding the outcome.

In the case of tournaments, the authenticatable outcome message AOM may prove tournament validity, by including data representing that the outcome was the result of a valid tournament game. This data may constitute a subliminal message within the authenticatable outcome message AOM. Alternatively, the authenticatable outcome message AOM may include all or part of the authenticatable start message ASTM for initiating tournament play for this purpose.

Authenticatable outcome messages AOMs may also contain statistical data for enabling the sanctioning authority to compile market research information. This data may be compressed by the game computer 14, and decompressed by the central computer 12.

The game software 15 may be adapted to instruct the game computer 14 to save game play up to a certain point in a game, and to resume play from that point at a subsequent time. In this regard, a "resume code" may be generated, which enables a player to pick up a game from where he left off. The game play to a specific point may be stored entirely in non-volatile memory. Alternatively, the game computer 14 may generate an authenticatable outcome message AOM that represents the game outcome to this point. This allows for a first player to "hand off" the AOM to the next player who continues the game. Such an arrangement is analogous to a relay-race scenario where a player runs a certain distance and then hands off an object to the next runner. It also enables the same player to resume game play without having to store the large amount of data representing the game play to the point of termination. Since game programs generate games that are typically segregated into various levels, where the player advances from level to level as the game proceeds, this "code" may be used to instruct the game software 15 to continue from any given point. When the player selects a "quit" or "end game" option, if the player desires to continue the same game at a subsequent time, he inputs the authenticatable outcome message AOM into the game computer 14. If it is authenticated, then game play proceeds from the prior termination point.

To prove integrity of the game software 15 through the outcome certification process (i.e., that it has not been tampered with), digital signature protocols may be utilized. In this regard, a digital signature algorithm with a private or secret key is employed to "sign" a message. This message may be a hash value of the software generated with a one-way hash function, a compressed value of the software code produced by a compression algorithm, and the like. The signed message is then verified using the digital signature algorithm with a public key at the central computer 12, the same game computer 14 or any other game computer 14 in the system. The secret key may reside in the encryption/decryption module 28, and preferably, the encryption/decryption module 28 resides in a secure perimeter 300 as discussed above. The secret key may be the SSCID, and/or a hash or compressed value of the digitized biometric fingerprint data or voice print described above. The public keys may be contained in the KDC at the central computer 12 as mentioned above, to enable players to verify the digital signature of the software at their respective game computers 14.

In an exemplary embodiment, the encryption/decryption module 28 generates a hash value of the software instructions which make up all or part of (i.e., game program 26) the game software 15. This hash value is incorporated into the authenticatable outcome message AOM. The hash value is generated using a one-way hash function which operates on a numerical representation of the game software 15. An example of a one-way hash function is the Secure Hash Algorithm ("SHA"). SHA is a U.S. government standard, and is specified in FIPS PUB 180 of the National Institute of Standards and Technology. Other examples of hash algorithms include MD4, MD5, RIPE-MD, Haval, etc. One skilled in the art may refer to *APPLIED CRYPTOGRAPHY*. As a specific example, each character of the game software 15 may be converted to ASCII values and then into a binary series of 1s and 0s. An exemplary one-way hash function may operate on this series as follows: (1) exchange the positions of all 1s and 0s; (2) group the digits into blocks of 64 digits each; (3) raise each block to the 5th power and then truncate the result to 64 digits; (4) take the final complete number and square it; (5) convert this binary number to base ten; and (6) take the last 24 digits as the hash value. The initial hash value for any given copy of the game software 15 is created prior to sale or distribution, and may be stored in the central computer 12, or even publicly known. This hash value may be derived from a different one-way hash function for each copy of game software 15 sold. If the player attempts to alter the game software 15 by tampering with the software instructions to produce a more favorable game outcome (i.e., a higher score or faster time to completion), such modifications to the game software 15 will be evidenced by the mismatch between the newly generated hash value and the initial hash value stored in the central computer 12.

Figure 6A:
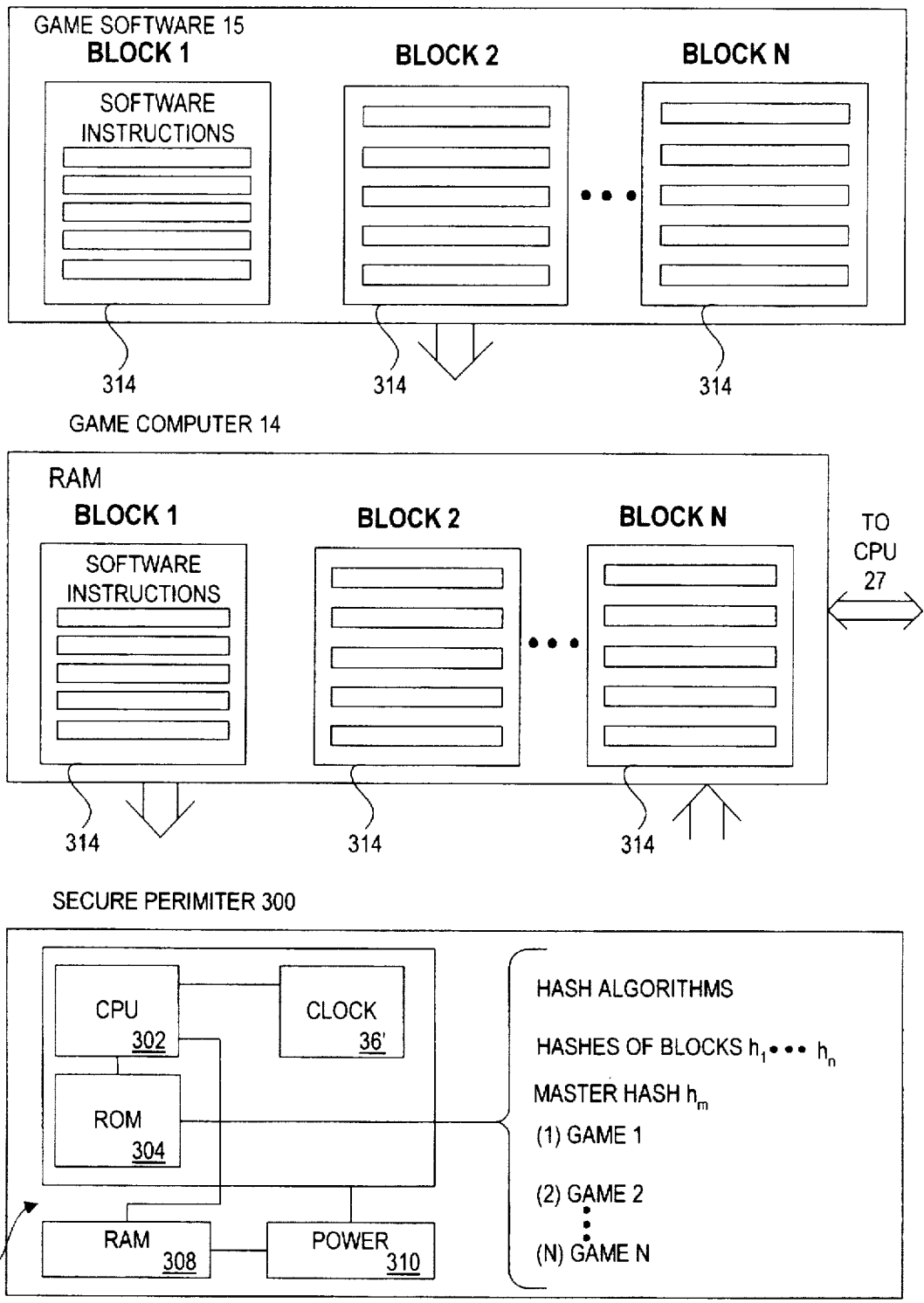
FIG. 6A is a schematic of an exemplary software integrity check.
Figure 6B:
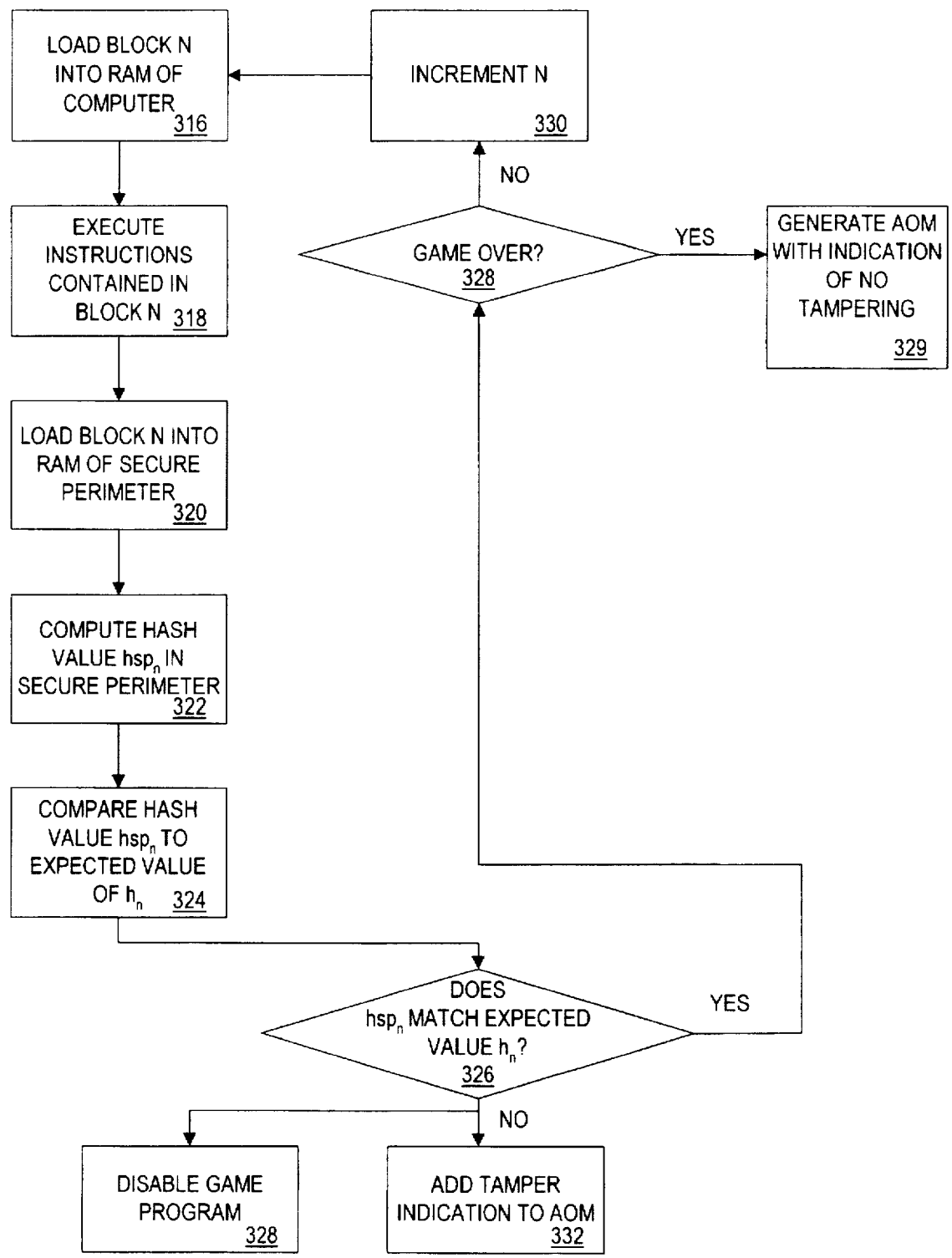
FIG. 6B is a flow chart of the software integrity check in the embodiment depicted in FIG. 6A.

Since the game software 15 may be tampered with while the software instructions reside in the volatile read-write memory (i.e., RAM) of the game computer 14, tampering may not be detected by just generating a hash value of the entire game software 15 at the end of a game. One way to detect and provide evidence of tampering of the game software 15 while it resides in RAM, is to have the secure perimeter 300 periodically check blocks of the game software 15. In this connection, referring now to FIGS. 6A and 6B, the game software 15 may be configured with n blocks 314 of instructions, where each block 314 has an associated hash value $h_1 \ldots h_n$ determined by using a one-way hash function. Similarly, a master hash value $h_m$ of all the block hash values $h_1 \ldots h_n$ is also determined using a one-way hash function. These values may be stored in the ROM 304 of the secure perimeter 300. The secure perimeter may store such values for many different games. At step 316, a block is loaded into the RAM of the game computer 14, and its instructions are executed at step 318. When the block 314 of software instructions is to be replaced in the RAM of the game computer 14, that block 314 is read by and loaded into the RAM 308 of the secure perimeter 300 at step 320. The secure perimeter 300 calculates a hash value $hsp_n$ of that block 314 using the one-way hash function at step 322, and the computed hash value $hsp_n$ is compared to the known hash value $h_n$ for that block 314 stored in the ROM 304 of the secure perimeter 300 at step 324. If the computed block hash value $hsp_n$ matches the expected value $h_n$, and the game is not over at step 328, the next block of instructions 314 that replaces the previous block, represented by incrementing n at step 330, is loaded into the RAM of the game computer 14. If a block hash value $hsp_n$ does not match $h_n$ at step 326, the secure perimeter 300 can do several things. It can send a message to the game computer 14 to disable the game program 26 at step 328. Alternatively, the secure perimeter 300 generate a tamper indication which is included at the end of the game in the authenticatable outcome message AOM at step 332, or, if no tampering is detected, it can generate a non-tampering indication which is included in the authenticatable outcome message AOM at step 329. Thus, when the player attempts to submit an outcome for certification which was obtained with tampered game software 15 as evidenced by the tamper indication, the central computer 12 can reject the outcome. The secure perimeter 300 may alternatively calculate a master hash value $hsp_m$ based upon all of the individual block hash values $h_1 \ldots hsp_n$ that were calculated as each block 314 was examined. This master hash value $hsp_m$ may then be compared to the expected master hash value $h_m$ stored in the ROM of the secure perimeter 300. If the master hash values do not match, the secure perimeter 300 can generate a tampering indication which is incorporated into the authenticatable outcome message AOM. Alternatively, the master hash value $hsp_m$ itself may be incorporated into the authenticatable outcome message AOM, and subsequently verified at the central computer 12 as described above.

In the case of a dedicated game computer 14 (i.e., a game console), where it is more difficult to access and alter software instructions while loaded in RAM, or where the requisite level of security is not great, the secure perimeter 300 may not be required. However, there exists a problem unique to game consoles in the form of the GAME GENIE video game enhancing device. The GAME GENIE is an interposing device that connects between a game cartridge 21 and the game computer 14. In a game console application, the game software 15 resides in the ROM of a dedicated game cartridge 21. The interposing device enables a player to temporarily change certain game play-features by altering program instructions that are loaded from the ROM of the game cartridge 21 into the RAM of the game computer 14. These changes are not permanent, and disappear when the power to the game computer 14 is turned off. This provides a unique challenge in the context of the present invention, where the certification aspects rely, in part, on verifying the integrity of the game software 15. The present invention overcomes the interposing device problem by utilizing one-way hash functions and encryption in authentication protocols.

As in the above example incorporating one-way hash functions, the game software contains n blocks 314 of software instructions, where each block 314 has an associated hash value $h_1 \ldots h_n$ and the entire set of instructions has a master hash value $h_m$ computed by applying the individual hash values $h_1 \ldots h_n$ to a one-way hash function. The hash value of each block may be determined with the same or a different one-way hash function. One of the blocks 314 may contain a list of all hash values for the other blocks, the master hash value $h_m$, and the hash function or functions used for calculating each block hash value and the master hash value. As described above, the master hash value $h_m$ may be stored in the game software instructions, or can be input by the player into the game computer 14 at the start of a game. Thus, the master hash value $h_m$ is checked at game start by initially computing the master hash value $hnew_m$ from the values $h_1 \ldots h_n$ to determine whether it matches the value which is either stored in the instructions or input by the player. If the interposing device was used to modify any of the instructions, the computed master hash value $hnew_m$ will not match the input master hash value at the game start. To ensure that the interposing device does not subsequently alter software instructions as they are loaded into RAM, the game software 15 contains instructions that direct the CPU 27 to compute the hash value $hnew_j$ of each block j as it is to be replaced in RAM, and a recalculated master hash value $hnew_m$ based upon the new hash value for block j and the known hash values of all the other blocks. The calculated master hash value $hnew_m$ is then compared to the known master hash value $h_m$ in the hash block. If at any time a discrepancy is found, the game software 15 may instruct the game computer 14 to disable the game software 15, or generate a tampering indication that is included in the authenticatable outcome message AOM. In this connection, the hash values $h_1 \ldots h_n$ and $h_m$, the one-way hash functions, and the instructions for checking the game software instructions in this manner may reside in a ROM chip internally associated with the game computer 14. Thus, although the protocol is essentially the same, no "security" instructions are executed from the game software 15 itself.

Another solution to the interposing device problem resides in the use of an authentication protocol to enable the game software to run in the game computer 14. In this connection, the game software instructions stored in the ROM of the game cartridge may be made authenticatable where the game computer 14 authenticates the instructions prior to executing the program. This can be implemented by encrypting the software instructions with a secret key by the game developer, thereby requiring that the game computer 14 decrypt the encrypted game software instructions with the corresponding public key prior to execution of the game program. The instructions and algorithm(s) for performing the decryption process reside in a ROM chip (not shown) in the game computer 14. The game software instructions are encrypted in blocks. Before each block is executed in the RAM of the game computer 14, it is decrypted by the CPU 27 with the algorithm(s) and keys stored in the ROM chip. If an interposing device is used to make changes to the game software instructions, the authentication process implemented by decrypting the encrypted game software instructions with the public key will reveal unintelligible commands and the game program will be altered. This alteration may be detected by a security program in the ROM chip and used to disable the game software 15 and/or incorporated into the authenticatable outcome message AOM to indicate tampering.

In addition to cryptographic techniques for defeating GAME GENIE-type devices, there are other methods that can be equally effective. One technique is to authenticate not only the score of the game but several key characteristics of the game. A GAME GENIE, for example, might allow a player to be completely invulnerable to the attacks of opponents. If the game he or she were playing required, for example, defeating a dragon at the end, the GAME GENIE enhanced player would have no trouble quickly defeating the dragon. Most players would take a longer amount of time and would likely sustain more damage as a result. This information (e.g., number of seconds elapsed and units of damage sustained) could be included in the authenticatable outcome message AOM so that the central computer 12 can compare it to known information to determine whether it was within "normal" bounds. If it was outside normal bounds, the central computer 12 may initiate a challenge/response protocol involving the game computer 14, including certain register values (such as invulnerability status) in the reply message. Rather than detecting the presence of a GAME GENIE directly, this protocol detects the end-effects of a GAME GENIE. Software obfuscation techniques can also be used to effectively hide how the game software 15 works, as is well known in the art. Reverse engineering obfuscated software requires considerable time, delaying the creation of GAME GENIE produced cheat codes. Since CD-ROMs must be re-mastered every ten thousand or so pressings, it is possible to create many different versions of the game software. Thus, a GAME GENIE device would have to generate cheat codes for every possible software variation.

Another solution is to monitor the time interval between the time the game computer 14 loads the game program 26 and the time that the game actually starts. If a GAME GENIE device were being used, the game would not start immediately since the player has to enter the cheat codes into the game computer 14 prior to game start.

In yet another embodiment, storing all the game data on removable memory media may enable the central authority to subsequently determine if the game was created with cheat codes input by a GAME GENIE device. This data may be "recorded" as described in detail herein.

The above described tampering indications may be incorporated into the authenticatable outcome message AOM as "subliminal channels" of information. i.e., information which is difficult to decipher. In addition to the hash value and encryption authentication protocols described above, the game software 15 may run an integrity check on itself consisting of, for example, performing a one-way hash of the current memory registers to obtain a hash value. It then determines whether this hash value is within an allowable range of possible hash values stored as a line of code in the game program. If the determined hash value is within the allowable range, it returns a tamper indication value of 0 (i.e., no tampering made or attempted). If the determined hash value is outside the allowable range, it returns a tamper indication value of 1 (i.e., tampering made or attempted). This tamper indication value 0 or 1 is appended to the outcome and incorporated into the authenticatable outcome message AOM. When the authenticatable outcome message AOM is authenticated by the central computer 12, the tamper indication digit is interpreted to indicate whether that copy of the game software 15 has been altered or modified. These messages may be arranged so as to render them very difficult for a hacker to interpret their meaning. For example, in the string 13000087457, the last digit "7" is a pointer to the seventh digit in the string—"8", where the fact that this digit is an even number indicates that tampering was attempted. Similarly, the game software 15 may generate scores in specified multiples. e.g., five, such that any score not ending in a five or a zero is invalid. Furthermore, the game software 15 may vary one digit in the score to indicate tampering therewith in accordance with a self-integrity check as described above. For example, a score of 3905 is valid, but if the score is 3905+1=3906, the score is rejected because the addition of the numeral 1 indicates tampering.

The natural random variations in the magnetic memory media on which the game software 15 is made available, may be detected and used as a secret or private key in the cryptographic protocols described herein. These characteristics include variations in coercivity, granularity, coating thickness, surface profile, and the like. Thus, each specimen of memory media has a unique "memory media signature" that is dependent upon these characteristics. One method of detecting this unique memory media signature is disclosed in U.S. Pat. No. 5,235,166 to Fernandez. The Fernandez Pat. teaches detection of the relative position of specific features of signals derived from the output of a transducer, and then measuring the deviation between the precise location of peak points, known as "jitter" The jitter is dependent upon the media itself, and the associated data stored thereon. The jitter may be represented as a digital mapping. i.e., a table of all the values of the jitter, or a sample of the jitter; a checksum of quantities derived from a number of jitter quantities or a one-way function (to produce a hash value); or multiple checksum quantities corresponding to jitter in different regions of the media. An initial memory media signature may be stored in the central computer 12 in the tournament database 46 in memory area 80 (see FIG. 7) prior to sale or distribution of the game software 15. Thus, during the outcome registration process described below, this information may be read from the memory media such as the game cartridge 21, using hardware such as that disclosed in the Fernandez Pat. This information may be included in the encrypted outcome message such that the central computer 12 can compare the initial memory media signature to the current memory media signature at the time an outcome is submitted to the central computer for certification. Alternatively, the memory media signature may be used as an encryption key for authentication. In the case of the former, if the newly computed memory media signature does not match the initial memory media signature, the game software 15 has been altered and/or an unauthorized copy has been made. If the memory media signature is used as an encryption key, the outcome can be authenticated with respect to that copy of the game software 15. Another unique key that may be utilized in the cryptographic protocols herein is the unique identification number built into some central processing units. Intel, for example, assigns a unique number to each of its processors. This number may be read by the encryption/decryption module 28 each time an authenticatable message is to be generated. This unique number may also be referred to as the SSCID in accordance with the definition thereof as described above.

Figure 7:
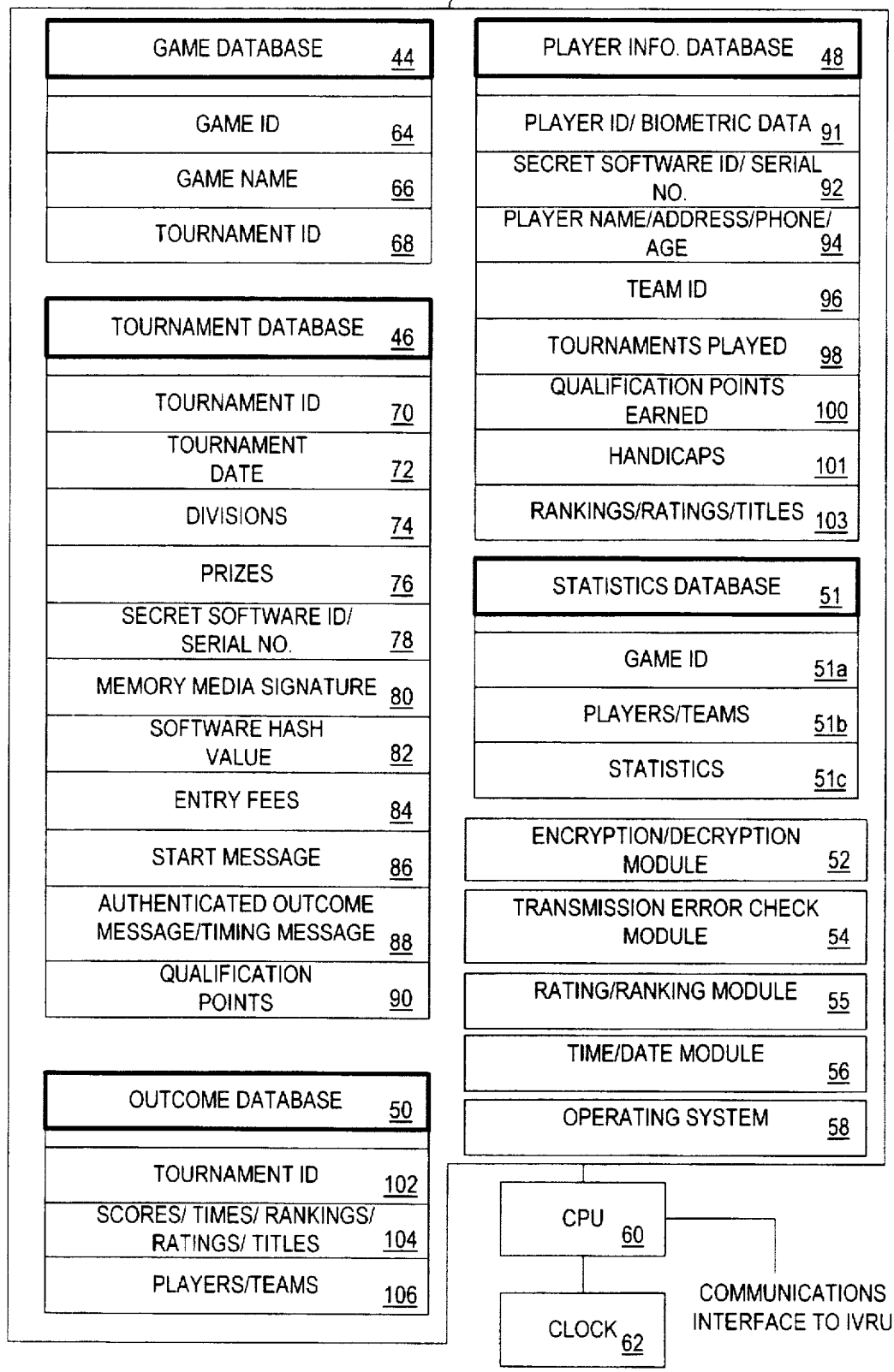
FIG. 7 is a schematic of an exemplary memory arrangement and some hardware for the central computer.

Referring now to FIG. 7, there is depicted an exemplary memory arrangement for the central computer 12. Here again, although the central computer 12 is shown as a single unit, it may be comprised of a network of computers. Specifically, the central computer 12 includes a memory 42 containing several relational databases. These include a game database 44, tournament database 46, player information database 48, outcome database 50 and a statistics database 51. The central computer memory 42 also includes an encryption/decryption module 52, transmission error check module 54, rating/ranking module 55, time/date module 56 and an operating system 58. The transmission error check module 54 functions to detect inputting errors, corruption of transmitted data due to communication problems such as line noise and the like, to enable a resend command or request to be made as described above with respect to the game computer 14 and as is well known in the art. The operating system 58 controls the central processing unit 60 of the central computer 12. A clock 62 provides signals to the central processing unit 60 in a conventional manner and is also used by the time/date module 56 for time-stamping incoming messages as required. Alternatively, a trusted digital timestamping service may be used for this function.

The game database 44 includes game ID data in memory area 64, a game name in memory area 66 and tournament ID data in memory area 68.

The tournament database 46 includes a tournament ID number which uniquely identifies each tournament in memory area 70, the corresponding tournament date or range of dates over which the tournament is in effect in memory area 72, the division levels for a given tournament (tournaments may contain multiple levels such as beginner, intermediate and/or advanced), in memory area 74, information with respect to prizes to be paid out for a given tournament or fixed prizes for certain high scores for any game in memory area 76, the SSCIDs and software serial numbers SSNs in memory area 78, an initial memory media signature in memory area 80, an initial hash value of the game software 15 in memory area 82, entry fees paid or pre-paid for a given tournament in memory area 84, a start message for enabling a given tournament to begin in memory area 86, outcome messages received from the game computers 14 in memory area 88, and a list of qualification points earned to enable certain players to enter future tournaments in memory area 90.

A player follows a registration process whereby personal information such as his or her name, address, phone number, age, etc., is provided to the central computer 12 and stored in the player information database 48. The player may return a registration card included with the game software 15. This registration card contains the player's identification data and the serial number SSN of the game software 15. The registration card may contain security indicia such as a hologram and/or secret ID which is difficult to forge. This may allow the central authority in the case of game software 15 for use on a home PC or which resides in a game cartridge for use with a game console, to ensure that the game software 15 is associated with a specified player. The player is assigned a player ID which is used to register for tournaments and in the outcome registration process, either in connection with a tournament or independent thereof. The player may also be required to provide biometric data from the biometric device 31 (such as the digitized, compressed or hashed fingerprint data obtained from a fingerprint scanner, a voice-print obtained from a voice verification system, or the like). The player information database 48 includes the player ID and/or biometric data in memory area 91, the SSCID in memory area 92, the player's name/address/phone number/age in memory area 94, team ID number for team affiliation in the case of team tournaments in memory area 96, a list of tournaments in which the player has competed in memory area 98, and qualification points earned to enable the player to engage in future tournaments in memory area 100. Furthermore, memory area 101 stores player handicap values which may be used to adjust a player's outcome for a given tournament game or to modify the difficulty of a game generated by the game software 15 by communicating the game difficulty level in an authenticatable start message described below. Handicap values may change in accordance with that player's demonstrated skill level for a particular game. Player rankings, ratings and titles may be stored in memory area 103, as well as in the outcome database 50.

The outcome database 50 includes the tournament ID in memory area 102, a listing of outcomes (i.e., scores, times of completion, or other special characteristics of the game) for any certified or tournament game and the corresponding player rating/ranking/title in memory area 104, and the player's name or team affiliation(s) in memory area 106.

The statistics database 51 may include game ID data in memory area 51a, player and team data in memory area 51b, and various statistical information in memory area 51c. The statistics database may be accessed over the telephone, or through an on-line service. It may or may not be password protected.

Figure 3:
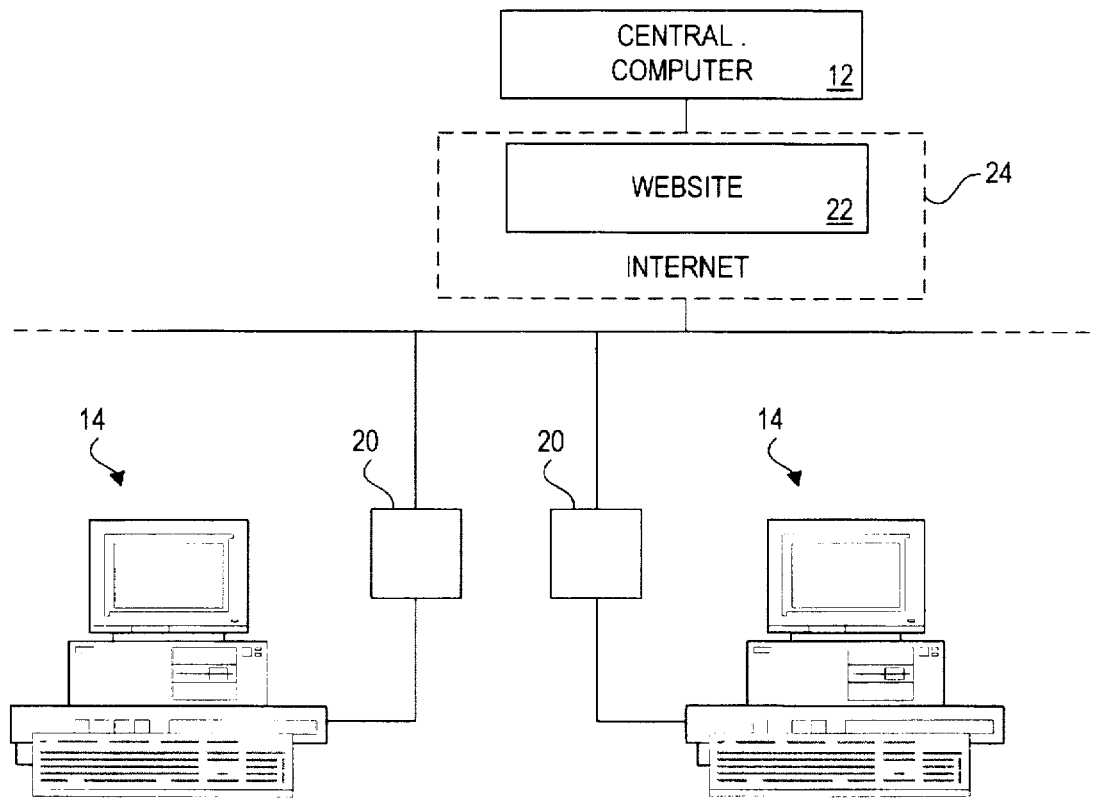
FIG. 3 is an overall schematic of the inventive system in still another embodiment.
Figures 1, 8A:
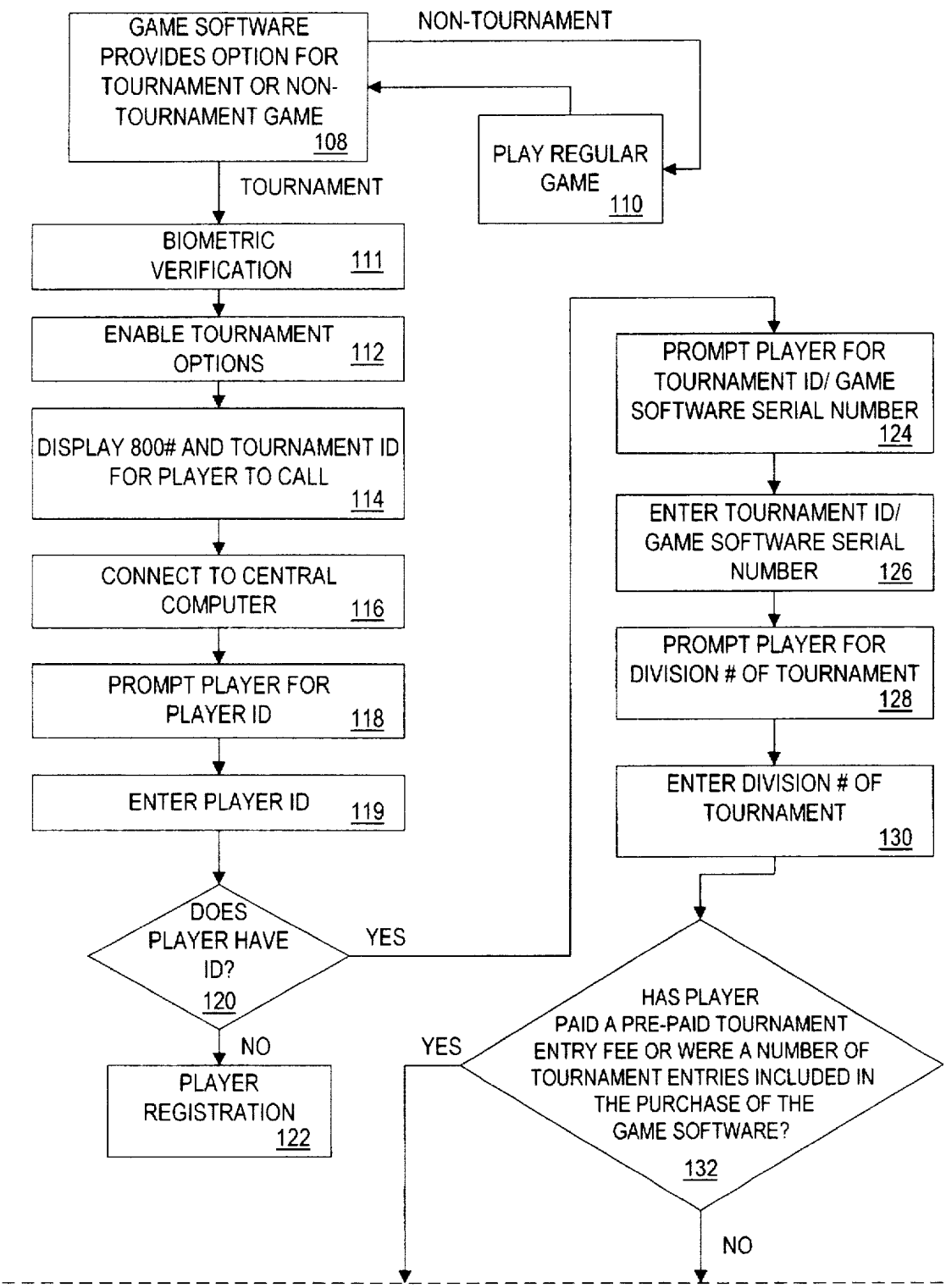
FIG. 8A is a flow-chart of an exemplary tournament entry procedure.
Figures 2, 8A:
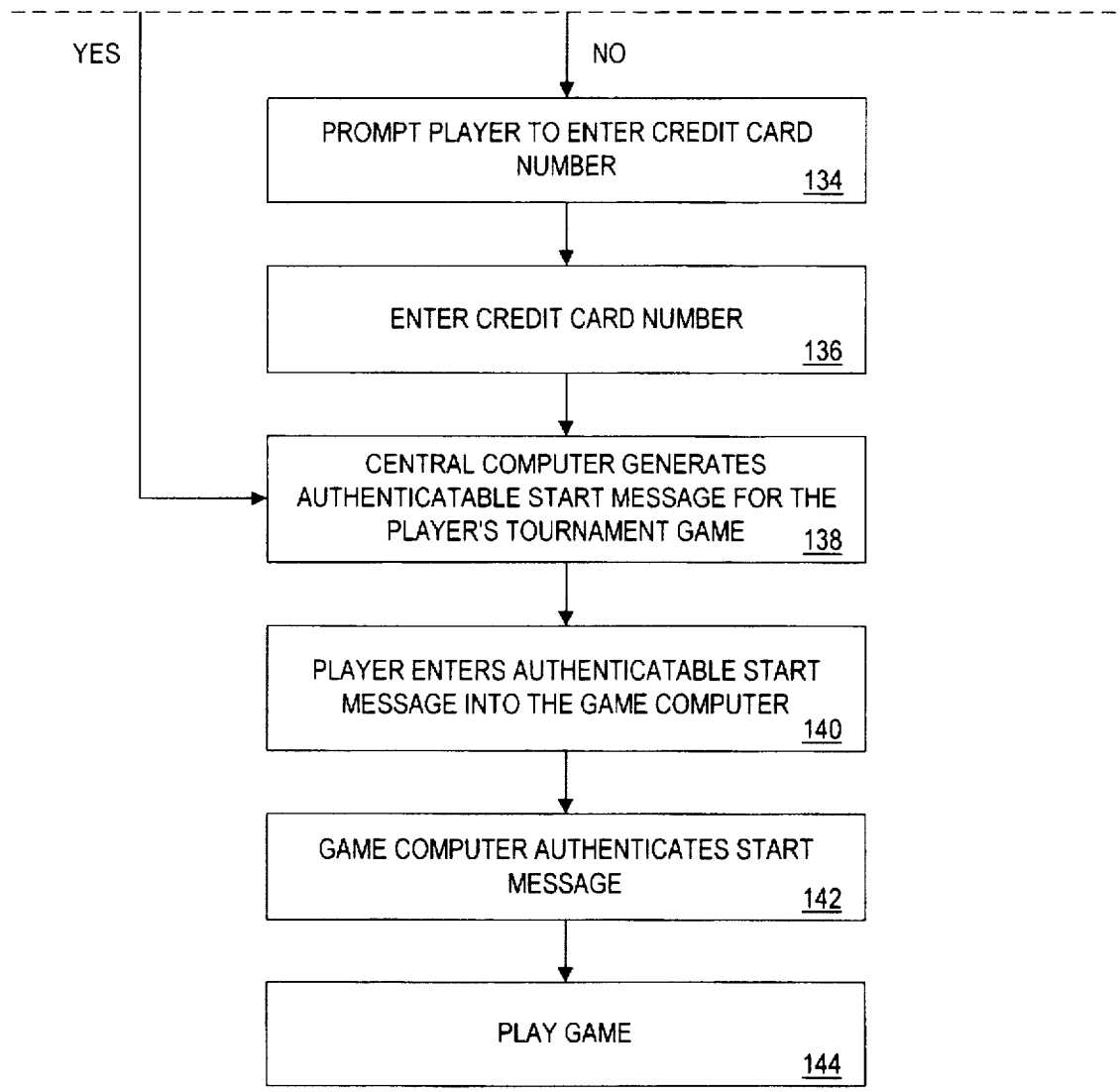

Referring now to FIG. 8A, there is depicted a flow-chart of an exemplary tournament entry procedure in the present invention. For the purpose of illustration, the flow-chart refers to a system where the player manually or verbally (through voice responsive hardware/software) enters messages into the telephone 18 in response to prompts from an IVRU as shown in FIG. 1. However, it will be appreciated by persons skilled in the art that messages may be communicated between the game computer 14 itself and the central computer 12 by establishing a direct link or on-line connection as shown in FIGS. 2 and 3. In one embodiment, all games are tournament games. In another embodiment (shown in FIG. 8A), when a player activates the game computer 14 to play a game in the usual manner, the game software 15 directs the game computer 14 to generate an option to either enter a tournament or to play a regular game at step 108. If the player chooses to play a regular game, the game computer will generate a game in a conventional manner at step 110. If the player selects the option to engage in a tournament, the player may be required to proceed with a biometric verification procedure at step 111, using for example, the fingerprint verifier 31 or a voice-print check. The game software 15 will enable the tournament options at step 112. These may include disabling cheat codes as well as other modifications to the game parameters in the game software 15. The game software 15 also directs the game computer to display a tournament ID for a given tournament, and a toll free 800# for the player to call at step 114. The use of an 800# is intended to be exemplary. Different tournaments may utilize 900#s which charge a prescribed toll fee, some or all of which may be applied to a tournament entry fee. In the case of 900#s, a blocking system to prevent children from calling may be utilized. This can be implemented by setting up a special blocking phone number operably connected to the central computer 12 that provides for blocking access from a given originating telephone number or by a person with a specific PIN. In the case of the former, the central computer 12 can deny (block) tournament entry requests for calls made from a specific telephone number that is identified in a database as "blocked" Identification of the originator of the 900# call may be made using an Automated Number Identification ("ANI") system of the type well known in the art. If the block is by PIN, the central computer 12 can identify blocked PINs by storing a list thereof in a PIN-blocking database. It is also anticipated that the 800# and tournament ID may be contained in separate literature accompanying the game software 15, and therefore need not be displayed by the game computer 14. However, for the purpose of illustration, the following description describes a system where the 800# is displayed by the game computer 14. The player then dials the 800# and connects to the central computer 12 via the IVRU 16 at step 116. The IVRU 16 prompts the player for the player's ID at step 118. The player enters his or her player ID into the keypad of the telephone 18 in a conventional manner at step 119. The player ID is communicated to the central computer 14, which checks the player information database 48 to determine whether the player has a valid player ID at step 120. If not, the player registers with the central computer 14 at step 122 as described above. If the player ID is verified, the IVRU 16 prompts the player for the tournament ID, and the software serial number SSN for the game software 15 at step 124. The player enters the tournament ID and game software serial number SSN into the telephone 18 at step 126. Since a given tournament may have different divisions (e.g., beginner, intermediate and/or advanced), the player may have the option to choose the appropriate level of competition for his or her skill level. If the player has the option, the IVRU 16 prompts the player for the division number of the particular tournament at step 128. At step 130, the player then enters the division level or number into the telephone 18. Alternatively, if the player already has a rating stored in the outcome database 50, the division level may be determined by the central computer 12. The tournament database 46 maintains a record of the divisions for a given tournament in memory area 74. The central computer 12 may limit the number of entries in a tournament, and may thus verify that space is still available when a player seeks entry in that tournament. If space is available, the central computer 12 checks whether the player has pre-paid for tournament entries or whether a pre-paid number of tournament entries were included in the purchase of the game software 15 at step 132. It is anticipated that payment for tournament entries may also be made through an account arrangement where the player pays a certain fee on some prescribed basis. Entry fees for the tournaments are stored in memory area 84 in the central computer 12. If no entry fees have been paid, the IVRU 16 prompts the player for a credit card number at step 134 if an entry fee is required. The player enters the credit card number into the telephone at step 136. The credit card validity is checked on-line in a conventional manner. Of course, credit card use and authorization could be made by swiping the credit card through a credit card reader, in lieu of manually entering the credit card number into the telephone 18. In an alternative embodiment, entry in a tournament may neither require payment of any fees, nor a start message to enable tournament play. At step 138, the central computer 12 then generates an authenticatable start message ASTM for the player's tournament game and specific game software 15 using the encryption/decryption module 52. The authenticatable start message ASTM may be encrypted so that only the intended game computer and/or game software can use that message when decrypted with the required key. The authenticatable start message ASTM is communicated to the player over the telephone 18, and then entered into the game computer 14 by the player at step 140 (e.g., through the computer keyboard or a joystick). In this connection, the authenticatable start message ASTM can enable tournament play based upon public sources of randomness. In such an implementation, the player is required to enter both the authenticatable start message ASTM and a separate input available from some public source such as television, radio, newspapers and the like. Thus, tournament play starts when players are able to obtain an initialization code from, for example, the lottery Pick "4" numbers broadcast on the 10 o'clock news on channel Z. This random information must be entered prior to game play and becomes part of the authenticatable outcome message AOM. Thus, this information verifies that the game started subsequent to the occurrence of the triggering event. The game computer utilizes the encryption/decryption module 28 to authenticate the authenticatable start message ASTM at step 142. The authenticated start message signals the game program 26 to enable play of the tournament game at step 144. The start message signals the game software 15 that this is a valid tournament game. It may also contain instructions for the game software 15 to generate specified or random initialization parameters for that tournament game, such as, for example, its challenge level. In this connection, it is anticipated that start messages may be broadcast over mass communications channels such as television, radio, the Internet, etc., at a specified time to start a given tournament or to start player competition in a race of skill. That implementation will be described in more detail below.

The start messages may be used to facilitate game play on a pay-per-game basis. For example, a player calls the central computer 12, pays a specified fee, and obtains a start message good for one game or a number of games. Thus, a game computer 14 in a home environment can be made to operate much like an arcade machine. In this application, the start message functions as a key; without it, the game software 15 cannot generate a game. By incorporating a timing element into the start message, it can be made "time-limited" (i.e., valid for some predetermined period of time), assuming that the game computer 14 communicates with a clock, preferably one that is tamper-resistant. A variation of the pay-per game concept is described in another aspect of the invention in more detail hereinbelow.

The start messages may also be used for other applications. A start message may contain compressed advertising information, which is decompressed by and displayed on the game computer 14.

Figure 8B:
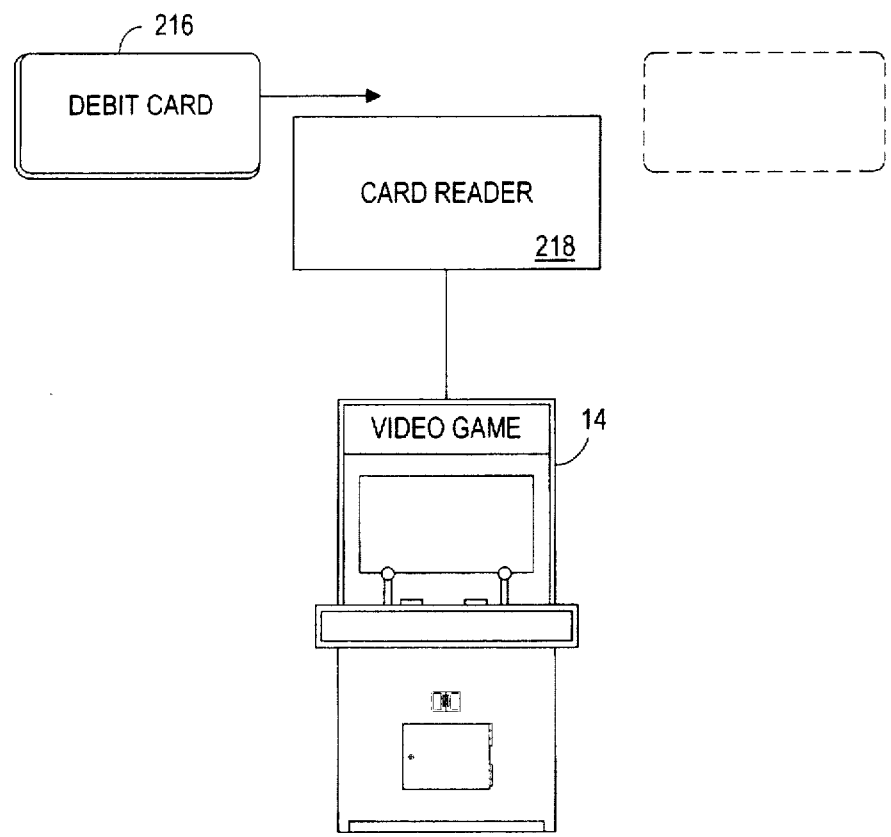
FIG. 8B is a schematic of an arcade implementation.
Figure 8B:
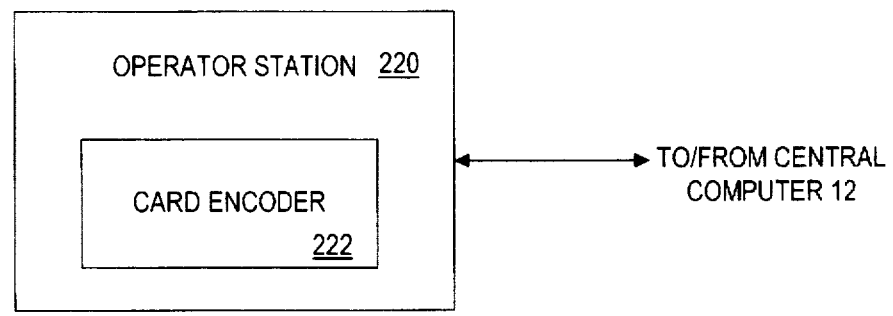

Referring now to FIG. 8B, in a coin-operated arcade environment, a player may purchase a number of tournament entries embodied in a pre-paid card 216. The card 216 may include memory media such as a magnetic strip. The gaming computer 14 in the case of an arcade machine, for example, has a card reader 218 communicating with the CPU 27 of the gaming computer via an interface in a conventional manner. The card 216 is obtained from a tournament operator station 220 having a card encoder 222 communicating with the central computer 12. The tournament operator station 220 may have a tournament operator or may itself consist of an automated apparatus which accepts payment and tournament entry requests. The player pays the tournament operator by credit card or cash. If payment is made by credit card, the tournament operator obtains on-line authorization in a conventional manner, and then sends a tournament entry request to the central computer 12. If payment is made by cash, the tournament operator simply sends a tournament entry request to the central computer 12. Upon receipt of a requested number of tournament entries, the central computer 12 generates a corresponding number of authenticatable start messages ASTMs and communicates the same to the operator station 220 where the start messages may be encoded in the magnetic strip of card 216. The word "message" in this context is used to identify each tournament entry instruction or code. It is anticipated that a single message may contain a plurality of entry codes for a corresponding number of tournaments. Thus, the reference here to authenticatable start messages ASTMs means multiple tournament entries. When the player swipes the card 216 through the card reader 218, the authenticatable start message ASTM associated with that tournament is read by the gaming computer 14 and enables tournament play as described above. The authenticatable start message ASTM may be customized to enable tournament play on a particular game computer 14 or its game software 15 that is identified (e.g., using the SSCID) in the authenticatable start message ASTM. In another application, the authenticatable start message ASTM may contain unique identification information to be incorporated into the authenticatable outcome message AOM such that the right to submit an outcome represented by a given authenticatable outcome message AOM can take place only once. Thus, a player cannot steal an authenticatable outcome message AOM representing a high score obtained on another game computer 14, because the central computer can determine that the authenticatable outcome message AOM representing that specific score from a given game computer 14 was already used. To facilitate the application of the present invention to the arcade environment, an arcade machine (the gaming computer 14) may include a printer that prints out the authenticatable outcome message AOM to make it easier for the player to register an outcome where access to a telephone may be limited. By printing a receipt with the authenticatable outcome message AOM, the player may access the system from a telephone at a convenient location, and no hardware for an on-line connection between the arcade machine and the central computer is necessary.

Figure 9:
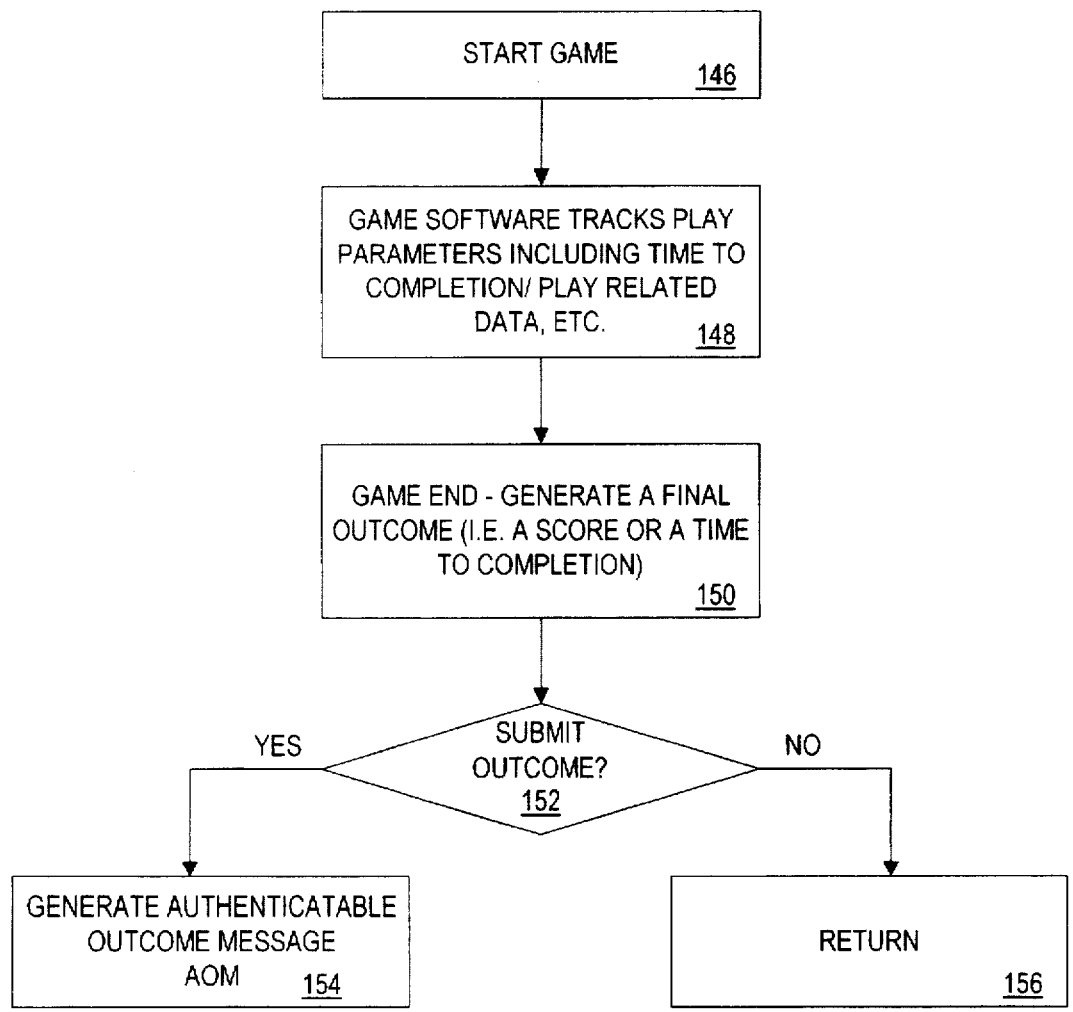
FIG. 9 is a flow-chart of game play.

Referring now to FIG. 9, a game sequence flow-chart is depicted. In step 146, the game computer 14 generates a game in a conventional manner. If it is a tournament game as described above, the game software 15 may disable cheat codes, alter the game such that the game play characteristics may be randomized in comparison to a non-tournament version, make the game easier or more difficult to play, and/or unlock hidden levels of challenge in comparison to non-tournament versions of the game. At step 148, the game software 15 tracks the time to completion and special play-related information pertaining to that game such as number of lives lost, amount of time spent per level, number of hidden treasures found, etc. At step 150, the player finishes the game and the game software 15 generates an outcome. In certain embodiments, the game computer 14 may then generate an option for the player to choose whether or not to submit the outcome for certification at step 152. If the player desires to have an authenticatable outcome generated for submission to the central computer (in the case of a tournament), or to subsequently prove to friends that a certain score was achieved, the authenticatable outcome message AOM (or authenticatable timing message ATM for races of skill) discussed above is generated at step 154. If not, the player may return to play another game at step 156. In the case of a tournament, the player may not be provided with the option of whether to submit an outcome for certification.

Figure 10A:
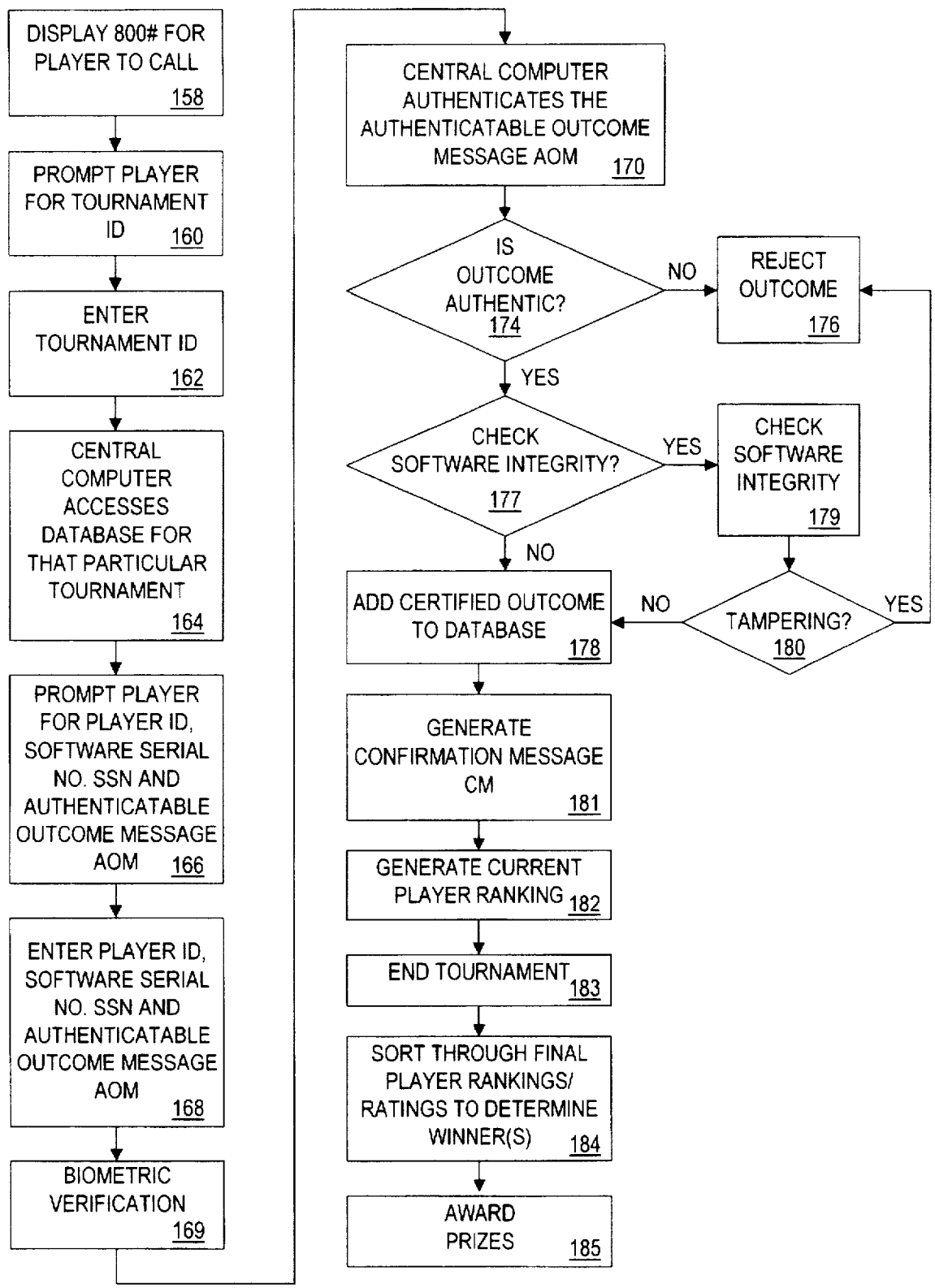
FIG. 10A is a flow-chart of an illustrative outcome submission and certification sequence.
Figure 10B:
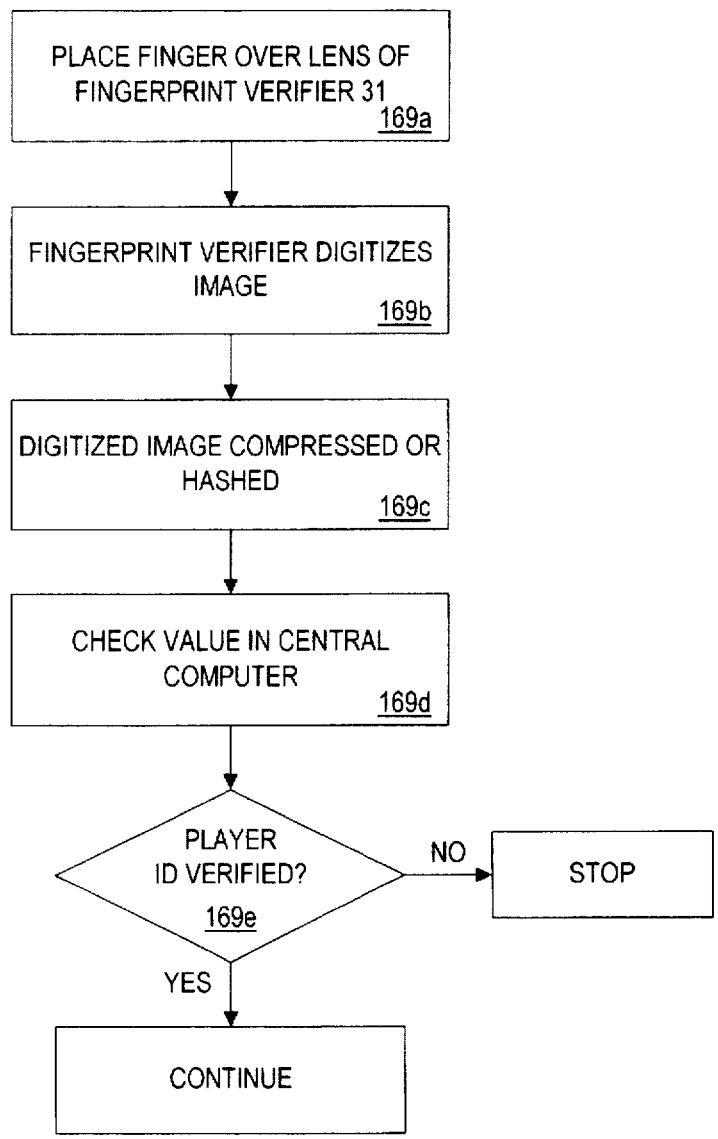
FIG. 10B is a flow-chart of an illustrative biometric verification procedure.

Referring now to FIG. 10A, there is depicted a flow-chart of an outcome certification sequence in a tournament embodiment. In this example, the outcomes are submitted to the central computer 12. However, a similar procedure may be employed for just certifying outcomes independent of any tournament. In that case, the central computer 12 generates an updatable database of player scores and statistics, which may be accessed by players through an on-line service, over the telephone or the like. To initiate the outcome submission process for a tournament game, the game software 15 directs the game computer 14 to display the 800# for the player to call at step 158 as described above. The player is prompted by the IVRU 16 to enter the tournament ID at step 160, which the player enters into the telephone 18 at step 162. The central computer 12 then accesses the tournament database 46 for the particular tournament identified by the tournament ID at step 164. The IVRU 16 then prompts the player for his or her player ID, software serial number SSN, and the authenticatable outcome message AOM at step 166. The player enters the player ID, software serial number SSN and authenticatable outcome message AOM into the telephone 18 at step 168. This step may include entering multiple authenticatable outcome messages AOMs, or a single authenticatable outcome message AOM may represent several outcomes. The central computer 12 may request a biometric verification of the player's identity using, for example, the fingerprint verifier 31 at step 169. The biometric verification procedure using the fingerprint verifier 31 is depicted in a flow chart in FIG. 10B. In step 169a, the fingerprint verifier 31 does a live scan of the player's fingerprint, which is digitized at step 169b, and the digitized data is then compressed or hashed by the game software 15 at step 169c. The compressed or hashed data is communicated to the central computer 12, which compares the current data to that stored in memory in the player information database 48 in memory area 91 at step 169d. If the compressed or hashed data from the current scan of the player's fingerprint matches that stored in the player information database 48, the player's identity is verified and the outcome submission procedure continues to step 170. If not, the outcome submission procedure terminates. The same biometric player identity verification procedure may be implemented with a voice print verification at the central computer 12. The central computer 12 authenticates the authenticatable outcome message AOM using the encryption/decryption module 52 at step 170, using any one of the protocols described above. The identity and integrity of the outcome are ensured by authentication, as is the paternity of the outcome (i.e., the outcome was generated by a specific game computer or copy of the game software 15). The central computer 12 may timestamp the message, or it may communicate with a trusted third party such as a digital timestamping service to perform this function. Digital timestamping is known in the art and details thereof may be found in U.S. Pat. Nos. 5,136,646 and 5,136,647. The authenticated outcome message AOM is stored in memory area 88 of the tournament database 46. If the outcome is not authentic at step 174, it is rejected at step 176. If the outcome is authentic, the central computer proceeds to step 177. The central computer may check the integrity of the game software as described above at step 179, or proceed directly to step 178. If the software integrity check at step 179 reveals tampering at step 180, the outcome is rejected. After the outcome is authenticated and the integrity of the game software 15 verified, the central computer 12 adds the certified outcome to the outcome database 50 in memory area 104 at step 178. In the illustrative embodiment, the certified outcome is referenced by the corresponding tournament ID in memory area 102, and the player's name in memory area 106. At step 181, the central computer 12 may generate a confirmation message CM which, when communicated to the game computer 14, can be used by the game software 15 to cause the game computer 14 to display a certified scoreboard with language to the effect that a particular outcome (e.g., score) was certified by the central computer 12. The same confirmation message CM can be utilized by the game software 15 to direct the game computer 14 to generate special symbols or medallions as a result of an established level of competence. These may be made to appear on the screen with an identification of the player during subsequent game play. In view of the competitive nature of videogames, this feature greatly enhances their play value games by providing for recognition of the player's achievements.

At step 182, the central computer 12 generates a current player ranking in the tournament utilizing the rating/ranking module. The player rankings in the outcome database 50 may include subsidiary rankings delineated by state, school, age group, etc. If the tournament is still ongoing, players may be provided with their current ranking so far. The tournament ends at some predetermined time at step 183. At step 184, after the conclusion of the tournament, the central computer 12 sorts through all the scores to determine a winner from the final rankings. These may be segregated by division level such that the beginner, intermediate and advanced levels each have a separate winner with associated rankings and ratings. At step 185, prizes are awarded in a conventional manner.

Prizes or awards can also be offered on an exclusive basis to players who achieve certain skill levels. For example, becoming a "Two Star" SONIC THE HEDGEHOG player may require the certification of two scores of 50,000 points or more. Players reaching this level of achievement may be offered prizes, or the ability to purchase goods at self-liquidating prices. There may be a catalog for "Two Star" players and a separate catalog for "Three Star" players. An award for achieving a certified level of play may include the incorporation into the game software 15 the player's name in background graffiti on the actual game screens, renaming game characters, or the modification of the game play or visuals in some other subtle manner until a new higher scoring player is allowed to change these altered characteristics. The player information database 48 is also updated to reflect the tournament played and any qualification points earned towards future tournaments in memory area 100.

It is also anticipated that "instant prizes" could be awarded to players based upon exceeding some predetermined threshold level (e.g., a player scoring over a million points for any MORTAL KOMBAT game receives a $50 instant prize). This prize could be implemented, for example, in the form of a $50 credit to the player's credit card. In a golf game embodiment, an instant prize can be offered for a hole-in-one on each hole, supplementing a normal tournament prize structure for the lowest score. Alternatively, if the tournament is being conducted in an arcade environment, the player could receive an instant cash prize from an agent at the arcade. These instant prizes could be awarded mutually exclusive and prior to the conclusion of a given tournament. The arcade is then reimbursed for all or part of the prize awards by the central authority. Other awards may include coupons good for discounted entries in future tournaments, and/or for special cheat codes (which cannot be used, however, in connection with a certified game).

In accordance with another aspect of the invention, the game software 15 may contain a certificate printing routine which contains templates for generating different certificates for players who reach a certain score and/or who attain a certain title (e.g., "Master," "Grandmaster," etc.). Such certificates may be printed out by the game computer 14, upon reading a confirmation message CM from the central computer 12, and represent that a player has attained a given level of achievement. The confirmation message CM "unlocks" the printing instructions in the game software 15. The player enters his or her name and/or password into the game computer 14. These certificates may be customized for each game and even for different levels of achievement. A player bragging about his or her certified score to his or her friends may now proffer visual proof. To prevent fraud, these certificates may be provided with certain security indicia such as holograms and the like. If an unauthorized copy of the certificate is made, the security indicia becomes visible and thereby indicates that it is counterfeit. The certificate may also contain the authenticatable outcome message AOM and/or confirmation message CM printed on the face thereof so that the achievement can be verified by calling the central computer 12.

The confirmation message CM may also be utilized to unlock certain attributes of a game that are only encountered by high scoring players. For example, a top scoring player who receives a certified score, may be provided with a confirmation message CM that, when read by any game computer 14 with the game software 15, allows players on that game computer 14 to view special hidden characters or final stages of the game, which are not normally encountered until a certain level or score is attained. In this regard, such a confirmation message CM may include specific game software identification information such as the software serial number SSN to restrict its use to a specified game computer or number of game computers. Thus, the high scoring player provides the identity of those players and/or their game software serial numbers SSNs to the central computer, which incorporates the same into the confirmation message CM. In this manner, the confirmation message CM enables only those game computers 14 having game software 15 identified by those software serial numbers SSNs to reveal the hidden characters or final stages of the game.

It is also anticipated that the central computer 12 may be utilized only to certify outcomes. Thus, a third party may be provided with the confirmation message CM representing a certified outcome, where that third party then handles tournament rankings, ratings and prize distribution. For convenience, however, all such functions are schematically shown to take place with one central computer 12.

In all tournament embodiments, a final playoff protocol may be established for top players, which takes place in a central location under the supervision of a tournament director(s). Thus, where prizes for large sums of money are at stake, this final playoff may be used to ensure that no undetected substitution of players takes place during play or when reporting game outcomes.

Figure 11:
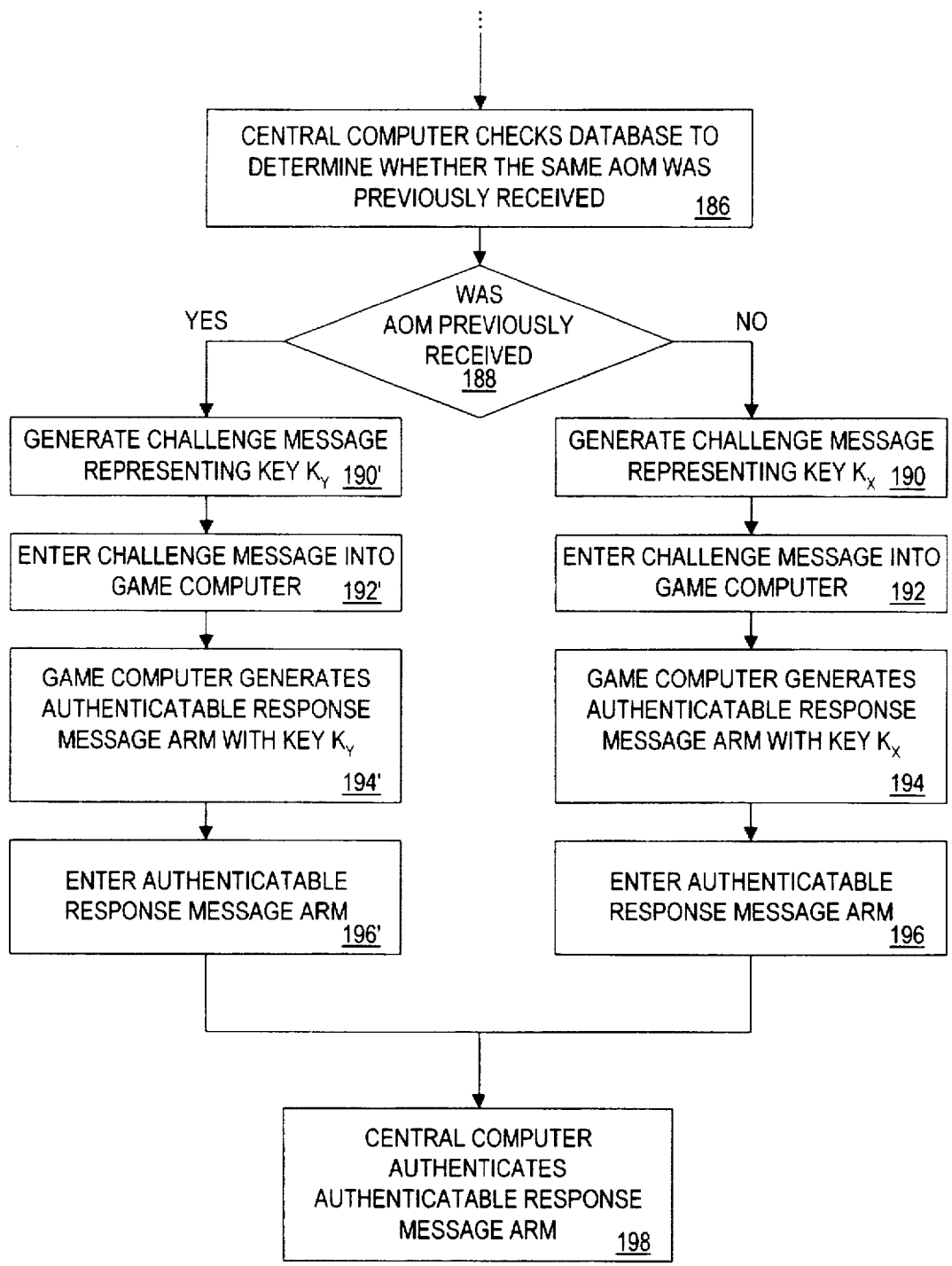
FIG. 11 is a flow-chart of a challenge/response protocol.

Referring now to FIG. 11, an embodiment of the invention utilizing a challenge/response protocol is depicted. Steps 158–174 are identical to those shown in FIG. 10A and described above, and therefore need not be repeated. At step 186, the central computer 12 checks the tournament database 46 to determine whether the same authenticatable outcome message AOM has been previously received, by checking memory area 88. If the authenticatable outcome message AOM presently communicated in this outcome submission sequence is not the same as a previous authenticatable outcome message AOM, the central computer 12 generates an authenticatable challenge message ACM for that player's game computer 14 representing a key $k_x$ at step 190. This representation may be the actual key $k_x$ itself, or an instruction for the encryption/decryption module 28 to retrieve the specific key $k_x$ based upon a certain command (i.e., the command encrypt X means use encryption key $k_x$). The authenticatable challenge message ACM is communicated to the player and entered into the gaming computer 14 at step 192. The encryption/decryption module 28 authenticates the authenticatable challenge message ACM and generates an authenticatable response message ARM based upon the outcome with key $k_x$ at step 194. The player enters the authenticatable response message ARM into the telephone 18 at step 196. The authenticatable response message ARM is communicated to the central computer 12 and authenticated by the encryption/decryption module 52 at step 198. If the outcome represented in the authenticatable response message ARM is not authentic (where a player has stolen another player's AOM), the outcome is rejected. A player cannot make up an outcome because he cannot guess the key $k_x$ in advance. If the outcome is accepted, the process proceeds in accordance with the sequence shown in FIG. 9A. Referring back to step 188, if the central computer detects a duplicate authenticatable outcome message AOM (i.e., indicating that a player may have stolen a message), it generates an authenticatable challenge message ACM representing key $k_y$ (a different key than $k_x$ that was used to challenge the earlier authenticatable outcome message AOM) at step 190'. The authenticatable challenge message ACM is communicated to the player and entered into the gaming computer 12 at step 192'. The encryption/decryption module 28 authenticates the authenticatable challenge message ACM and generates an authenticatable response message ARM based upon the outcome with key $k_y$ at step 194'. The player enters the authenticatable response message ARM into the telephone 18 at step 196'. The authenticatable response message ARM is communicated to the central computer 12 and authenticated by the encryption/decryption module 52 at step 198. The rest of the process proceeds as described above. This protocol prevents someone from using another player's authenticatable outcome message AOM to register a false score unless they also have access to the game computer 14 which generated the AOM.

In another embodiment, the challenge/response protocol utilizes random numbers in lieu of multiple cryptographic keys. In this implementation, the authenticatable outcome message AOM includes a random number R1 generated by the encryption/decryption module 28. This makes each authenticatable outcome message AOM unique, irrespective of identical outcomes on different game computers 14. If duplicate authenticatable outcome messages AOMs are detected, the last authenticatable outcome message AOM which is identical to a previous submission is rejected by the central computer 12. Non-duplicate authenticatable outcome messages AOMs are processed as described above, to ensure that the player submitting the same is in possession of the actual game software 15 and/or game computer 14. This prevents a player from stealing another's authenticatable outcome message AOM and claiming it as their own. In this protocol, the central computer 12 generates a second random number RA2, which is included in the authenticatable challenge message ACM. The ACM is authenticated by the encryption/decryption module 28 associated with the game computer 14, and then concatenated with the original outcome message into the authenticatable response message ARM. The authenticatable response message ARM is communicated to the central computer 12 and authenticated. The central computer 12 then checks whether R1 and R2 are identical. If they are, then the outcome message is verified as having been generated by the player's game software 15/game computer 14.

The challenge response protocol may be implemented by the central computer 12 on a random basis, or based upon current scores, previous scores, or some other game related factors, to streamline the score submission process. For example, every time an authenticatable outcome message AOM is submitted to the central computer 12, it may generate a random number between 0 and n. If the random number is less than j (a number between 0 and n), the challenge/response protocol is initiated. If the random number is greater than or equal to j, the authenticatable outcome message AOM is simply processed as depicted in FIGS. 7-11. This procedure saves time, as the player is only required to enter one message per outcome submission. And, if cheating is detected, it can be used to deny the player certification of future outcomes, and to invalidate any outcomes certified in the past as a penalty.

In another protocol, the authenticatable start message ASTM as described above and illustrated in the tournament entry flow chart of FIG. 8A, includes a unique key for generating the authenticatable outcome message AOM. Thus, every authenticatable outcome message AOM is unique, regardless of whether multiple players have the exact same scores. Since every player is provided with a different key, the same outcome from different players would necessarily have to be represented by different authenticatable outcome messages AOMs. This prevents a second player from stealing the authenticatable outcome message AOM of a first player in an attempt to submit a false score. This is assured because the key sent with each authenticatable start message ASTM is different, and the key for authenticating the message is different as well. If player X steals the authenticatable outcome message AOM from player Y, player X will be caught cheating when the central computer 12 applies player X's key to the authenticatable outcome message AOM that was encrypted with player Y's key (i.e., the message will be unintelligible). The authenticatable outcome message AOM may also include the SSCID as discussed above to enable the central computer 12 to authenticate the message with respect to the specific game software/game computer as well.

Figure 12:
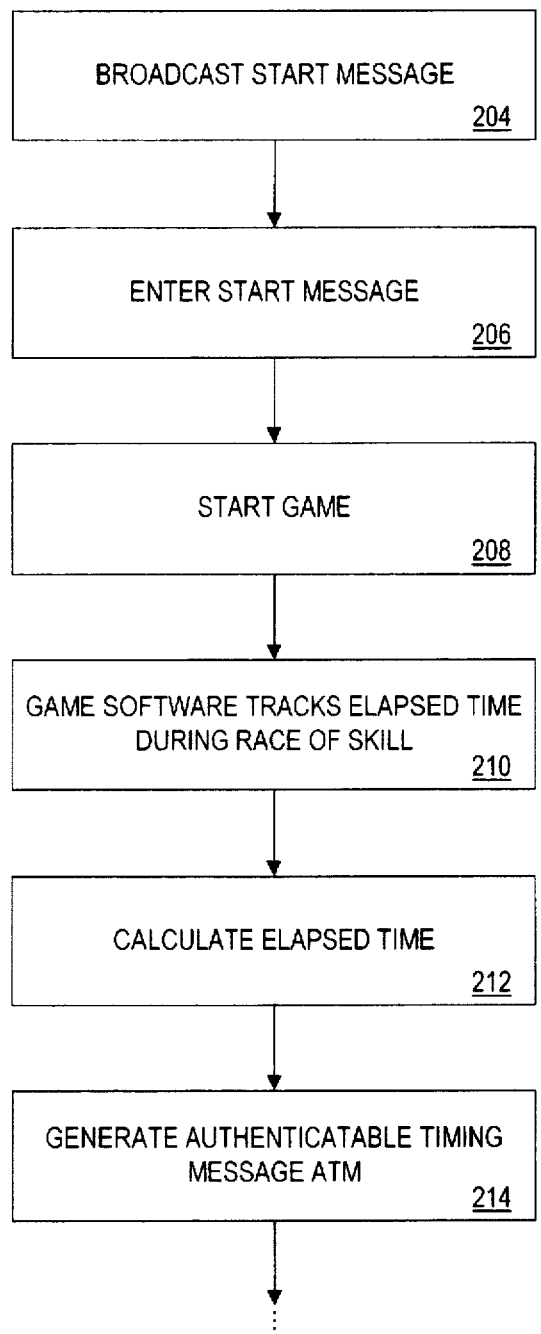
FIG. 12 is a flow-chart of a broadcast start message sequence in one exemplary embodiment for races of skill.

Referring now to FIG. 12, in an embodiment for tournament races of skill, the above-described protocols may be used. There are two kinds of races of skill, one where all players start at a designated time, and another where players start at different times with the game software 15 time-stamping or tracking the elapsed time to completion for a given game. Where all players start at a designated time, a start message BSTM for a particular tournament may be broadcast over a mass communication channel such as radio, television or the Internet at step 204. There may have already been a registration process for the tournament as generally depicted in FIG. 8A and described above. The start message BSTM is entered into the game computer 14 at step 206, which enables the game software 15 to make a race of skill available for play. The game is started at step 208, and the time/date module 33 is initiated, using signals from the clock 36. The time/date module 33 tracks the elapsed time during the race of skill played at step 210. The time/date module 33 may accept signals from a secure clock that resides within a token such as the aforementioned iPower card or TOUCH MEMORY device. When the player has completed the race of skill, the time/date module 33 calculates the total time elapsed at step 212. At step 214, the encryption/decryption module 28 generates an authenticatable timing message ATM (analogous to the AOM) representing the elapsed time. The authenticatable timing message ATM is communicated to the central computer 12, which then authenticates the authenticatable timing message ATM and "time-stamps" the player's time to completion and any play-related data with the time/date module 56. If the player's time to completion is certified, a ranking, rating, title is then generated at the central computer 12 using any of the above-described processes. In an embodiment where races of skill start at variable times for a given tournament, the central computer 12 does not have to time-stamp the authenticatable timing message ATM when it is received. The start message BSTM is used to enable a particular tournament, but does not start the time running for the competition (there may still exist a fixed period of time over which the tournament will be in effect). Instead, the time/date module 33, using signals from the clock 36 (which preferably resides within a secure perimeter), tracks the elapsed time during the race of skill from the time that the player begins the game (at his or her leisure) as described above, and the authenticatable time message ATM itself represents the time to completion.

Figure 13:
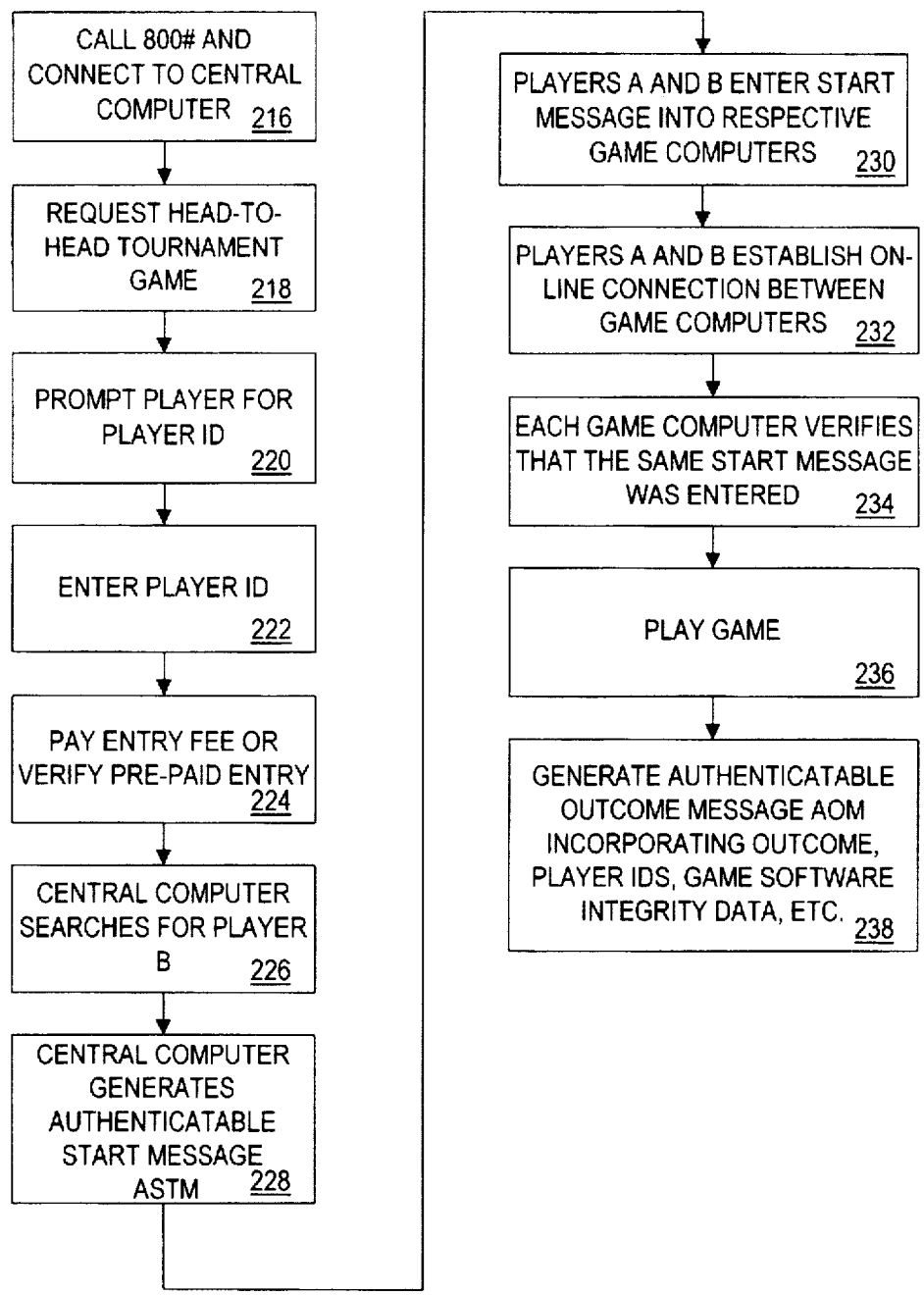
FIG. 13 is a flow-chart of an exemplary tournament sequence for head-to-head games.

Referring now to FIG. 13, there is depicted a flow-chart of an embodiment where players compete in a head-to-head tournament. This may occur in several ways. For illustration, the first player is identified as player "A" and the second as player "B" These players may compete against each other on a single game computer 14, or via an on-line connection between their respective game computers 14. If they play on the same game computer 14, the outcome of the game is simply incorporated into an authenticatable outcome message AOM as described above. The player's respective PIN numbers may be included for identification purposes.

In an on-line head-to-head embodiment, at step 216, player A calls the 800# and connects to the central computer 12. The IVRU 16 provides an option for a head-to-head tournament game at step 218. Player A is prompted for his or her player ID at step 220, which is entered into the telephone 18 at step 222. Step 224 represents payment of an entry fee or verification of a pre-paid entry fee as described above with regard to the other embodiments. After fee payment is verified, the central computer 12 searches for another player at step 226, player B, who has requested entry in the same head-to-head tournament by completing steps 216–224. The central computer 12 then generates an authenticatable start message ASTM based in part upon the player IDs for player A and player B at step 228. The authenticatable start message ASTM is communicated to players A and B, and entered into their respective game computers 14 at step 230. One of the players then establishes an on-line connection to the other at step 232, and each game computer 14 verifies that the proper authenticatable start message ASTM was entered at step 234. At step 236, players A and B proceed to play the game in accordance with conventional practice. It is known in the art to play many computer games in a head-to-head manner via an on-line connection. When the game is over, the game computer 14 of the winning player generates an authenticatable outcome message AOM representing the outcome and the player IDs for players A and B, and the game software integrity information at step 238. The outcome submission process operates in essentially the same manner as described above, but includes player win and loss data to enable players to continue to compete in further elimination rounds.

An entire tournament for a group of players may be held on a single game computer 14. In this connection, the game software 15 may have the capability to set up a tournament schedule for multiple head-to-head matches. Players purchase machine readable codes or messages that, when entered into the game computer 14, are employed by the game software 15 to direct the game computer 14 to set up the tournament. The tournament format may be "round robin," where each player plays everyone else in the group, a "Swiss system," where a limited number of rounds are established with the players having the best scores being matched against each other (i.e., an elimination protocol), or some other format well known in the art. All players competing in the tournament enter their name and player ID into the game computer 14. The game software 15 generates the tournament schedule, and after each head-to-head match, records the outcome. At the conclusion of the tournament, a winner is declared and the tournament standings are printed on the computer display. The final outcome of the tournament may be certified by the central computer 12 utilizing any of the above-described protocols. Alternatively, each head-to-head game outcome may be certified by the central computer 12 in the same fashion.

Computation of player ratings is implemented by the rating/ranking module 55 in the central computer 12 using known principles. Alternatively, ratings may be calculated on the player's game computer 14. These ratings are dependent upon past player and opponent performance and skill. For example, player "A" may have achieved 5 wins and 5 losses against relatively weak competitors, while player B has 3 wins and 20 losses against world-class competitors. This makes comparison between players difficult. The player's respective ratings take the relative skill of the competitors into account. Chess ratings are a good example. In accordance with well-known rating protocols, such as those developed by the statistician Dr. Arpad Elo, chess ratings range from 0 to 3000 with a mean of 1500. Every 200 points represent one standard deviation from the mean. Thus, a rating of 2100 represents three standard deviations above the mean. The larger the rating differential between the stronger player and the weaker player, the greater the probability of the stronger player winning the match. A player rated 200 points higher than another player, for example, may be expected to win 75 games out of 100, while a player rated 400 points higher than another may be expected to win 90 games out of 100. After each game, points are added to the winner's rating and subtracted from the loser's rating. The number of points won or lost is dependent upon the rating differential. Therefore, defeating a "weaker" player in lieu of a "better" player causes relatively fewer points to be added to the winner's rating. The present invention provides for generating ratings for players of computer games. The player's new rating is calculated after the outcome of the head-to-head game is certified. An exemplary rating formula may be characterized as follows: Winner's new rating=old rating+(x*rating difference)+y. If, for example, x=0.04 and y=16, and assuming a 2000 player beats a 1700 player, the 2000 player's new rating is computed as 2000+(0.04*(−300))+16=2004. The loser's rating becomes 1696. If a 1300 player beats a 1500 player, the 1300 player's new rating becomes 1300+(0.04*200)+16=1324. The loser's new rating becomes 1476. Thus, the greater the rating differential between players, the larger the rating changes after the games if the underdog wins. If the stronger player wins, his or her rating increases by a relatively smaller value. After new ratings are computed, the rating/ranking module directs the central computer 12 to update the player information database 48 and/or outcome database 50 to reflect the changes.

In any head-to-head embodiment, it is possible to equalize the playing conditions for players of differing ability by utilizing player handicaps to generate game initialization variables that provide the lesser rated player of the game with more lives, more ammunition and the like, or conversely, which reduce the number of lives, ammunition and the like for the higher rated player. These initialization variables may be included in the start message as discussed above for tournament games. Alternatively, they may be obtained from the game computer 14 itself or a separate handicap device 217 (i.e., preferably a hand-held computer comprising a central processing unit, memory, display and power source). The handicap device 217 may store various titles corresponding to different levels of achievement in its memory. A MORTAL KOMBAT game may have players classified as one star, two star, three star and the like. If player "A" is a two star player and player "B" is a four star player, the handicap device 217 calculates an equivalent rating for each player based upon these player's classifications. A two star player may have an equivalent rating of 1200 while a four star player may have an equivalent rating of 1700. Using these values, the handicap device calculates a rating differential of 500 points (1700–1200), and queries a database for that game that contains various handicap values and their rating point equivalents. Where a 1900 player competes with a 1600 player, the 300 rating point differential, for example, may disable the ability of the stronger 1900 player to "throw his or her opponent" (the weaker 1600 player). Doubling the amount of damage produced by "kicks" from the weaker player may be equivalent to a 500 rating point differential (e.g., the stronger player is handicapped by allowing the weaker player to double the damage and associated score with each kick). The handicap device 217 generates and displays a machine readable code compatible with the game software 15 that directs the game program 26 to set up the game with non-symmetrically altered characteristics. The methodology for altering game programs with manually input codes is well known in the art. The GAME GENIE device discussed above, and the use of cheat codes are good examples. In the case of the present invention, however, a similar protocol may be used in a novel application to equalize playing conditions by non-symmetrically varying the game in accordance with the differential between player ability. It is also anticipated that codes for handicapping the games may be obtained from printed materials that accompany the game software 15. These materials may have charts with rating ranges, handicaps and their corresponding codes. Alternatively, the game software 15 may include a handicap program that functions in the same manner as the handicap device 217. In that case, the players simply enter their respective levels or even ratings into the game computer 14, and the game software 15 directs the game computer 14 to automatically equalize the playing conditions in the game pursuant to the associated player handicaps. Another way to equalize players of differing skill levels is to reduce the duration of the competition. Over the course of a dozen fights, the better player will almost always emerge victorious over the weaker player. Although he may lose a few fights, the better player will win the majority. If the competition is restricted to just one fight, the weaker player has a greater chance of winning.

Players may also be rated for games which are played not head-to-head, but against the game computer 14. In this regard, each computer opponent in the game software 15 is provided with a base-line rating. In MORTAL KOMBAT, for example, the computer opponent for the first level fight is relatively weak. As players win fights and proceed to higher levels, the opponents become increasingly powerful. Ratings can be assigned to each of these computer opponents. The first level opponent might be assigned a rating of 900, the second 1050 and the third 1300. These ratings may be determined in several different ways. In one embodiment, the computer opponents within the game software 15 are provided with arbitrary ratings. Players having known ratings from previous head-to-head competitions then play against these computer opponents. As a result of these matches, the ratings of the computer opponents within the game software 15 change in accordance with the rating formulas described above. The greater the number of matches played, the more accurate the ratings for the computer opponents. The player's authenticatable outcome message AOM generated at the end of a match identifies which levels of the game were played and which opponents were defeated. Thus, the player's rating may be accurately calculated at the central computer 12 by taking the play related data into account. If, using the hypothetical software rating numbers in the above-identified example, the player's authenticatable outcome message AOM contains information that the player managed to defeat the first two opponents, but lost to the third, the player's new rating is calculated taking into account the player's previous rating, and result against the game software's rated opponents. This is analogous to defeating a 900 rated player, defeating a 1050 player, and losing to a 1300 player. This procedure may also be implemented for games that do not have such quantifiable levels. Ratings can also be assigned to overall measures of difficulty. In DONKEY KONG COUNTRY, for example, the game may have three difficulty levels such as beginner, intermediate and advanced. Finishing the game at the beginner level may add five (5) points to the player's rating, while completing the game at the intermediate level may add twenty-five (25) points to the player's rating.

In any of the above-described embodiments, players may register for tournaments in teams. These teams are identified by team IDs stored in memory area 96 of the player information database 48. The certified score (or time of completion for races of skill) for a particular team in any given tournament is an aggregation of the certified scores for all of the team members. Team standings, ratings and rankings are stored in the outcome database 50. Prizes may be awarded to members of the winning team. Players may also register as teams for league play, which is analogous to participation in a tournament.

While the foregoing descriptions refer to tournaments, the same protocol may be used to simply rank scores and/or to provide ratings for particular games. As with tournaments, the game software 15 may disable the cheat codes and scramble or randomize the predictable chain of events built in to the conventional program for a given game. The player calls the 800# listed to submit a particular score, and follows the sequence illustrated in FIG. 9, for example, except where the tournament ID is now just a game identifier. Thus, the player would not have to register in advance for a particular tournament. The player provides a game identifier and the authenticatable outcome message AOM to enable the central computer 12 to certify the score and generate a player standing, rating and ranking. In a simpler embodiment, players may provide scores for a particular game to the central computer 12 anonymously, such that the central computer 12 just compiles a standing of the top X scores for the game. Players can then call in to obtain the top scores achieved to date for that game.

The foregoing protocols may also be employed to make predictions on future events, or for competitions such as fantasy baseball or fantasy football. For example, the game software 15 generates a schedule of all or part of the football games for the upcoming weekend or even the season. The player makes predictions as to which teams will win, including any point-spreads which are determined by the game software 15, manually entered into the game computer 14 by the player, or received from an external source, such as via an RF signal. The player's prediction may be converted to a hash value with a hash function, signed with the player's private key for authentication, and then encrypted with the central computer's public key to generate an authenticatable outcome message AOM. The authenticatable outcome message AOM is authenticated and time-stamped by the central computer 12 or by the game computer 14 with a secure clock 36. The encryption of the player's predictions enables an authentication of the predictions. The timestamp by the central computer proves that the message was actually received at a particular time. After the events have transpired, the player provides the central computer with the actual predictions, which are compared to the actual outcomes of all the games. The central computer then recalculates the hash value of the player's predictions to verify the same. Each player's performance may be compared to that of other players in a tournament scenario (i.e., player A's predictions are 85% accurate, while player B's predictions are only 60% accurate).

The protocols described herein may be used to select wagering elements for future games of chance of which the outcome is uncertain such as a Lotto game. In this connection, the game computer may generate at least one set of Lotto choices for a given Lotto drawing. The player's selections are incorporated into an authenticatable outcome message AOM which is time-stamped by a secure tamper-resistant clock, for example by the clock in an iPower card. In this manner, the central authority may authenticate the player's selections and verify that the player made those selections prior to the Lotto drawing. Thus, the player need not "register" or submit his or her choices prior to a drawing.

The authentication protocols described herein may be readily adapted to games of chance including blackjack.

craps, roulette, slots and the like. The use of cryptographic protocols to evidence tampering with game software prevents a player from cheating the system or repudiating play. A blackjack player, for example, might pay the central authority a given fee for blackjack software that, when executed on the game computer 14, enables the player to play a number of potential hands. The final outcome of this play is incorporated into an authenticatable outcome message AOM that is submitted to the central computer 12. If the central computer 12 certifies the outcome, the player is paid any winnings, either directly or, if a wagering account exists a credit may be made thereto.

The foregoing description as applied to game outcomes is equally adapted to tests taken on a testing computer 14. A test outcome may be authenticated as having been achieved on that testing computer 14 by following the same protocols. Generating the test questions on the gaming computer 14 is analogous to generating a game, and the test taker's answers to those questions (i.e., the outcome) is analogous to a game outcome. In addition, tests can be presented with their questions in a random fashion. Similarly, test takers may be ranked and rated by their scores in the same fashion.

Referring again to FIG. 1B, there is depicted a schematic and flow-chart of another embodiment of the invention wherein each game computer 14 is capable of self-authenticating its own outcome. In this connection, the game computer 14 may be capable of printing an outcome accompanied by the words "certified." What this means is that the outcome of that game is capable of being verified as accurately reported and fairly achieved by the game computer 14 itself. For example, after the conclusion of the game, the game computer 14 generates the authenticatable outcome message AOM that constitutes the outcome of the game and a software tamper indication such as the digital signature of the game software as described above. The private or secret key, such as the SSCID, used for generating the authenticatable outcome message AOM provides for uniquely associating the outcome with that game computer 14. It also enables the authenticatable outcome message AOM to be subsequently verified by authenticating the AOM with the public key of a private key/public key pair, associated with the encryption/decryption module 28. If the tamper indicator such as the software hash value is publicly known, for example placed on the outside of the game cartridge (whether or not the hash function is secret), then when the authenticatable outcome message AOM is authenticated, the integrity of the game software 15 can be verified by the digital signature. For example, if the hash value incorporated into the authenticatable outcome message AOM matches the known hash value for that game software 15, there has been no tampering with the game software 15 and the associated outcome is certified as having been accurately reported and fairly achieved. Thus, a player who seeks to prove that his or her score is indeed certified, need only enter the authenticatable outcome message AOM into the game computer 14, which reads and authenticates the authenticatable outcome message AOM in accordance with the protocols described above with regard to the central computer.

The system also allows for mutual-authentication for an outcome from one game computer 14 to take place on any other game computer 14. As described above, if the authenticatable outcome message AOM was generated with a secret or private key, a player seeking to authenticate that outcome on another game computer 14 must obtain the public key associated with the public key/private key pair. In this regard, a list of public keys may be stored on a database at the central computer 12 or with a dedicated Key Distribution Center. The other game computer 14 uses the public key to authenticate the authenticatable outcome message AOM using the same protocol described above. Thus, the person seeking to authenticate the outcome simply calls the 800# and obtains the public key for the player alleging to have the outcome represented in his or her authenticatable outcome message AOM. If the secure perimeter 300 is considered to be another "computer," the practice of certifying an outcome on the same game computer 14 that utilizes a secure perimeter 300 to perform all encryption/decryption and/or authentication procedures, falls within the definition of mutual-authentication.

Figure 14A:
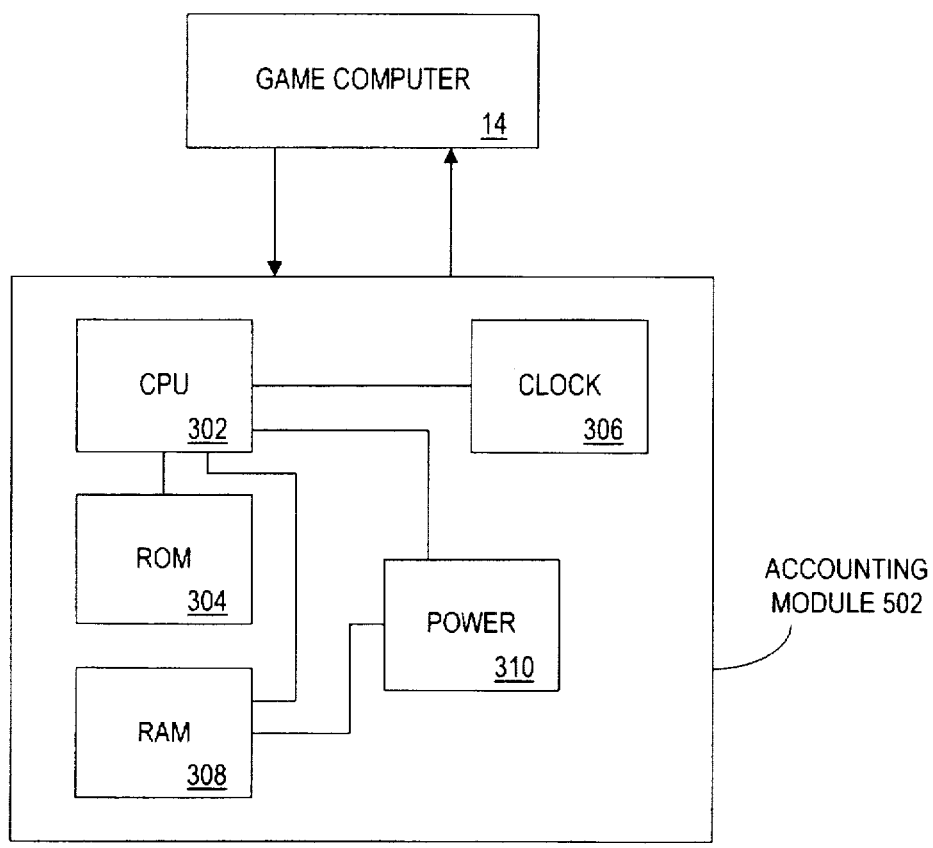
FIG. 14A is a schematic of a first pay-per-use embodiment in accordance with the present invention.
Figure 14B:
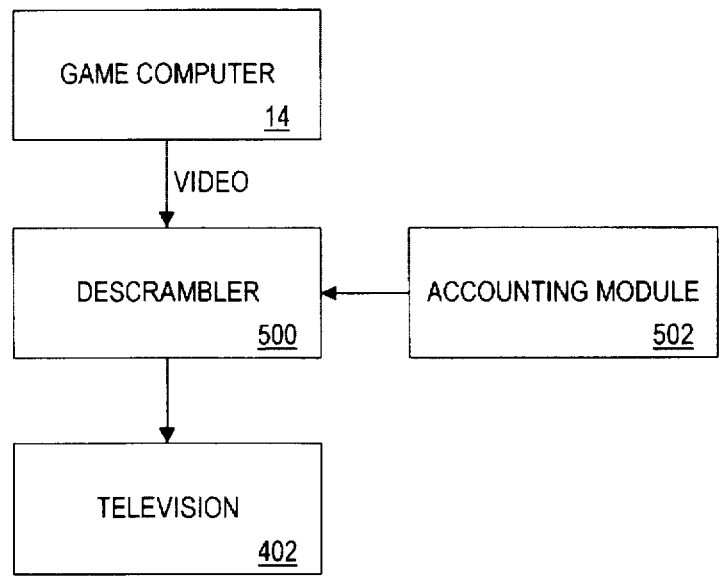
FIG. 14B is a schematic of a second pay-per-use embodiment.
Figure 15:
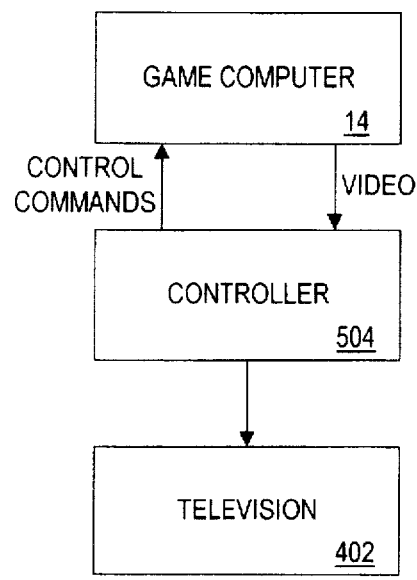
FIG. 15 is a schematic of a backwards-compatible pay-per-use embodiment.

Referring now to FIGS. 14A, 14B and 15, another aspect of the invention facilitates "pay-per-use" in the home video game environment. This implementation confers several advantages. It enables any game computer 14 to be turned into a video game arcade machine. Players simply pay per game, or for play over a specified period of time. It also allows for specialized game computers 14 (game consoles) to be, in effect, "leased" to players. This has significant commercial implications, as many of the newer game consoles 14 have relatively high acquisition costs. This "time-dependent disablement" aspect of the invention lets players acquire such game consoles for a relatively low down payment. Charges for game play may then be incurred on a daily, weekly, monthly, or some other periodical basis. There are several embodiments of this aspect of the invention as described hereinafter.

In a first time-dependent disablement embodiment, the game computer 14 is adapted to function for a specified period of time, after which it requires that an "unlocking code" be input to enable play after the expiration or end date. The player obtains an unlocking code (hereinafter referred to as an authenticatable unlock message AUM) in order to continue play after the end date. Game play may be restricted in any one of several ways. These include preventing the game computer CPU 27 from operating after the end date, preventing the game software 15 from operating to generate a game on the game computer 14 after the end date, and preventing the game from being displayed in a usable or intended format. This can be accomplished by scrambling the game program instructions and/or data such that a descrambler 500 is required to descramble the game where the descrambler 500 is enabled by an authenticatable unlock message AUM.

All embodiments utilize an accounting module 502 that accepts payment and authorizes play. The accounting module 502 includes the capability of the aforementioned encryption/decryption module 28 to generate and authenticate authenticatable messages. Thus, in all of these applications, a secret key such as a secret game software or computer ID SSCID may be used in the cryptographic authentication protocols. This SSCID is stored in a database associated with the central computer 12, and is similar to the above-described embodiments. The accounting module 502 may be a self-contained device, preferably residing within a secure perimeter 300" as described above. In this regard, the accounting module 502 includes a CPU 302 with ROM 304 containing encryption algorithms, a real-time clock 306 and an interface with an off-chip battery (310)—backed RAM 308 which holds encryption data and key information, and accounting information in the form of "credits" for arcade embodiments and end dates for time-lock embodiments. In order to enable game play, the accounting module 502 must receive an authenticatable unlock message AUM or have sufficient credit to enable game play.

In embodiments where the accounting module operates in a time-dependent disablement mode to wholly disable the game computer CPU 27 or to prevent the game program 26 from executing, the gaming computer CPU 27 sends a signal to the locking module CPU 302 to initiate a check time routine. If the current date/time is prior to the end date, the accounting module 502 signals the game computer CPU 27 and the game program 26 may be executed by the game computer 14. If the current date/time is outside the prescribed period, the CPU 27 or game program 26 is locked, and the player must purchase additional time in order to continue playing.

In an illustrative procedure, the accounting module 502 generates a random number and concatenates it with the SSCID and the requested end date of the next period into an authenticatable unlock request message AURM. This message may be displayed with the phone number to call and associated instructions. The player calls the central computer 12 using any of the methods described above with regard to the other embodiments (e.g., IVRU system, via modem, etc.), and provides the authenticatable unlock request message accompanied by his or her name, account number, PIN and the like. The player may be provided with the option to specify the length of the next period to be purchased (e.g., one month, two months, etc.). The player may provide a credit card number for billing, or billing could be made after expiration of the period for charges incurred. The central computer 12 reads and authenticates the authenticatable unlock request message AURM with the encryption/decryption module 52, and then generates an authenticatable unlock message AUM described above, which includes the random number from the AURM, the SSCID and the new end date. The authenticatable unlock message AUM is input to the accounting module 502, which authenticates the authenticatable unlock message AUM, and, if authenticated, then changes the current end date in memory.

Additional time may also be purchased by calling a 900#, or billing may be implemented by mail, or at a retail outlet. For example, an AURM could be written down, printed out or stored on portable data memory media, and provided to an authorized agent at a terminal connected to the central computer 12. Players may also purchase additional time by the month, week, day, etc. With specially configured accounting module software, players may have several options, such as a limited number of minutes of play time, where every minute of play reduces the allotted play time by an equivalent value (e.g., one minute) or by some other value. When the allotted time expires, the accounting module 502 implements a disable routine that signals the CPU 27 or the descrambler 500 described below. In this connection, it is anticipated that play may be restricted to certain hours of the day, weeks in the month and the like. For example, the accounting module 502 may prevent game play between the hours of 11pm and 7am to prevent children from playing late into the night. Rates for enabling play can be varied depending upon the time or day of play as well.

With specific regard to the scrambling embodiment, the game program 26 is configured with scrambled game data that causes the game computer 14 to generate the game with altered characteristics. A descrambler 500 is either installed within the game computer 14 itself, or is connected to the video output cable from the game computer 14. In order to convert the scrambled game into the intended format, the descrambler 500 must be enabled by an authenticatable unlock message AUM as described above. By way of example, an illustrative mode of operation is hereinafter described.

Data and instructions associated with computer games typically contain a background element as well as game character data commonly referred to as sprites. A particular game may have a dozen different backgrounds representing a dozen different levels. An example of a background is a jungle scene depicting trees, plants, rivers, rocks, etc. The game character that the player controls, as well as any enemy characters encountered, are normally represented by sprites, which are movable within the game background. This background may be analogized to a map, with respect to which the sprites travel. This "game data" is not to be confused with the software code that is executed by the CPU 27. The game data in this context is used to generate the video output and may be processed by the CPU 27, even if scrambled or encrypted. The processed game data visual information is composed of pixels. Each pixel has a color and an associated location for display. An illustrative pixel reference (34,15,26) may correspond to a blue color (indicated by the numeral 26) at a location residing at 34 pixels above the bottom of the screen (a horizontal datum) and 15 pixels to the right of the left side of the screen (a vertical datum). This information is stored in the read only memory of the game cartridge. Normally, the game program 26 is executed by the CPU 27, converted by appropriate means into a video signal (RF format), and communicated to a display device such as a TV. In this embodiment, the video signal contains altered characteristics, which must be applied to the descrambler 500 to make the output video signal represent the real game in the intended format. In the scrambling process, the pixel data may be algorithmically manipulated such that the pixel data does not represent the intended format. For example, the intended pixel (34,15,26) may be transformed into (12,02,68). The transformed pixel data is stored in the game cartridge and when processed, is unintelligible to the player if displayed on the TV without the intervening descrambling process. When the descrambler 500 is enabled with the proper authenticatable unlock message, it operates on the video signal to convert (12,02, 68) back to (34,15,26), the intended format. The scrambling and descrambling process may utilize algorithm/inverse algorithm pairs and/or the cryptographic authentication protocols described herein. For example, the value (12,02,68) is obtained by encrypting (34,15,26) with a secret key, and subsequently authenticated with a public key in the descrambler 500. The descrambler 500 will not operate to descramble the video signal after the end date, or prior to receiving the proper authenticatable unlock message AUM.

In an arcade embodiment, the player purchases credits to enable game play. Prior to loading the game program 26, the game computer 14 checks the accounting module 502 to determine whether or not the player has any credits remaining. If credits are available, the accounting module 502 decrements the number of credits stored in memory 308 by one (1), and signals the game computer CPU 27 to authorize game start. If there are no credits remaining, the accounting module 502 signals the game computer CPU 27 to prevent the game program 26 from being executed. At this point, if the player desires to continue to play, he must purchase more credits from the central computer 12. The central computer 12 has a database containing a list of all game computer secret serial numbers SSNs, all previously transmitted credit authorization numbers, the latest sequence number for each game computer serial number, and a record of all credit purchases. The credit request may be made in the form of an authenticatable credit request message ACRM, similar to the authenticatable unlock request message described above. The ACRM may include a random number concatenated with the SSCID and the number of credits requested. The central computer 12 reads and authenticates the authenticatable credit request message ACRM, and generates an authenticatable credit authorization message ACAM with the encryption/decryption module 52 by combining the number of credits purchased, the next value in the sequence, and encrypting or signing them with the SSCID or some other secret key and then encrypting that with the public key of the game computer 14. The authenticatable credit authorization message ACAM is communicated to the game computer 14 using any of the methods described above. The accounting module 502 authenticates the authenticatable credit authorization message ACAM with the secret key, and then adds the appropriate amount of credit to the credit database. The authentication of the authenticatable credit authorization message operates to load credit into the accounting module 502. If the ACAM is input into a different game computer 14, the authentication protocol will fail because the incorrect key will be used, thereby preventing fraud. This embodiment may also be implemented with the descrambler 500 described above with regard to the time-lock embodiment. The accounting module 502 enables the descrambler in lieu of signaling the game computer CPU 27.

Each game to be played may decrease the total credit value by a specified amount. Popular games may be made to require two or more "credits" per play. Some games may be designed to accept additional credits once a player has lost all of his or her allotted lives (e.g., such as with video arcade machines), thereby enabling the player to continue the game. Extra credits can be required to complete restricted stages of a game. A player might be charged one credit to explore any of the first ten levels of a game, while any of the additional five bonus levels could be explored at a cost of one credit each. For example, while exploring a ten-level dungeon, the player could be charged an additional credit for the use of a special weapon, access to a map of the dungeon, or hints on avoiding traps. Such extra characteristics may be implemented in the software instructions of the game software 15, and may be configured so as to require credits in the accounting module 502. The number of credits available may also be incremented after achieving a certain level of performance in the game. For example, scoring over a million points in DONKEY KONG might result in an extra credit being added to the available credit balance. Finding a secret room within a game might add five credits. This information can then be stored in the non-volatile memory of the accounting module 502 so that this five credit bonus cannot be repeated in future games. The number of credits that a player receives per dollar may also be variable. A purchase of ten credits may cost $0.50 each while a purchase of twenty credits may cost $0.30 each. Credit discounts can be offered to select players who have obtained certain certified titles. A five-star MORTAL KOMBAT player may receive a 10% discount on all credits. Each credit might also buy a certain number of lives. Games may cost a different number of credits depending upon the difficulty setting. For example, the easiest setting may cost two credits while the most difficult setting may cost one credit per play. In lieu of purchasing one game, each credit may entitle the player to play for a certain period of time. One credit may buy five minutes of play while two credits may buy twelve minutes of play. Furthermore, the accounting module 502 may be able to determine the price per game credit from data or instructions associated with the game program 26. The price per game may be stored within the accounting module 502 and can be manipulated with codes from the central computer 12 to alter or change the pricing structure for particular games.

In lieu of charging a specified number of credits for each game play, it will be appreciated by persons skilled in the art that a flat rate for unlimited use over a fixed period of time may be implemented by requesting a flat-rate pricing option from the accounting module 502. Specifically, in an illustrative embodiment, the accounting module 502 generates an authenticatable flat rate request message AFRRM, which includes the time period requested, SSCID, player PIN or other identifier, and current date/time. The AFRRM may be encrypted with the public key of the central computer 12. The central computer 12 authenticates the authenticatable flat rate request message AFRRM, and in turn generates an authenticatable flat rate message AFRM, which includes the time period requested, SSCID, and current date/time. Here again, the AFRM may be encrypted with the secret serial number of the game computer 14. This AFRM is authenticated by the accounting module 502, which adds the time period for play to the current time to determine the end date, after which the game computer 14 is transformed back to its pay-per-use status. During the allotted time period, the accounting module checks the current date/time prior to each play.

As a result of game play, reward points may be accumulated in a manner similar to a frequent flyer reward program. In this connection, each game played or each unit of time played generates one or more reward points. Players may also accumulate points for achieving certain results in a game, such as, for example, one reward point per each million scored points in a particular game. The accounting module 502 tracks reward points in a reward point database in its memory. To redeem reward points, a player requests a reward point redemption function, which directs the accounting module 502 to generate an authenticatable point redemption message APRM, which includes the SSCID, player PIN or other identifier, number of points for which redemption is requested, and the current date/time. This APRM may be encrypted with the SSCID as described above. The central computer 12 reads and authenticates the authenticatable point redemption message and increments the player's reward point balance by the appropriate number. These reward points may be subsequently utilized to purchase prizes or gifts, which purchases may be made in combination with additional payment if desired.

In an exemplary embodiment, the credits used in the pay-per-use process may be transferred between game computers 14 (i.e., from a source game computer 14 to a destination game computer 14) such that a player can bring credits to play on another player's game computer 14. This may be implemented by requesting a credit transfer function associated with the accounting module 502. The accounting module 502 prompts the player for a PIN, tracking number, or other identifier to verify the player's identity. If this response is consistent with the data stored in the memory of the accounting module 502, the process proceeds with the player entering the game computer ID number of the destination game computer 14. The accounting module 502 generates an authenticatable transfer message ATM based upon the SSCID of the source game computer 14, a PIN or other player identifier, the game computer ID number of the destination game computer 14, and the current date/time from the clock associated with the accounting module 502 or the game computer 14. This message may be encrypted with the game computer ID of the destination game computer 14. The accounting module 502 then decrements the credit balance in its memory by the corresponding amount requested. The player writes down or prints out the authenticatable transfer message ATM (or downloads it to portable data memory media such as a floppy disk or PCMCIA card) and inputs the same into the accounting module 502 associated with the destination game computer 14. The accounting module 502 associated with the destination game computer 14 reads and authenticates the authenticatable transfer message ATM in accordance with the cryptographic protocols described above, and stores the time/date in memory, and compares the time/date with previous messages to determine whether that authenticatable transfer message ATM has been used previously. If the authenticatable transfer message is authenticated and the credit transfer authorized, the transfer credits are added to a "guest account" generated by the accounting module 502 associated with the destination game computer 14. The player uses these credits by entering his or her PIN or other identifier incorporated in the authenticatable transfer message ATM. The accounting module 502 then enables game play as described above. If a credit balance remains after play, the accounting module 502 generates an authenticatable balance return message ABRM, which incorporates the number of credits returned, the SSCID of the source game computer 14, the player PIN, source game computer ID number, and the current date/time. This message may be encrypted with the source game computer ID number. Contemporaneously, the guest account is deleted. The player enters the authenticatable balance return message ABRM into the source game computer 14, and the accounting module 502 authenticates the ABRM and adds the credits to the player's credit balance in the accounting module 502.

Players may set up guest accounts on other player's computers via the central computer 12. In this connection, a player requests a guest account on another's game computer 14. The accounting module 502 displays an authenticatable guest message AGM on the destination game computer 14, which message includes the SSCID of the destination game computer 14, a player PIN or other identifier, and the current date/time. This message may be encrypted with a public key from the central computer 12. The player then calls the central computer 12, and is prompted to enter the authenticatable guest message AGM, accompanied by the number of credits requested and a credit card number or some other instructions to arrange for payment. The central computer 12 authenticates the authenticatable guest message AGM with the encryption/decryption module 52, and generates in return an authenticatable guest credit message AGCM, which includes the destination game computer SSCID, the number of credits requested, and the current date/time. This message may be encrypted with the SSCID of the destination game computer 14. The accounting module 502 associated with the destination game computer 14 then authenticates the authenticatable guest credit message AGCM, and adds the credits transferred to a guest account as described above.

Although the foregoing embodiments utilize an accounting module which is either part of or associated with (e.g., by way of a PCMCIA card and the like) the game computer 14, it is possible to incorporate the constituent components in a tamper-resistant game controller 504. This allows for backward compatibility with existing game computers 14. A game controller 504 includes its own CPU 302, ROM 304, battery (310)—backed RAM 308 and real-time clock 306, disposed within a secure perimeter 300" as described above with regard to the other embodiments. The game controller 504 includes input controls such as joysticks and buttons which communicate via an input interface associated with the game computer 14 as is well known in the art. The game controller 504 also includes a video input interface for receiving NTSC (PAL in Europe) video signals. A video output interface communicates the video signal to a TV. The game controller contains a program in memory for recognizing data from the video screen to derive the outcome information to generate authenticatable outcome messages as discussed at length above. The game controller memory also stores a unique controller secret serial number CSSN, a random number generator program, and the accounting module program instructions. As described above, the encryption/decryption functions implemented by the encryption/decryption module 28, are part of the accounting module in this embodiment. In this regard, the controller memory stores associated public and private encryption keys, and a public encryption key associated with the hardware manufacturer. The game software 15 contains or can read from another source, the public key of the controller 504, and the code used to generate random numbers. This code is obfuscated in order to render the operation of interposing devices, such as the above-described GAME GENIE, more problematic.

In an exemplary scenario, a player purchases an authenticatable unlock message AUM as described above, and enters it into the game controller 504. The game controller CPU under direction of the random number generator program generates a random number R1 and an authenticatable play enable message APEM authorizing play. This APEM includes the controller secret serial number CSSN, and may be encrypted with the private key of the game controller. The APEM is then communicated to the CPU 27 of the game computer 14 or to the descrambler 500 as described above. The game controller 504 also "signs" the public key of the game controller and the game controller secret serial number CSSN with the private key of the hardware manufacturer. The latter is known as a public key certificate. This enables the game computer 14 to authenticate the public key certificate and thus the game controller 504. Thus, the game computer 14 is able to verify that the controller secret serial number CSSN contained in the play enable message PEN is correct for that game controller 504. The game computer 14 then generates a second random number R2, which is communicated to the game controller 504 along with random number R1. The game controller 504 confirms that this R1 matches the R1 previously created and included in the authenticatable play enable message APEM, and encrypts R1 and R2 with the private key of the game controller 504 into a response play enable message RPEM. The RPEM is read by the game computer 14 and decrypted with the public key of the game controller 504. R1 and R2 are now compared with the prior generated values. If they match, the game controller 504 is authenticated and it may be used to enable game play in accordance with the foregoing protocols.

The present invention has been shown and described in what are considered to be the most practical and preferred embodiments. It is anticipated however that departures may be made therefrom and that obvious modifications will be implemented by persons skilled in the art.

Glossary:

Authentication: The process whereby the integrity of a message and/or its contents are verified, i.e., it is what it is claimed to be.

Authenticatable balance return message (ABRM): An authenticatable message generated by the destination game computer which allows a player to return unused credits from a guest account back to the source game computer. The message may contain the secret serial number of the source game computer, the number of credits to return, the player PIN, and the current date/time.

Authenticatable challenge message (ACM): A message used in the challenge/response protocol that instructs the game software to generate an encrypted response message which enables the challenge/response protocol and which may also verify that the player is in possession of, or obtained the game outcome from the game software which enabled the player to play the game that resulted in the outcome for which the player seeks registration.

Authenticatable credit authorization message (ACAM): An authenticatable message generated by the central computer which is used to supply the player with additional credits. The message may contain the secret serial number, the number of credits requested, PIN, and a random number or sequence number to ensure message freshness. The secret serial number ensures that the credits received can only be used in one game computer.

Authenticatable credit request message (ACRM): An authenticatable message generated by the game computer as a request for additional credits from the central computer to be used in the pay-per-use system. The message may contain the secret serial number, the number of credits requested, PIN, a sequence number, or a random number. The random number or sequence number are used to ensure message freshness. The secret serial number ensures that the returning ACAM can not be used in multiple game computers.

Authenticatable flat rate request message (AFRM): An authenticatable message generated by the game computer, which provides a player for unlimited game play over a specified time period. The message may contain the SSCID, the period of time requested, the player PIN or other identifier, and the current date/time.

Authenticatable flat rate message (AFRM): An authenticatable message generated by the central computer in response to the AFRRM. The message may contain the SSCID, the period of time requested, the player PIN or other identifier, and the current date/time.

Authenticatable guest message (AGM): This authenticatable message is generated by the game computer and allows a player to set up a guest account without bringing credits from the source computer. The message may contain the secret serial number of the destination game computer, PIN or other player identification, and the current date/time.

Authenticatable guest credit message (AGCM): This authenticatable message is created by the central computer in response to an AGM. The message may contain the secret serial number of the destination game computer, the number of credits requested, and the current date/time.

Authenticatable outcome message (AOM): An authenticatable representation of the game outcome (i.e., score, time to completion, and/or play-related data, etc.) which may be based upon and include at least one of the following, the software ID, a hash value of the game software, a unique attribute of the memory media in which the game software resides, a player PIN, etc.

Authenticatable play enable message (APEM): An authenticatable message communicated to the CPU of the game computer, which authorizes game play. It may contain the SSCID, a random number, or an identifying source of the APEM.

Authenticatable point redemption message (APRM): An authenticatable message generated by the game computer, which allows a player to transfer reward points to the central computer. The message may contain the SSCID, the number of points received, the player PIN or other identifier, and the current date/time.

Authenticatable response message (ARM): An authenticatable message utilized in the challenge/response protocol, and which may also verify that the player is in possession of, or obtained the game outcome from the game software which enabled the player to play the game that resulted in the outcome for which the player seeks registration.

Authenticatable start message (ASTM): An authenticatable message generated by the central computer which enables tournament play to begin. The message may include instructions for the game software to generate specified or random initialization parameters for that tournament game. The message may also contain information regarding encryption keys to be used in the encryption process and/or handicapping parameters.

Authenticatable timing message (ATM): An authenticatable message representing the time to completion for a race of skill which may include at least one of the following, the software ID, a hash value of the game software, a unique attribute of the memory media in which the game software resides, player PIN, etc.

Authenticatable transfer message (ATM): This message is used by players to transfer credit balances from one game computer to another. The message may contain the secret serial number, PIN or other player identifier, current date/time, and the game computer ID from the destination game computer. The ID from the destination computer prevents a player from using an ATM in multiple game computers.

Authenticatable unlock request message (AURM): An authenticatable message generated by the game computer, which allows a player to request an extension of his current end date. The message may contain the SSCID of the game computer, the requested end date, and a random number.

Authenticatable unlock message (AUM): This authenticatable message is generated by the central computer in response to a request for a new end date. The message may contain the SSCID of the game computer, the new end date, and the random number received in the AURM.

Authenticated outcome message (ACOM): The authenticated game outcome (i.e., score, time to completion, and/or any play-related data).

Biometrics: The processes and procedures used to uniquely identify a given individual via an independent measurement system. (e.g. a fingerprint reader, voice recognition system, retinal scanner and the like).

Broadcast start message BSTM: A start message that is broadcast to all players at the same time over a mass communications channel, e.g., television, radio and the like.

Central authority: A system utilizing a central computer applying cryptographic protocols, which ensures that the manner in which games are played is scrupulously fair and unbiased, and that the outcomes of such games are reported accurately, i.e., there is no undetected lying or cheating.

Central computer: A computer or network of computers which serve as the official tournament manager and/or certification authority. The central computer may or may not have some or all of the game software residing on it. The central computer is generally accessed via a telephone network from remote locations where the game computers are disposed. The telephone network may include interactive voice response units (IVRUs) for prompting the player to enter information through a telephone keypad, or the game computers may communicate directly through a modem.

Central scoreboard: A centralized database where all certified scores are maintained. This information could be made available via the Internet or major online providers, downloaded to game computers, or by mail or telephone.

Certified outcome: A game score, time to completion and/or any play-related data which has been authenticated by the central authority as having been achieved legitimately (fairly) and reported accurately.

Challenge/response protocol: A process by which a central computer exchanges messages with the game computer in order to authenticate the outcome message using cryptographic protocols, and may also prove that the player is in possession of, or obtained the game outcome from the game software which enabled the player to play the game that resulted in the outcome which the player submits for certification.

Cheat codes: When entered into the game software, these codes allow a player special benefits such as unlimited weapons or an infinite number of lives. Typically used by game programmers to test their software. Also referred to as "God codes"

Check digits: Digits appended to a message which are generated as a simple function of the original message. The receiver of the message repeats the function. If the result does not match the check digits, a transmission error has occurred.

Classic tournament: Any contest where players, singly or in teams, compete for prizes and/or rankings. Classic tournaments usually contain four attributes: 1) They are held at a specific time; 2) They are held at a specific location; 3) They are conducted under a set of rules which apply equally to all contestants; and 4) They are held under the supervision of one or more judges and/or a sanctioning authority.

Compression: A protocol which utilizes an algorithm to reduce a long string of data to a shorter string while retaining all of the information in the original long string.

Controller secret serial number (CSSN): A number which uniquely identifies the game controller. This number may be burned into the ROM chip(s) of the controller.

Credits: Payment units used in a pay-per-use system. Players purchase credits from the central computer. Unused credits are stored in the accounting module of the game computer.

Cryptographic protocol: A protocol whose purpose, for the present invention, allows for one or more of the following:
1) outcome legitimacy, i.e., the player did not simply invent an outcome, it was the result of playing a specific game.
2) outcome paternity, i.e., the outcome was generated by a specific game, and/or by a specific game computer and/or software package.
3) outcome integrity, i.e., the outcome has not been tampered with or modified in any manner.
4) software integrity, i.e., the game software has not been tampered with or modified in any manner.
5) tournament validity, i.e., the outcome was generated as a result of tournament and not practice play.
6) one-time usage, i.e., an authenticatable start message may only be used once.
7) transmission integrity, i.e., the outcome represented in an encrypted outcome message cannot be altered during transmission, either accidently or intentionally, without detection of such alteration.
8) non-repudiation, i.e., does not allow the player who registered a score with the central computer to subsequently deny having done so.

Dedicated game system: A game console such as those manufactured by Sega or Nintendo. Unlike a PC, their primary use is to play games.

Destination game computer: When setting up a guest account, this is the game computer which is receiving the credit transfer from the source computer.

Digital signature: A sequence of bits based on both the message being signed and the signer's private key that the receiver can use to verify both the identity of the sender and the integrity of the message.

Division: Tournaments may contain different player groups such as beginner, intermediate and advanced, or groups delineated by geographic location.

Encryption: The process of describing a message in such a way as to hide its substance.

Encrypting key: Any datastring used to encrypt a message in a cryptographic protocol.

Encryption/decryption module: A computer program, block of code, or hardware/firmware which encrypts, decrypts and authenticates messages and/or data.

End date: A date stored within the non-volatile memory of the accounting module. When the current date exceeds this date in time, the game computer and/or game software is disabled. Alternatively, a descrambler device for descrambling a scrambled video signal is disabled.

Entry: Each separate opportunity to play in a tournament. Each entry may allow for multiple rounds of play. Some tournaments may allow players to enter multiple times.

Entry fee: The cost to purchase each entry. Players might pay by giving their credit card number to the tournament central computer. A specific number of entry fees can be included at no extra cost with the purchase of game software.

External authentication device: A secure device in which the encryption/decryption module resides, e.g., the iPower card, available from National Semiconductor Corp.

External clock signal: A time signal generated by a third party that is widely broadcast. Several government operated atomic clocks broadcast such signals throughout the United States, as does the Global Positioning System.

False score: A score which was obtained by altering the game software or by invoking "cheat codes"

Firmware: Programs stored in ROMs or in other devices which permanently keep their stored information.

Forged score: A counterfeit score which is used to try and deceive the central authority into believing that a fair game was played and a true score achieved when in fact the player made up the score or stole it from another player.

Game computer: The computer on which a game (or test) is being played. The game computer may be a videogame console (e.g., Nintendo, Sega and the like), PC, PDA, coin-operated arcade machine, portable game units (e.g., GAME BOY, GAME GEAR and the like), etc.

Game of skill: Any game whose outcome is predominantly determined by skill, either per game played or over a series of games, e.g., backgammon, bridge, poker, etc. Games of skill may include components of luck such as, for example, the use of dice.

Game of chance: Any game where randomness is a key or dominant element in determining the outcome, or where the outcome is determined largely by external forces beyond the control or significant influence of the player.

Game parameters: Attributes of a game such as the number of levels, difficulty or variability. These parameters can be manipulated by the central computer and communicated to the game computer through the authenticatable start message.

Game software: Code executed by the game computer which allows a player to play a game. The game software typically resides on a cartridge, CD-ROM, floppy disk, hard disk, etc.

Guest account: A temporary account for pay-per-use game play set up on another player's game computer. This account is managed by the game computer's accounting module.

Handicap device: Head-to-head games in which one player is clearly better can be handicapped by using initialization variables that provide the weaker player with more lives, more ammunition, and the like. The handicap device produces these initialization variables based on player ratings or titles.

Handicap values: A numerical method for equalizing two factors such as players of varying ability. A golf handicap, for example, might be four strokes.

Hardware inspection: The process by which a piece of hardware, such as a game cartridge, is physically inspected prior to a final official declaration. In a tournament where the grand prize is large enough, the winning player may be required to submit his or her game cartridge to prove that tamper-evident internal seals were not broken.

Hardware security: The use of specialized components or structures that provide a level of tamper-resistance and/or anti-counterfeiting to programs or results.

Hash function: A function that takes an input string (usually a series of digits) and converts ("hashes") it to a fixed size, usually smaller, output string. The object is to "fingerprint" the input string so that the resulting hash value is very likely to represent one and only one input string. Changing a single bit of the input string will result in a different hash value.

Hash value: The resulting string of data ("the fingerprint") after applying a hash function to an input string.

Instant prize: A prize which is earned for achieving a result without any consideration of what may be taking place in other related games or with other contestants. A player in a golf tournament might be eligible to win $5,000 for hitting a hole-in-one on a certain hole without consideration to his or her ranking in the overall tournament.

Internal clock: A clock contained within a game or computer system.

IVRU's: Interactive Voice Response Units are computer systems that are tied into a telephone in such a manner that a user may select prompts and enter data from a touch tone keypad or via voice commands recognized by the IVRU software.

Key card: A smart card which is used for the secure generation of encryption keys. Each card may be unique, and messages encrypted using the keys in the card are decryptable by the central computer.

League play: Team play in which there are a series of regularly scheduled matches.

Memory media signature: A unique readable set of data which is based upon an inherent property of any memory media and which cannot be easily duplicated.

Non-volatile memory: Data storage media including ROM, hard disks, floppy disks, optical disks, and the like, which do not require any power supply to maintain the memory contents.

Off-line: When a computer is not connected to (e.g. via modem) or receiving an electromagnetic external signal of any kind (e.g. RF signal) from another computer or outside source.

One-way function: A function that is relatively easy to compute but significantly harder to reverse or undo. For example, it is easy to multiply two X-digit numbers and create a Y-digit result. It is very hard to take an Y-digit number and figure out which two X-digit numbers were multiplied together to create the Y-digit number.

One-way hash function: A hash function that is also a one-way function. It is easy to compute a hash value from an input string but it is hard to generate a string that hashes to a particular value. A One-way hash function is also known as a compression function, contraction function, message digest, fingerprint, cryptographic checksum, data integrity check (DIC), manipulation detection code (MDC), message authentication code (MAC), and data authentication code (DAC).

One-way hash with key: One-way hash functions that require the use of both an input string and a specific key string. (The "key" is an additional input string which may be secret.) Only someone with the key can calculate the hash value, i.e., the hash value is encrypted with the key.

On-line: When a computer is connected to or receiving a signal from another computer. Typical examples include PCs on a local area network, PCs connected to the Internet using a modem and phone line, or cellular phones connected to the central phone switch over a wireless network.

On-line proctor: An on-line connection to a website or service whose purpose is to continuously or intermittently verify that a tournament game is proceeding in a manner consistent with the game's rules. This might involve temporary connections to verify that the software code governing the game has not been altered. It might also pose random simple questions to the player (e.g. what is your middle name) that would prevent an automated play system from being used.

Outcomes: A score, time to completion, and/or any play-related data that was the result of all or part of playing the game. The play related data may include special statistical information as determined by the game software, or the play related data can be used by the central computer to compile statistical information. Alternatively, an outcome may consist of all the game data for the entire game, i.e., the entire game is recorded in memory, including all of the player's actions, responses, moves and the like.

Outcome message: Outcome data exchanged between a game computer and the central computer.

Public-key certificate: A public key signed by a trusted authority.

Premiums: Non-cash prizes, e.g., tee shirts, coffee mugs, posters, certificates, etc.

Pre-paid tournament entries: Tournament entries paid in advance of the tournament start date.

Prize: A product or cash reward associated with the outcome of a tournament. Typically, players earn prizes in relation to their performance in the tournament. Cash prizes can be paid via check, electronic fund transfer, digital cash or credit card.

Qualification points: Points earned toward a given rank. Bridge players, for example, receive master points for tournament wins.

Ranking: The hierarchical position of a certified score (#1, #225, etc.). The hierarchy can be based on all contestants or limited to certain agreed groups or limitations (e.g. #4 in the state, #6 in a high school, etc).

Rating: A value assigned to a player based on one or more certified scores, often achieved over a period of time. A chess rating is expressed as a 3 or 4-digit number such as 1,825. Ratings are based on achievement, not on position relative to others (rankings). Thus, two players could each have the same chess rating.

Sanctioning authority: The authority responsible for overseeing the policies and procedures used in connection with a tournament.

Save/resume code: A code which allows a player to temporarily stop a game, freezing the action until the resume code is entered into the game software.

Secure perimeter: A defined physical area of hardware which is tamper-resistant and/or temper-evident, in which resides data or algorithms whose characteristics must not be alterable in order for a system to remain secure.

"Self-starter" tournament: A tournament where the element of when the player competes is controlled by the player, though a permissible window of time may be set forth by the tournament director. A tournament to solve a puzzle where the solution is expected to take several weeks, might allow for players to start when they wanted so long as the player's start time is after a predetermined start date for the tournament.

Software ID number: A unique ID number incorporated into the game software which uniquely identifies the particular copy of the game software and which is difficult to alter in an undetectable manner.

Software registration process: A process by which the player sends personal information and a serial number SSN identifying a copy of the game software back to the central authority. Each game software copy may utilize a registration card having a special hologram and/or serial number SSN associated therewith which is difficult to forge.

Software security: The use of cryptographic techniques such as hash functions to ensure the integrity of the game software.

Software serial number SSN: A readily ascertainable (i.e., known) identification number associated with each copy of the game software. Not to be confused with the software ID contained within the game software and which is not known to or easily accessible by the player.

Source game computer: When setting up a guest account, this is the game computer which is sending the credits to the destination computer.

Sprites: The video representation of game characters. Players maneuver sprites with the game controller.

Start message: A message transmitted from the central computer to the game computer that activates a tournament game.

Submission: The process by which a player transmits a game outcome to the central computer.

Subscription fees: Monthly or yearly charges which allow a player a certain number of tournament entries.

Tamper-resistant: Hardware or software which is difficult to modify or alter from its intended purpose. In some cases, attempts to alter such hardware or software will render the hardware or software inoperable. In other cases, tampering is detectable by cryptographic tests.

Tamper-evident: Hardware or software which, upon inspection or interrogation shows evidence of any attempt or success at the modification or alteration of its intended purpose or stored data.

Tie-breaker: A secondary result other than the final score which is used to rank players of equal scores in lieu of a head-to-head playoff. For example, a computerized golf tournament might decide the winner based on the score, and, if scores are tied, then the tie is broken based on play-related information such as the fewest putts taken, and if the players are still tied, then based on the distance of the longest drive. Tie-breaks can also be based on, for example, the number of keystrokes or clicks of a mouse.

Time-stamp: A secure timing protocol for attaching the current time and date to a message. A time-stamp may be done with a secure device such as the central computer or via a trusted third party such as a digital timestamping service.

Title: Ratings within a given range qualify their holders to a "rank" or honorific title based on predetermined ranges. Thus a chess "expert" is rated between 2,000 and 2,200 and a black belt in karate is someone who has achieved certain measured standards of proficiency. The achievement of a certain title is not necessarily based on numerical scoring, but rather on certain play-related data such as number of levels completed or number of opponents defeated and the like.

Token: A tamper-resistant and/or tamper-evident portable device (e.g., an iPower card) used for one or more of the following:

1) storing of secret or private keys.
2) storing random digits.
3) encrypting and/or decrypting messages.
4) signing and/or verifying messages.

Tournament ID number: A number uniquely identifying the tournament.

Transmission error check module: A computer program or block of code which examines the check digits on incoming messages to ensure that no transmission errors have occurred.

Types of tournaments:

In a scoring tournament, a player plays against the game (and/or a clock) and the highest score wins. Golf, bowling or duplicate bridge are classic scoring tournaments.

In a head-to-head tournament, players compete against each other instead of against the game. Boxing and tennis are classic head-to-head tournaments. These tournaments are interpersonal in nature.

In a puzzle tournament, players compete to solve a puzzle, sometime ranked by time, other times, simply in a race to be first. A crossword puzzle tournament might be a good example of this.

Talent competitions are another type of tournament. Unlike scoring tournaments which usually do not involve subjective elements, a talent competition utilizes judges to evaluate performance and award scores based on subjective elements. A gymnastics tournament is an example.

Finish-line races, are a form of head-to-head tournaments whereby the fastest time as measured against a field of competitors is the determinant of winning. A car race or 100 yard dash is won by the person who finishes first, regardless of the time involved.

Forecasting competitions are those that involve the comparative accuracy of a series of predictions, such as handicapping a football season or predicting a variety of financial indicators at some future time. Lottery games such as Lotto may be thought of as a non-skill forecasting tournament.

Note that all types of tournaments can either be single-player or multi-player (teams).

Volatile memory: memory media such as RAM, in which all stored data is lost if power is interrupted.

Website: Any computer connected to the Internet which is capable of being accessed via the World Wide Web.

We claim:

1. A method, comprising the steps of:
   executing a computer game program to generate a computer game outcome;
   encoding the computer game outcome to generate an encoded message;
   providing said encoded message to a user for transmission to a device configured for decoding said encoded message; and
   periodically checking blocks of said computer game program during said step of executing.

2. A method, comprising the steps of:
   registering a computer game program with a central computer;
   receiving a registration code corresponding to said registered computer game;

executing a computer game program to generate a computer game outcome;

receiving by a user the computer game outcome in the form of an encoded message; and providing by said user said encoded message to a device configured for decoding said encoded message.

3. A method, comprising the steps of:

registering a computer game program with a central computer;

receiving a registration code corresponding to said registered computer game;

executing a computer game program to generate a computer game outcome;

receiving by a user the computer game outcome in the form of an encoded message;

providing by said user said registration code to said device configured for decoding said encoded signal; and providing by said user said encoded message to a device configured for decoding said encoded message.

4. A method, comprising the steps of:

registering a computer game belonging to a particular computer game user;

generating a unique random number corresponding to said computer game belonging to said particular game user;

receiving an encoded registration message from a computer game user;

decoding said encoded registration message to retrieve a number within said registration message;

receiving from a user an encoded message corresponding to an outcome of a computer game;

decoding said encoded message to retrieve said outcome;

storing for further use said outcome; and comparing said number within said registration message with said unique random number to determine whether said computer game outcome was generated on a particular computer game.

5. A computer device comprising:

means for executing a computer game program to generate a computer game outcome;

means for encoding the computer game outcome to generate an encoded message;

means for providing said encoded message to a user;

means for registering said computer game program with a central computer; and means for receiving a registration code corresponding to said registered computer game program.

6. A computer device, comprising:

means for registering a computer game belonging to a particular computer game user;

means for generating a unique random number corresponding to said computer game belonging to said particular computer game user;

means for transmitting said unique random number to said particular computer game user;

means for receiving a registration message from a user;

means for receiving from a user an encoded message corresponding to an outcome of said computer game;

means for decoding said encoded message to retrieve said outcome;

means for storing said outcome; and means for comparing said registration message with said unique random number to confirm that a particular computer game outcome was generated on a particular computer game.

7. A computer device, comprising:

means for registering a plurality of computer games and for generating a plurality of unique random numbers, each unique random number corresponding to a particular one of said plurality of computer games;

means for receiving from a user an encoded message corresponding to an outcome of a particular one of said plurality of computer games;

means for decoding said encoded message to retrieve said outcome; and means for storing said outcome.

8. A computer device, comprising:

a memory device having encoding control code embodied therein; and a processor disposed in communication with said memory device, said processor configured to process said encoding control code in conjunction with a computer game outcome to generate an encoded message corresponding to said computer game outcome and to transmit said encoded message to a human-readable output device, wherein said processor is further configured to periodically check blocks of computer game program execution code.

9. A computer device comprising:

memory device having embodied therein decoding control code and an encoded message corresponding to a computer game outcome; and a processor disposed in communication with said memory device, said processor configured to process said decoding control code to decode said encoded message to reveal said computer game outcome, wherein said processor and said memory device are configured to generate, maintain and transmit a unique registration number for each of a plurality of computer games.

10. A computer device comprising:

a computer readable medium having computer readable program code means embodied therein, said computer readable program code means comprising encoding means for causing said computer device to generate an encoded message representing an outcome of a computer game and code means for causing said computer device to provide said encoded message to a user, wherein said computer readable program code means further comprises code means for causing said computer device to periodically check blocks of game program execution code means.

11. A computer device comprising:

a computer readable medium having computer readable program code means embodied therein, said computer readable program code means comprising decoding means for causing said computer device to decode an encoded message corresponding to an outcome of a computer game and fraud-detection code means for causing said computer device to determine whether said outcome is fraudulent, wherein said computer readable program code means further comprises code means for causing said computer device to issue a unique registration number for each computer game belonging to a particular computer game user.

* * * * *